US012578118B2

(12) United States Patent
Mcdonnell

(10) Patent No.: US 12,578,118 B2
(45) **Date of Patent: *Mar. 17, 2026**

(54) CLEANER DISPENSING SYSTEM CARTRIDGE AUTHENTICATION AND CONTROL

(71) Applicant: JOEY MAC INVENTIONS LLC, Miramar, FL (US)

(72) Inventor: Joseph Mcdonnell, Miramar, FL (US)

(73) Assignee: JOEY MAC INVENTIONS LLC, Miramar, FL (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/453,440

(22) Filed: Aug. 22, 2023

(65) Prior Publication Data

US 2024/0183573 A1 Jun. 6, 2024

Related U.S. Application Data

(63) Continuation of application No. 18/061,248, filed on Dec. 2, 2022, now Pat. No. 11,761,675.

(51) Int. Cl.
*F24F 13/22* (2006.01)
*B08B 13/00* (2006.01)

(52) U.S. Cl.
CPC ............ *F24F 13/222* (2013.01); *B08B 13/00* (2013.01); *F24F 2013/221* (2013.01); *F24F 2013/227* (2013.01); *F24F 2221/22* (2013.01)

(58) Field of Classification Search
CPC ............... F24F 13/222; F24F 2013/221; F24F 2013/227; F24F 2221/22; B08B 13/00;
(Continued)

(56) References Cited

U.S. PATENT DOCUMENTS 4,962,778 A 10/1990 Driskill
5,402,813 A 4/1995 Keen
(Continued)

FOREIGN PATENT DOCUMENTS

CN 115363492 A 11/2022
WO 2011/075324 A1 6/2011
(Continued)

OTHER PUBLICATIONS

International Search Report and Written Opinion thereof dated Sep. 26, 2023 for corresponding International Application No. PCT/US2023/019756.

(Continued)

*Primary Examiner* — Vishal Pancholi
(74) *Attorney, Agent, or Firm* — Harness, Dickey & Pierce, P.L.C.

(57) ABSTRACT

A control system includes a cleaner dispensing system and a computing device. The cleaner dispensing system includes a cleaner dispensing apparatus having a dispenser device configured to operate to dispense a cleaning composition. The cleaner dispensing system includes a cartridge configured to detachably couple with the cleaner dispensing apparatus to provide a cleaning composition held in a cartridge reservoir to the dispenser device. The cartridge includes a cartridge indicator configured to indicate a particular cartridge identifier code associated with the cartridge. The computing device is configured to detect the particular cartridge identifier code based on obtaining cartridge information from the cartridge indicator and to transmit an apparatus enable command signal to the cleaner dispensing apparatus, to cause the cleaner dispensing apparatus to selectively enable operation of at least the dispenser device, in response to a determination that the particular cartridge
(Continued)

identifier code matches an authentic cartridge identifier code.

26 Claims, 23 Drawing Sheets

(58) Field of Classification Search
CPC .... A47L 7/0014; A47L 11/03; A47L 11/4011; A47L 11/4019; A47L 9/14
See application file for complete search history.

(56) References Cited

U.S. PATENT DOCUMENTS

| | | | |
|---|---|---|---|
| 5,514,344 | A | 5/1996 | D'Agaro |
| 6,487,867 | B1 | 12/2002 | Herren |
| 6,629,332 | B2 | 10/2003 | Morgan et al. |
| 7,392,658 | B1 | 7/2008 | Hardy, III |
| 8,277,745 | B2 | 10/2012 | Mehus et al. |
| 8,840,729 | B1 | 9/2014 | Herren et al. |
| 9,289,803 | B1 | 3/2016 | Parks |
| 9,943,778 | B1 | 4/2018 | Gutierrez et al. |
| 9,975,152 | B1 | 5/2018 | McClarren |
| 10,514,182 | B1 | 12/2019 | Oviedo |
| 11,285,520 | B2 | 3/2022 | McDonald et al. |
| 12,083,238 | B1 | 9/2024 | Thompson |
| 2003/0010381 | A1 | 1/2003 | Kimbrough et al. |
| 2005/0269418 | A1 | 12/2005 | Fuller |
| 2006/0038863 | A1 | 2/2006 | Piccinino et al. |
| 2006/0237806 | A1 | 10/2006 | Martin et al. |
| 2007/0224050 | A1 | 9/2007 | Ward |
| 2008/0092926 | A1 | 4/2008 | Kimball et al. |
| 2009/0064698 | A1 | 3/2009 | Spanger |
| 2009/0165868 | A1 | 7/2009 | Pearson |
| 2010/0147876 | A1 | 6/2010 | Mehus et al. |
| 2013/0146094 | A1 | 6/2013 | Riefenstein et al. |
| 2014/0109988 | A1 | 4/2014 | Oakner et al. |
| 2015/0048034 | A1 | 2/2015 | Reinolds |
| 2017/0045282 | A1 | 2/2017 | Thornberry, Jr. |
| 2018/0112889 | A1 | 4/2018 | Barker et al. |
| 2018/0259222 | A1 | 9/2018 | Murphy |
| 2019/0337027 | A1 | 11/2019 | Raynes, II |
| 2019/0353367 | A1 | 11/2019 | Atchison |
| 2020/0181898 | A1 | 6/2020 | Huitron |
| 2020/0353512 | A1 | 11/2020 | Fomine |
| 2021/0239356 | A1 | 8/2021 | Thompson |

FOREIGN PATENT DOCUMENTS

| | | | |
|---|---|---|---|
| WO | 2012/164289 | A1 | 12/2012 |
| WO | WO-2022/062310 | A1 | 3/2022 |

OTHER PUBLICATIONS

International Preliminary Report on Patentability issued May 27, 2025 for corresponding International Application No. PCT/US2023/019756.

CLEANER DISPENSING SYSTEM CARTRIDGE AUTHENTICATION AND CONTROL

CROSS-REFERENCE TO RELATED APPLICATION

This application is a continuation application of U.S. application Ser. No. 18/061,248 filed in the United States Patent and Trademark Office on Dec. 2, 2022, the entire contents of which are incorporated herein by reference in their entirety.

BACKGROUND

Field

The present disclosure relates generally to cleaning dispenser systems to dispense cleaning compositions into air-conditioning systems, and more particularly to selectively control operation of dispenser devices of cleaning dispenser systems based on authenticating cartridges used to provide cleaning composition to the dispenser devices.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, a control system may include a cleaner dispensing system and a computing device. The cleaner dispensing system may be configured to dispense a cleaning composition. The cleaner dispensing system may include a cleaner dispensing apparatus including a dispenser device configured to operate to dispense the cleaning composition through an apparatus outlet. The cleaner dispensing apparatus may be configured to selectively enable and inhibit operation of at least the dispenser device. The cleaner dispensing system may include a cartridge configured to hold the cleaning composition within a cartridge reservoir of the cartridge. The cartridge may be configured to detachably couple with the cleaner dispensing apparatus to provide the cleaning composition held in the cartridge reservoir to the dispenser device. The cartridge may include a cartridge indicator that is configured to indicate a particular cartridge identifier code that is associated with the cartridge. The computing device may include a memory storing a program of instructions, and a processor. The processor may be configured to execute the program of instructions to detect the particular cartridge identifier code that is indicated by the cartridge indicator of the cartridge based on obtaining cartridge information from the cartridge indicator. The processor may be configured to execute the program of instructions to transmit an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code.

The cleaner dispensing apparatus may be further configured to set a counter value of a counter to an initial counter value in response to the selectively enabling the operation of the dispenser device, operate the dispenser device, subsequently to the selectively enabling the operation of at least the dispenser device, to dispense the cleaning composition received at the dispenser device from the cartridge reservoir, increment the counter value in response to each operation of the dispenser device to dispense the cleaning composition to the apparatus outlet, and selectively inhibit operation of at least the dispenser device, in response to a determination that the counter value at least meets a first threshold counter value associated with depletion of the cleaning composition in the cartridge reservoir of the cartridge.

The cleaner dispensing apparatus may be further configured to transmit a warning signal to the computing device in response to a determination that the counter value at least meets a second threshold counter value, the second threshold counter value being between the initial counter value and the first threshold counter value. The processor of the computing device may be configured to execute the program of instructions to transmit an order command signal to a remote system via a network communication link to cause at least one new cartridge to be delivered to a physical mailing address that is associated with the cleaner dispensing apparatus in response to the warning signal.

The cartridge indicator may include a visible pattern that is externally visible on an outer surface of the cartridge. The computing device may include a camera device. The processor may be configured to execute the program of instructions to obtain the cartridge information from the cartridge indicator based on controlling the camera device to generate an image of the visible pattern, and detect the particular cartridge identifier code based on processing the image of the visible pattern.

The visible pattern may be a quick response (QR) code.

The cartridge indicator may include a near-field communication (NFC) device that is configured to transmit an NFC signal that indicates the particular cartridge identifier code in response to an NFC field. The computing device may include one or more NFC communication interfaces, the one or more NFC communication interfaces collectively configured to generate the NFC field and to receive the NFC signal transmitted by the NFC device in response to the NFC field. The processor may be configured to execute the program of instructions to obtain the cartridge information from the cartridge indicator based on causing the one or more NFC communication interfaces of the computing device to collectively generate the NFC field and receive the NFC signal transmitted by the NFC device in response to the NFC field, and detect the particular cartridge identifier code based on processing the NFC signal.

The determination that the particular cartridge identifier code matches the authentic cartridge identifier code may include a comparison of the particular cartridge identifier code with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

The processor may be configured to execute the program of instructions to receive the one or more authentic cartridge identifier codes from a remote system via a network communication link and store the database including the one or more authentic cartridge identifier codes in the memory of the computing device, and compare the particular cartridge identifier code with the one or more authentic cartridge identifier codes that are stored in the database at the computing device.

At least one of the computing device or a remote system may be configured to de-authenticate the authentic cartridge identifier code based on the apparatus enable command signal being transmitted to the cleaner dispensing apparatus.

The control system may further include a remote system storing the database. The processor may be configured to execute the program of instructions to cause the computing device to transmit an authentication request signal that indicates the particular cartridge identifier code to the remote system via a network communication link. The remote system may be configured to compare the particular cartridge identifier code with the one or more authentic cartridge identifier codes that are stored in the database to determine that the particular cartridge identifier code matches at least the authentic cartridge identifier code from among the one or more authentic cartridge identifier codes, in response to receiving and processing the authentication request signal. The remote system may be configured to transmit an authentication confirmation signal to the computing device in response to determining that the particular cartridge identifier code matches at least the authentic cartridge identifier code. The processor may be further configured to execute the program of instructions to determine that the particular cartridge identifier code matches the authentic cartridge identifier code in response to processing the authentication confirmation signal received from the remote system.

The processor may be configured to execute the program of instructions to determine that the particular cartridge identifier code matches the authentic cartridge identifier code in response to receiving the authentication confirmation signal within a particular period of time elapsed from a time at which the computing device transmits the authentication request signal to the remote system.

According to some example embodiments, a computing device may be to implement authenticated control of a cleaner dispensing system that is configured to dispense a cleaning composition. The cleaner dispensing system may include a cartridge and a cleaner dispensing apparatus. The cartridge may be configured to hold the cleaning composition within a cartridge reservoir of the cartridge. The cleaner dispensing apparatus may include a dispenser device. The cartridge may be configured to detachably couple with the cleaner dispensing apparatus to provide the cleaning composition held in the cartridge reservoir to the dispenser device. The cleaner dispensing apparatus may be configured to operate the dispenser device to dispense the cleaning composition through an apparatus outlet. The cleaner dispensing apparatus may be configured to selectively enable and inhibit operation of at least the dispenser device. The cartridge may include a cartridge indicator that is configured to indicate a particular cartridge identifier code that is associated with the cartridge. The computing device may include a memory storing a program of instructions, and a processor. The processor may be configured to execute the program of instructions to detect the particular cartridge identifier code that is indicated by the cartridge indicator of the cartridge based on obtaining cartridge information from the cartridge indicator. The processor may be configured to execute the program of instructions to transmit an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code.

The processor may be configured to execute the program of instructions to transmit an order command signal to a remote system via a network communication link to be delivered to a physical mailing address that is associated with the cleaner dispensing apparatus in response to receiving and processing a warning signal from the cleaner dispensing apparatus, the warning signal indicating that the cartridge reservoir of the cartridge contains an amount of the cleaning composition that is equal to or less than a threshold amount.

The computing device may further include a camera device. The processor may be configured to execute the program of instructions to obtain the cartridge information from the cartridge indicator based on controlling the camera device to generate an image of a visible pattern that is externally visible on an outer surface of the cartridge, the visible pattern associated with the cartridge indicator. The processor may be configured to execute the program of instructions to detect the particular cartridge identifier code based on processing the image of the visible pattern.

The visible pattern may be a quick response (QR) code.

The computing device may further include one or more NFC communication interfaces, the one or more near-field communication (NFC) communication interfaces collectively configured to generate an NFC field. The cartridge indicator may be an NFC device that is configured to transmit an NFC signal that indicates the particular cartridge identifier code in response to the NFC field. The one or more NFC communication interfaces may be further collectively configured to receive the NFC signal transmitted by the NFC device in response to the NFC field. The processor may be configured to execute the program of instructions to obtain the cartridge information from the cartridge indicator based on causing the one or more NFC communication interfaces of the computing device to collectively generate the NFC field and receive the NFC signal transmitted by the NFC device in response to the NFC field. The processor may be configured to execute the program of instructions to detect the particular cartridge identifier code based on processing the NFC signal.

The determination that the particular cartridge identifier code matches the authentic cartridge identifier code may include a comparison of the particular cartridge identifier code with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

The processor may be configured to execute the program of instructions to cause the authentic cartridge identifier code to be de-authenticated based on the apparatus enable command signal being transmitted to the cleaner dispensing apparatus.

The processor may be configured to execute the program of instructions to receive the one or more authentic cartridge identifier codes from a remote system via a network communication link and store the database including the one or more authentic cartridge identifier codes in the memory of the computing device. The processor may be configured to execute the program of instructions to compare the particular cartridge identifier code with the one or more authentic cartridge identifier codes that are stored in the database at the computing device.

The processor may be configured to execute the program of instructions to cause the computing device to transmit an authentication request signal that indicates the particular cartridge identifier code to a remote system via a network communication link, the remote system storing the database. The processor may be configured to execute the program of instructions to determine that the particular cartridge identifier code matches the authentic cartridge identifier code in response to processing an authentication confirmation signal received from the remote system to determine that the particular cartridge identifier code is determined at the remote system to match at least the authentic cartridge identifier code from among the one or more authentic cartridge identifier codes in the database at the remote system.

The processor may be configured to execute the program of instructions to determine that the particular cartridge identifier code matches the authentic cartridge identifier code in response to receiving the authentication confirmation signal within a particular period of time elapsed from a time at which the computing device transmits the authentication request signal to the remote system.

According to some example embodiments, a method performed by a computing device may include detecting a particular cartridge identifier code that is indicated by a cartridge indicator of a cartridge of a cleaner dispensing system based on controlling a detection device of the computing device to obtain cartridge information from the cartridge indicator. The cleaner dispensing system may include the cartridge and a cleaner dispensing apparatus. The cartridge may be configured to hold a cleaning composition within a cartridge reservoir of the cartridge. The cleaner dispensing apparatus may include a dispenser device. The cartridge may be configured to detachably couple with the cleaner dispensing apparatus to provide the cleaning composition held in the cartridge reservoir to the dispenser device. The cleaner dispensing apparatus may be configured to operate the dispenser device to dispense the cleaning composition through an apparatus outlet. The cleaner dispensing apparatus may be configured to selectively enable and inhibit operation of at least the dispenser device. The particular cartridge identifier code may be associated with the cartridge. The method may include transmitting an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code.

The method may further include transmitting an order command signal to a remote system via a network communication link to be delivered to a physical mailing address that is associated with the cleaner dispensing apparatus in response to receiving and processing a warning signal from the cleaner dispensing apparatus, the warning signal indicating that the cartridge reservoir of the cartridge contains an amount of the cleaning composition that is equal to or less than a threshold amount.

The detecting the particular cartridge identifier code may be based on obtaining the cartridge information from the cartridge indicator based on controlling a camera device of the computing device to generate an image of a visible pattern that is externally visible on an outer surface of the cartridge, the visible pattern associated with the cartridge indicator, and processing the image of the visible pattern to detect the particular cartridge identifier code.

The visible pattern may be a quick response (QR) code.

The detecting the particular cartridge identifier code may be based on controlling one or more near-field communication (NFC) communication interfaces of the computing device to generate an NFC field, obtaining the cartridge information from the cartridge indicator based on receiving, at the one or more NFC communication interfaces of the computing device, an NFC signal generated by the cartridge indicator in response to the NFC field, wherein the cartridge indicator is an NFC device that is configured to transmit the NFC signal in response to the NFC field, and processing the NFC signal at the computing device to detect the particular cartridge identifier code.

The determination that the particular cartridge identifier code matches the authentic cartridge identifier code may include a comparison of the particular cartridge identifier code with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

The method may further include de-authenticating the authentic cartridge identifier code based on the apparatus enable command signal being transmitted to the cleaner dispensing apparatus.

The determination that the particular cartridge identifier code matches the authentic cartridge identifier code may include transmitting an authentication request signal that indicates the particular cartridge identifier code to a remote system via a network communication link, the remote system storing a database including one or more authentic cartridge identifier codes, the one or more authentic cartridge identifier codes including the authentic cartridge identifier code, and determining that the particular cartridge identifier code matches the authentic cartridge identifier code in response to processing an authentication confirmation signal received from the remote system to determine that the particular cartridge identifier code is determined at the remote system to match at least the authentic cartridge identifier code from among the one or more authentic cartridge identifier codes in the database at the remote system.

The method may further include determining that the particular cartridge identifier code matches the authentic cartridge identifier code in response to receiving the authentication confirmation signal within a particular period of time elapsed from a time at which the authentication request signal is transmitted to the remote system.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1A:
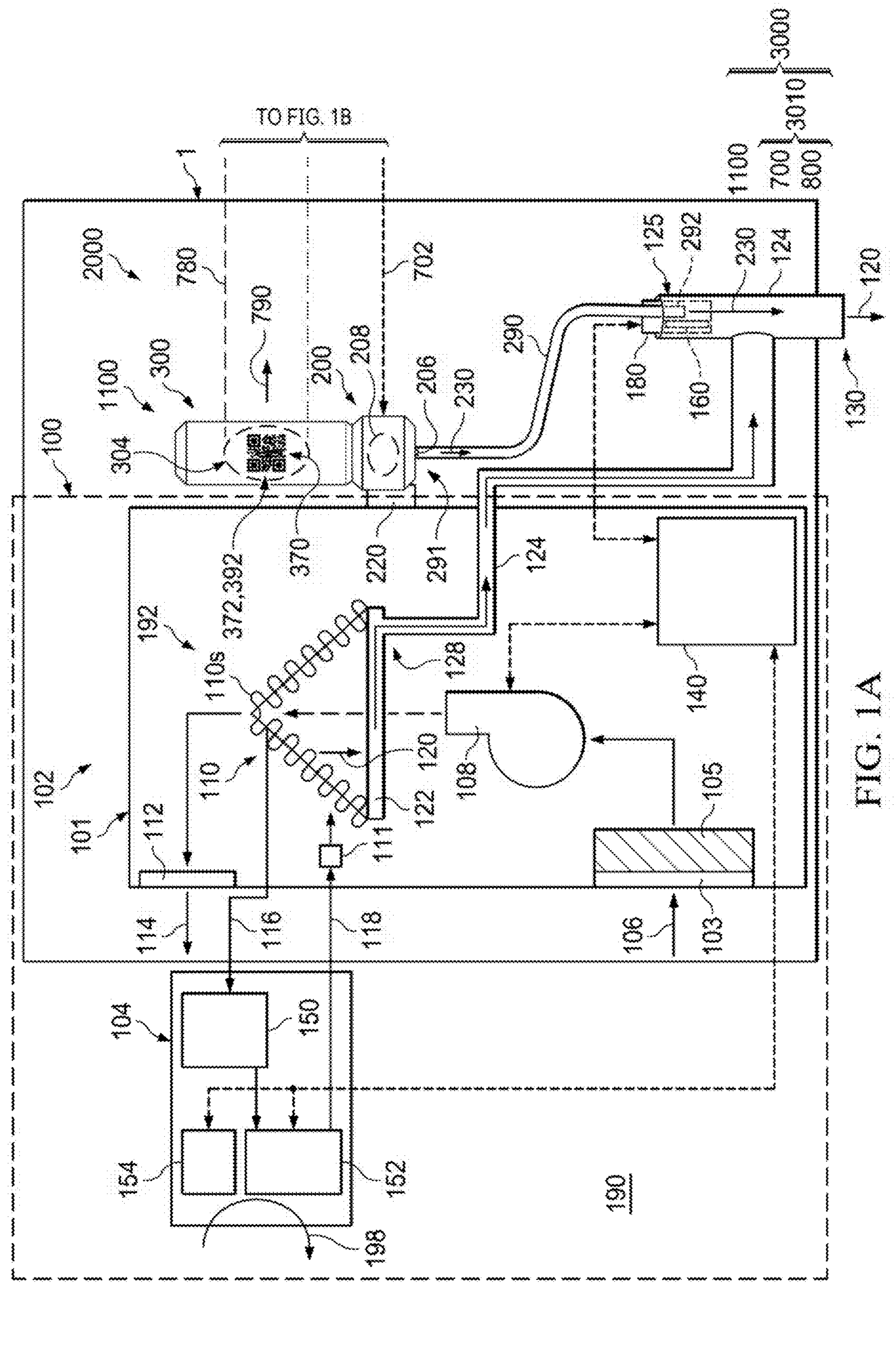
FIGS. 1A and 1B are schematic views of an air-conditioning system, a cleaner dispensing system, and an authentication control system, according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular." "parallel." "flush," or the like with regard to other elements and/or properties thereof (e.g., structures, surfaces, directions, or the like) may be "perpendicular," "parallel," "flush." or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel." or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIGS. 1A are 1B are schematic views of an air conditioning system 100 and a control system 3000 that includes a cleaner dispensing system 1100 and an authentication and control system 3010, according to some example embodiments. FIGS. 2A, 2B, 2C, and 2D are schematic views of a cleaner dispensing system including a cleaner dispensing apparatus and a cartridge, and a computing device and remote system, according to some example embodiments. FIG. 2E is a perspective view of a cleaner dispensing system including a cleaner dispensing apparatus and a cartridge, according to some example embodiments. FIG. 2F is a perspective view of a cartridge for a cleaner dispensing system, according to some example embodiments.

Figure 1B:
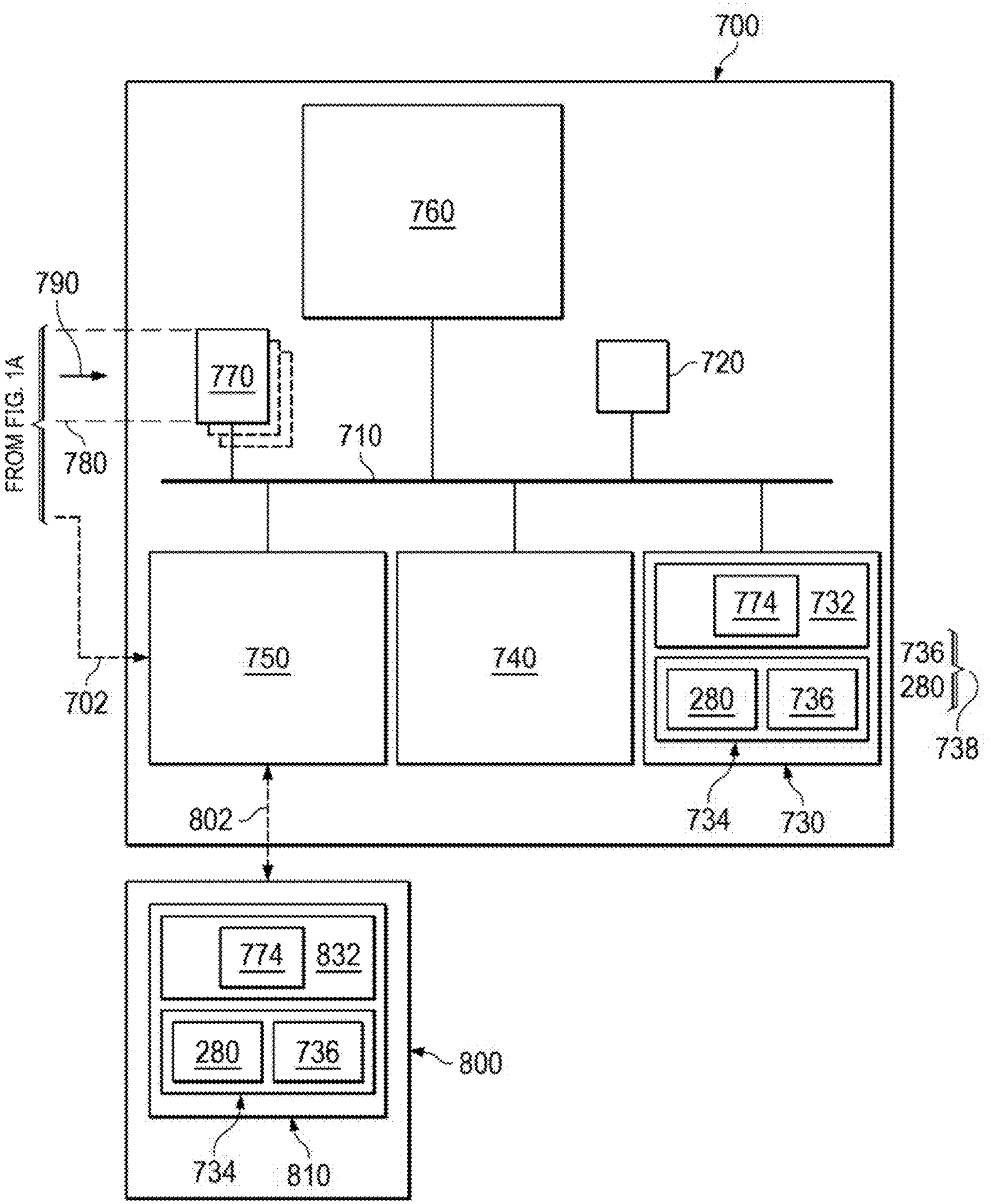

Referring to FIGS. 1A and 1B, the air conditioning system 100, which may be interchangeably referred to as an air conditioning system, air conditioner, or the like, may be configured to provide cooling of air within an interior of a structure 1 and may be at least partially located within the structure 1, but example embodiments are not limited thereto. The air conditioning system 100 may be included as a part of a Heating, ventilation, and air conditioning (HVAC) system, but example embodiments are not limited thereto, and in some example embodiments the air conditioning system 100 may be separate from any heating system.

Referring to FIGS. 1A and 1B, the air conditioning system 100 may include an air handler 102 and a condenser assembly 104 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler 102 may include, within a housing 101 that may at least partially comprise metal (e.g., steel) and at least define an interior 192 space, an air intake 103, an air filter 105, an air mover 108 (e.g., fan, blower, etc.), a heat exchanger 110 (e.g., evaporator coil), an expansion valve 111, a drip pan 122, a condensate drain line 124 (also referred to herein as a condensate drain conduit, condensate drain pipe, etc.), a controller 140, a float switch 160, and an air outlet 112. The condenser assembly 104 may include a compressor 150, a second heat exchanger 152 (e.g., condenser coil), and an air mover 154 (e.g., fan, blower, etc.).

It will be understood that example embodiments of an air conditioning system, air handler, condenser assembly, or the like may have different arrangements of devices therein and may omit or add to the aforementioned elements of the air conditioning system 100 as shown in FIGS. 1A and 1B. It will be understood, for example, that elements shown as being included in the air handler 102 may in some example embodiments be located in the condenser assembly 104 (e.g., the controller 140 may be located in the condenser assembly 104 instead of the air handler 102). As shown, the condenser assembly 104 may be located external to the structure 1 while the air handler 102 is located internal to the structure 1, but example embodiments are not limited thereto.

In some example embodiments, the air conditioning system 100 may draw return air 106 into the air handler 102 via the air intake 103 and through the air filter 105, where the air filter 105 may be any known air filter that is configured to remove some matter (e.g., particulate matter, including dust) from the return air 106. The air mover 108 (e.g., blower) may induce the flow of air into, through, and out of, the air handler 102. The air mover 108 may cause return air 106 to be drawn through the air filter 105 to remove some matter and may move (e.g., blow) the return air 106 through the air mover 108 and to the heat exchanger 110. The return air 106 may flow in thermal communication with (e.g., in contact with outer surfaces of) one or more coils of the heat exchanger 110 so that heat is removed from the return air 106 to cool the return air 106 into conditioned air 114. The air handler 102 may move the conditioned air 114 out of the air handler 102 and back into an interior space of the structure 1 via the air outlet 112.

The air conditioning system 100 may circulate a working fluid (e.g., a refrigerant, including known R22 refrigerant, R410A refrigerant, or any known refrigerant) between the heat exchangers 110 and 152 to remove heat from the return air 106 when the return air 106 flows in thermal communication (e.g., through and/or in contact with one or more coils of) the heat exchanger 110. The heat exchanger 110 may include any known heat exchanger used for an air conditioning system, for example an evaporator coil exchanger that includes one or more coils of one or more tubes through which the working fluid flows (e.g., as a cooled liquid). The heat exchanger 110 may cause heat to be transferred from the return air 106 and into the working fluid when the return air 106 is caused to flow across (e.g., in contact with, in thermal communication with, etc.) the one or more coils (e.g., one or more outer surfaces 110*s* thereof), thereby resulting in the working fluid becoming heated (e.g., heated into a low-pressure gas). The heated working fluid may be drawn, via fluid line 116 (e.g., fluid conduit, pipe, etc.) into the condenser assembly 104.

The air conditioning system 100 may include, in the condenser assembly 104, a compressor 150 (which may be any known compressor) that induces flow of the working fluid through the air conditioning system 100. The compressor 150 may draw the heated working fluid from the fluid line 118 and may compress the heated working fluid into a high-pressure gas. The heated working fluid may pass (e.g., flow), for example as the high-pressure gas, from the compressor 150 to the heat exchanger 152 (which may be any known heat exchanger and may be referred to as a condenser coil). The air mover 154 may cause ambient air 198 from the ambient environment 190 to be drawn across (e.g., in thermal communication with) one or more tubes of the heat exchanger 152 to remove heat from the heated working fluid passing through the one or more tubes of the heat exchanger 152, thereby discharging the heat originally removed from the return air 106 into the ambient environment 190 which serves as a heat sink for the air conditioning system 100. As a result, the working fluid passing through the heat exchanger 152 may be cooled back into a liquid. The working fluid may then pass (e.g., flow, circulate, etc.) back to the air handler 102 via a fluid line 118, where the working fluid may pass through an expansion valve 111 (which may be any known expansion valve) to cool the working fluid which then passes into the heat exchanger 110 to remove additional heat from return air 106.

As noted above, the circulation of working fluid through the heat exchanger 110, heat exchanger 152, fluid lines 116 and 118, and expansion valve 111 may be induced by operation of the compressor 150.

As further shown, the air conditioning system 100 may include a controller 140 that is configured to control elements of the air conditioning system 100, including for example controlling operation of the air handler 102, condenser assembly 104, or any part thereof. As described further below, the controller 140 may be implemented by a computing device, including a memory storing a program of instructions and a processor configured to execute the program of instructions. While the controller 140 is shown as being included within the housing 101 of the air handler 102, it will be understood that the controller 140 may be located external to the housing 101 and, in some example embodiments, may be located within the condenser assembly 104 or may be attached to an exterior of the air handler 102 for ease of manual access.

Still referring to FIGS. 1A and 1B, when heat is removed from the return air 106 based on the return air 106 passing in thermal communication with the heat exchanger 110, water may condense out of the cooled return air as condensate 120 at the heat exchanger 110, for example on one or more outer surfaces 110*s* thereof. The air handler 102 may include a drip pan 122 located beneath the heat exchanger 110, and the condensate 120 may fall under gravity from the one or more outer surfaces 110*s* of the heat exchanger 110 to collect in the drip pan 122. The air handler 102 may further include a condensate drain line 124 having an inlet opening 128 coupled to the drip pan 122 (e.g., a bottom surface where the drip pan 122 has an inclined surface that is angled downwards towards the inlet opening 128 of the condensate drain line 124) and an outlet opening 130 that is external to the structure 1 and open to the ambient environment 190, as shown. Condensate 120 collected in the drip pan 122 may pass under gravity to the inlet opening 128 of the condensate drain line 124, and the condensate drain line 124 may direct the condensate 120 to flow out of the air handler 102 and out of the structure 1 to the ambient environment 190 via the outlet opening 130 of the condensate drain line 124.

As shown in FIGS. 1A and 1B, the air conditioning system 100 may include a float switch 160 that is located in the drip pan 122 and/or in the condensate drain line 124 (e.g., at an opening 125 into the condensate drain line 124 as shown). The float switch 160 may be a switch that is configured to be actuated based on backflow and/or overflow of condensate 120 in the condensate drain line 124. For example, the float switch 160 may be any known float switch and may be configured to be closed or opened (e.g., actuated) based on accumulation of condensate 120 in the drip pan 122 to at least a threshold volume held therein. The float switch 160 may be communicatively (e.g., electrically) coupled to the controller 140, and the controller 140 may be configured to shut down some or all of the air conditioning system 100 (e.g., shut down the air handler 102, the air mover 108, the compressor 150, and/or the air mover 154) in response to the float switch 160 being actuated, thereby reducing or preventing damage being caused in the structure and/or air conditioning system 100 due to the condensate 120 accumulation. As shown, the float switch 160 may be coupled to and/or included in a float switch assembly or housing 180 which may be coupled to the opening 125 of the condensate drain line 124 to position the float switch 160 within the condensate drain line 124, so that the float switch 160 is configured to be closed or opened (e.g., actuated) based on accumulation of condensate in the condensate drain line 124, wherein the controller 140 may be electrically coupled to the float switch 160, where actuation of the float switch may open or close an electrical circuit which may be detected by the controller 140 (e.g., via a current sensor or the like) and the controller 140 may be configured to shut down some or all of the air conditioning system 100 (e.g., shut down the air handler 102, the air mover 108, the compressor 150, and/or the air mover 154) in response to the float switch 160 being actuated.

In some example embodiments, various substances may accumulate on one or more outer surfaces 110*s* of one or more elements of the heat exchanger 110 (e.g., an evaporator coil through which the liquid working fluid may circulate to remove heat from the return air 106) due to condensation of condensate 120 on the one or more outer surfaces 110*s*. Such substances may include, for example, mold, algae, mildew, bacteria, and/or fungi. Such accumulation of substances on the outer surface(s) of the heat exchanger 110 elements may cause reduced heat exchange (e.g., heat transfer) performance of the heat exchanger 110 in removing heat from the return air 106. Additionally, such substances may accumulate in one or more portions of the air conditioning system 100 (e.g., the drip pan 122, the condensate drain line 124, etc.), which may clog one or more portions of the condensate removal elements (e.g., drip pan 122, condensate drain line 124, etc.) of the air handler 102, which may cause damage to the air handler 102 and/or to a structure in which the air handler 102 is included, including water damage.

Referring to FIGS. 1A and 1B and FIGS. 2A to 2D, in some example embodiments a cleaner dispensing system 1100 may be coupled to at least a portion of the air conditioning system 100, including for example an outer surface of a housing 101 of the air handler 102, an opening 125 of the condensate drain line 124, or the like. The cleaner dispensing system 1100 may be configured to dispense a cleaning composition into at least a portion of the air conditioning system 100 to clean, break down, remove, etc. various substances (e.g., mold, algae, mildew, bacteria, and/or fungi) that may be accumulated in the portion of the air conditioning system 100. For example, as shown in FIGS. 1A and 1B, the cleaner dispensing system 1100 may be coupled (e.g., directly or via a conduit 290) to an opening 125 of the condensate drain line 124 to be configured to dispensing cleaning composition 230 into the condensate drain line 124 via the opening 125 thereof to clean, break down, remove, etc. various substances (e.g., mold, algae, mildew, bacteria, and/or fungi) that may be accumulated in the condensate drain line 124, thereby reducing the risk of backflow of condensate in the condensate drain line 124 which might cause overflow of condensate in the air conditioning system 100 and/or structure 1, thereby improving operational performance of the air conditioning system 100 and reducing the risk for damage to the air conditioning system 100 and/or structure 1 due to condensate backflow in the condensate drain line 124.

It will be understood that the cleaner dispensing system 1100 may be configured to dispense the cleaning composition 230 into other parts of the air conditioning system 100. For example, the cleaner dispensing system 1100 may include a conduit and spray nozzle extending from the cleaner dispensing system 1100 into an interior of the air handler 102 such that the cleaner dispensing system 1100 is configured to dispense the cleaning composition 230 into the interior of the air handler 102 to contact one or more outer surfaces of the heat exchanger 110 to clean, break down, remove, etc. various substances (e.g., mold, algae, mildew, bacteria, and/or fungi) that may be accumulated on the one or more outer surfaces of the heat exchanger 110, thereby improving heat transfer performance of the heat exchanger 110 (e.g., between the working fluid in the heat exchanger 110 coils and the return air 106 passing in thermal communication with the heat exchanger 110) and thus improve operational efficiency and/or performance of the air conditioning system 100 at least with regards to cooling the return air 106. As described herein, "dispensing" cleaning composition may include supplying the cleaning composition via operating a pump (e.g., "pumping"), actuating one or more actuators and/or valves, or any combination thereof.

In some example embodiments, the cleaner dispensing system 1100 may be configured to dispense (e.g., pump, spray, etc.) the cleaning composition 230 into at least a portion of the air conditioning system 100 without human intervention (e.g., automatically), for example to dispense discrete amounts (e.g., a particular amount, which may be a particular volume and/or particular mass) of the cleaning composition at a particular (or, alternatively, predetermined) fixed time interval, thereby reducing or preventing accumulation of the various substances in one or more portions of the air conditioning system 100 while reducing or minimizing human intervention and/or effort expended to implement the dispensing. Because the cleaner dispensing system 1100 is configured to dispense the cleaning composition (e.g., repeatedly at a fixed time interval) without human intervention, the accumulation of potential substances (e.g., mold, algae, mildew, bacteria, and/or fungi) in one or more portions of the air conditioning system 100 (e.g., in the condensate drain line 124, on one or more outer surfaces of the heat exchanger 110, etc.) may be reduced, removed, or prevented. Such reduction, removal, or prevention of substance accumulation in the air conditioning system 100 may thereby improve overall efficiency and/or performance of the air conditioning system 100, at least with regard to cooling the return air 106, and may further reduce or prevent the likelihood of condensate 120 backup and/or overflow which might otherwise result in shutdown of at least the air handler 102 and/or air conditioning system 100, flooding damage to the air handler 102 and/or structure in which the air handler 102 is located, or the like. Because human intervention is not required to implement the dispensing (of the cleaning composition, particularly dispensing of the cleaning composition repeatedly at a fixed time interval, the likelihood of such accumulation resulting in significant reduction in air conditioning system performance and/or efficiency, and/or resulting in damage to at least one of the air conditioning system 100 or the structure 1, due to a missed or forgotten manual dispensing of cleaning composition by a human operator is reduced or prevented, thereby improving operational performance and/or efficiency of the air conditioning system 100 and reducing workload by a human operator.

As shown in FIGS. 1A and 1B and FIGS. 2A to 2E, the cleaner dispensing system 1100 may include a cleaner dispensing apparatus 200 and a cartridge 300 that is configured to be coupled (e.g., detachably coupled) to the cleaner dispensing apparatus 200. As described herein, the cleaner dispensing apparatus 200 may include a dispenser device that is configured to operate (e.g., actuate as a valve, operate as a pump, etc.) to dispense an amount of a cleaning composition through an apparatus outlet of the cleaner dispensing apparatus 200, and the cartridge 300 may be configured to hold cleaning composition within a cartridge reservoir 304 of the cartridge 300 and may be further configured to detachably couple with the cleaner dispensing apparatus 200 to provide the cleaning composition 230 held in the cartridge reservoir 304 to the dispenser device of the cleaner dispensing apparatus 200.

Referring to FIGS. 1A and 1B and FIGS. 2A to 2D, the cleaner dispensing apparatus 200 is configured to dispense (also referred to herein as supply, pump, drive, or the like) a cleaning composition 230 through an apparatus outlet 240 based on operation of a dispenser device 208 thereof, where the cleaning composition 230 to be dispensed by the dispenser device 208 may be received at an inlet 208*i* of the dispenser device 208 from a cartridge reservoir 304 of a cartridge 300 that is detachably coupled to the cleaner dispensing apparatus 200.

Referring to FIGS. 2A to 2E, the cleaner dispensing apparatus 200 may include a housing 201 at least partially defining an interior of the cleaner dispensing apparatus 200, an apparatus reservoir 202 (which may be at least partially defined by the housing 201) and which is configured to at least partially accommodate and hold a cartridge 300 configured to hold the cleaning composition 230 therein, an apparatus outlet 240, an internal reservoir 206, and a dispenser device 208 that is configured to be actuated (e.g., operated) to selectively dispense (also referred to interchangeably as "pump," "supply." "provide," etc.) an amount (e.g., a particular amount, which may be a particular volume and/or a particular mass) of the cleaning composition 230 from an inlet 208*i* of the dispenser device 208 (which may be open, such as directly exposed to, the internal reservoir 206) to the apparatus outlet 240 extending through the housing 201 via the outlet 2080 of the dispenser device 208.

Figure 2A:
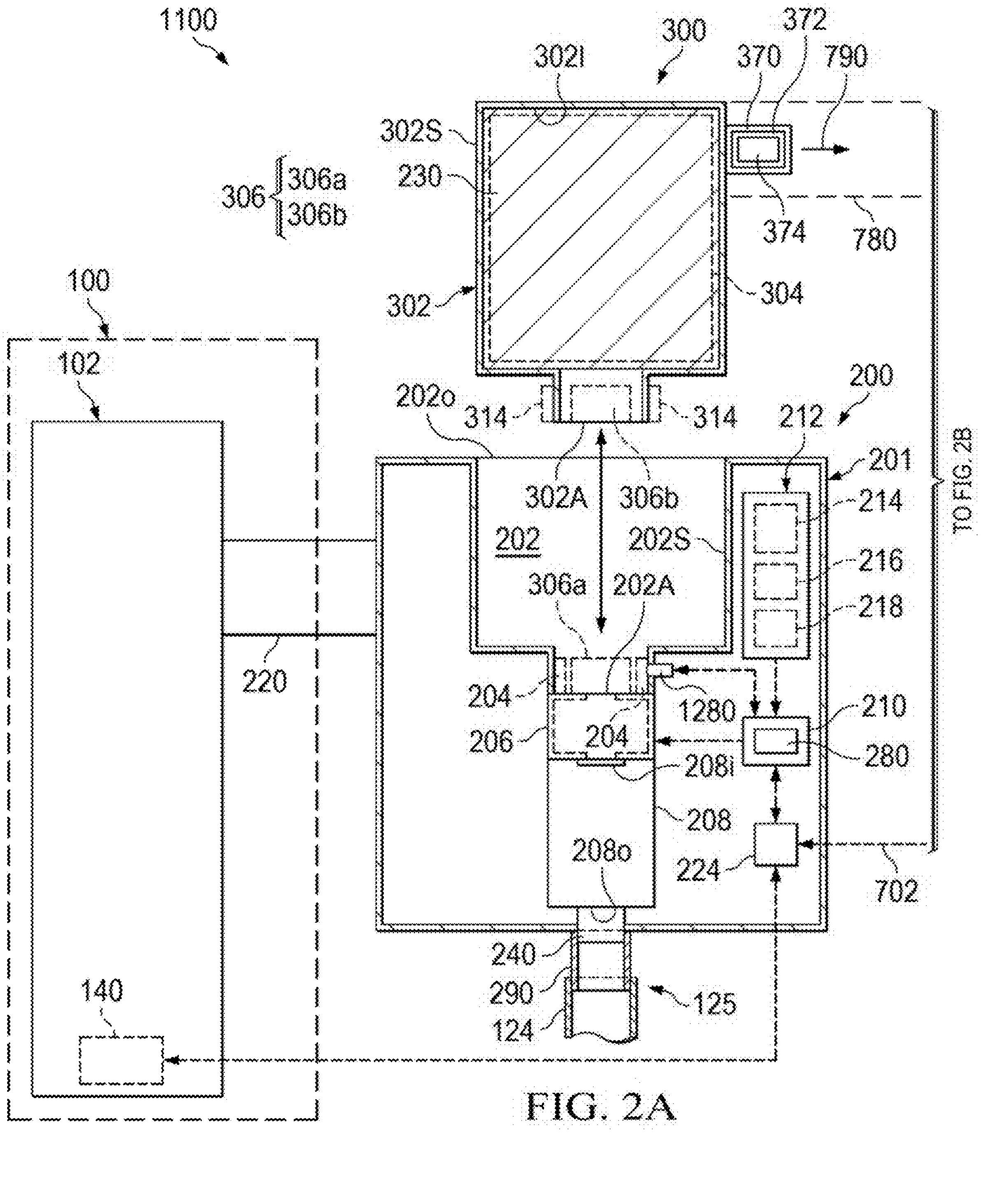
FIGS. 2A, 2B, 2C, and 2D are schematic views of a cleaner dispensing system including a cleaner dispensing apparatus and a cartridge, and a computing device and remote system, according to some example embodiments.
Figure 2B:
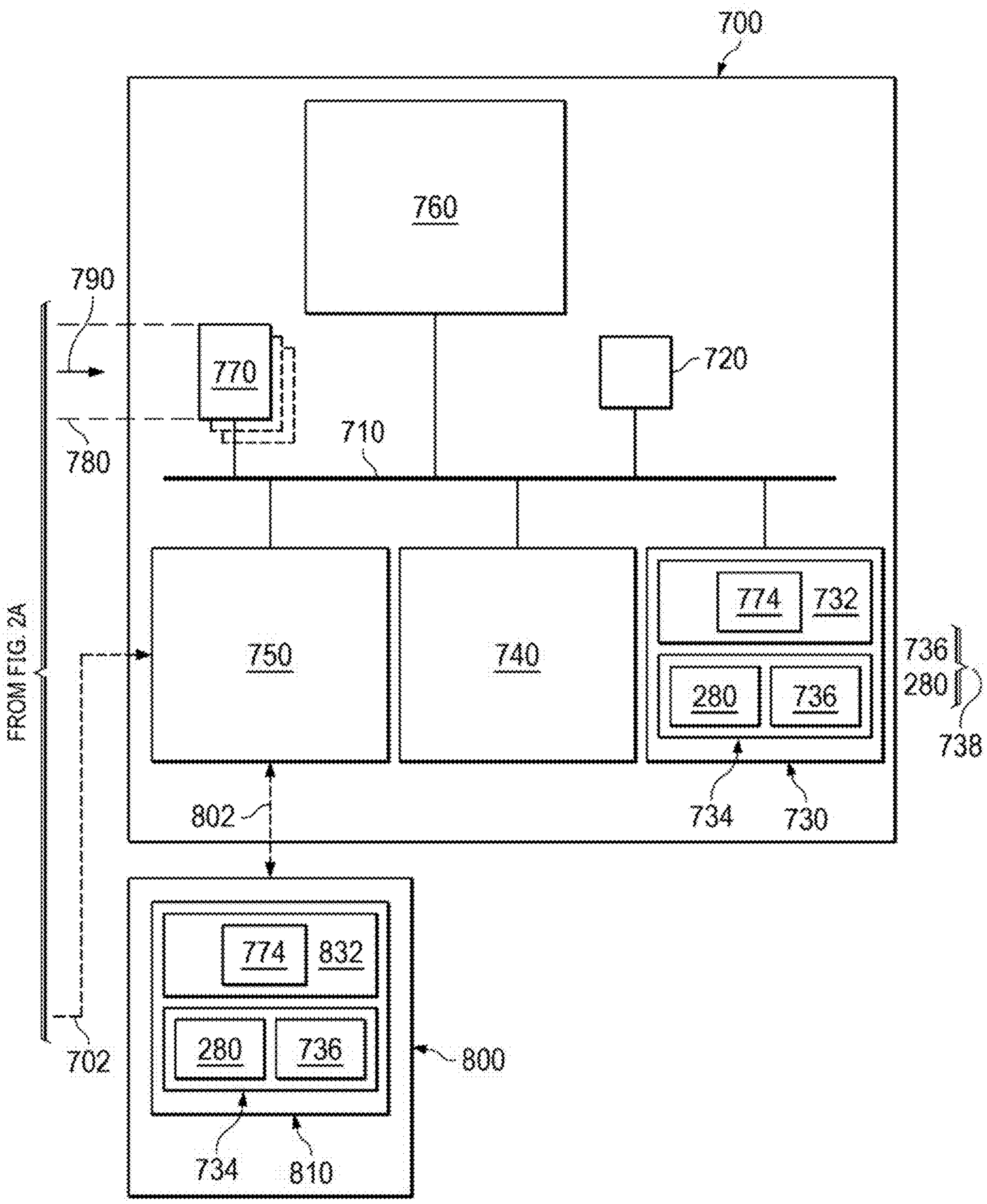
Figure 2C:
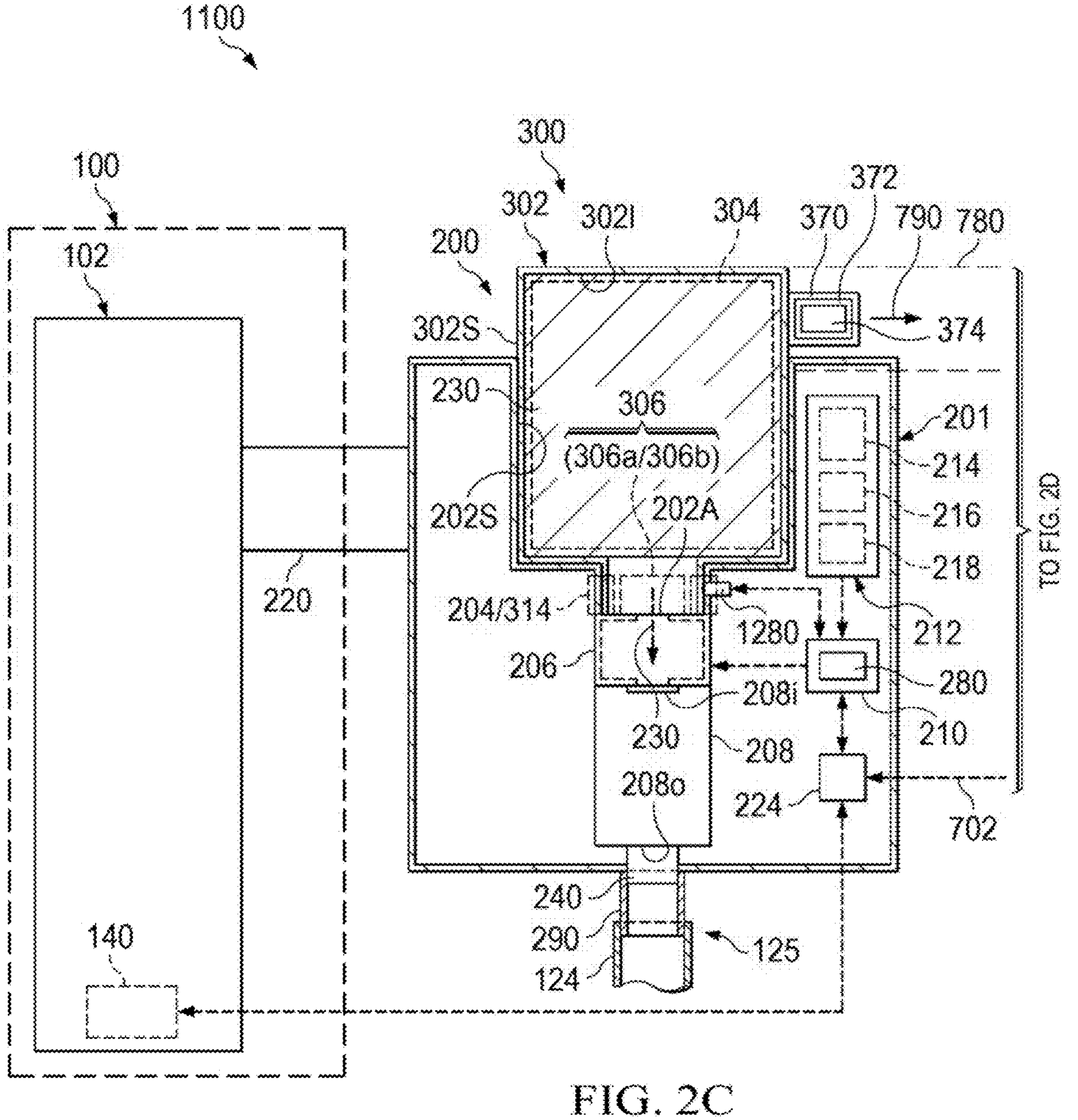
Figure 2D:
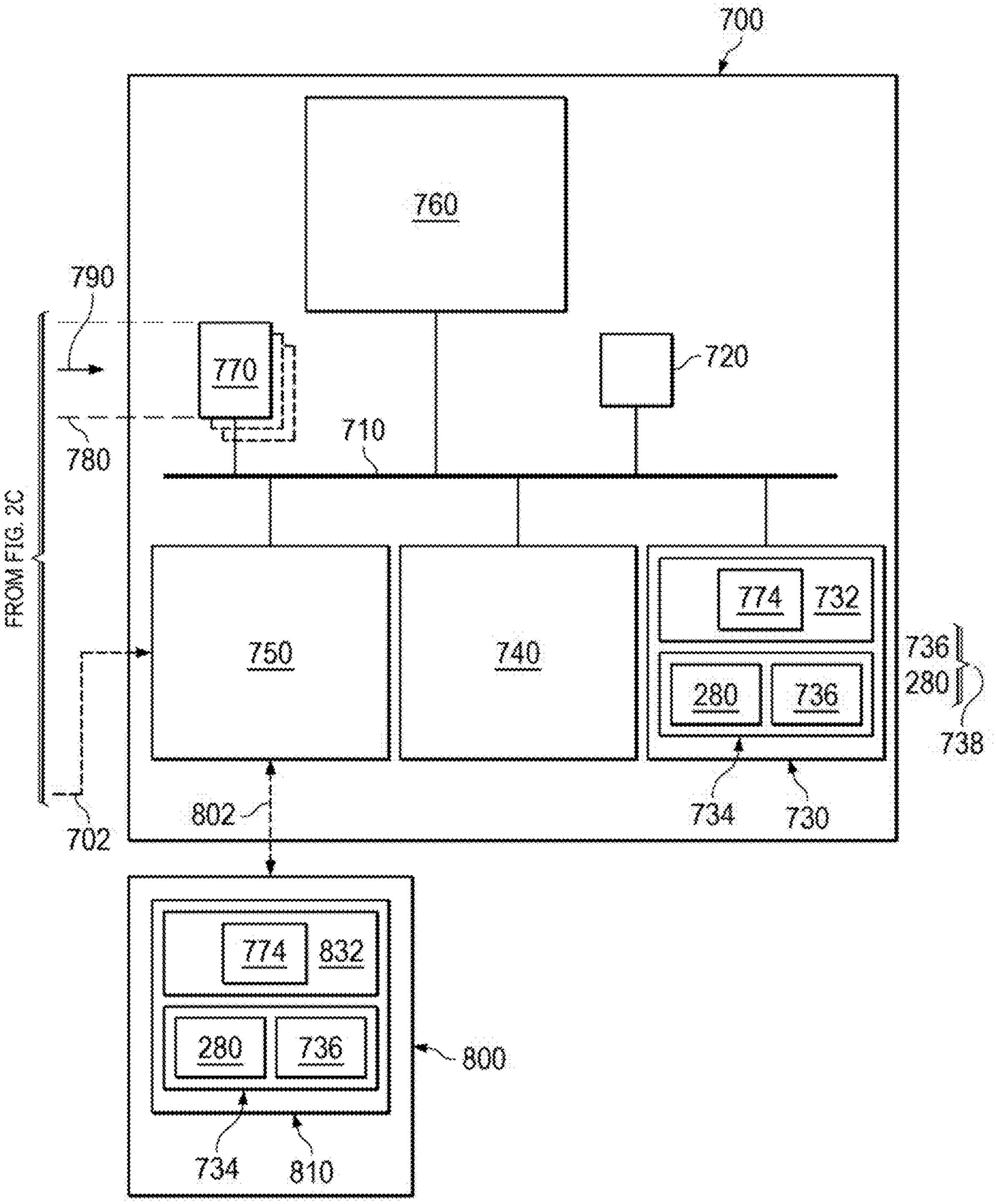
Figure 2E:
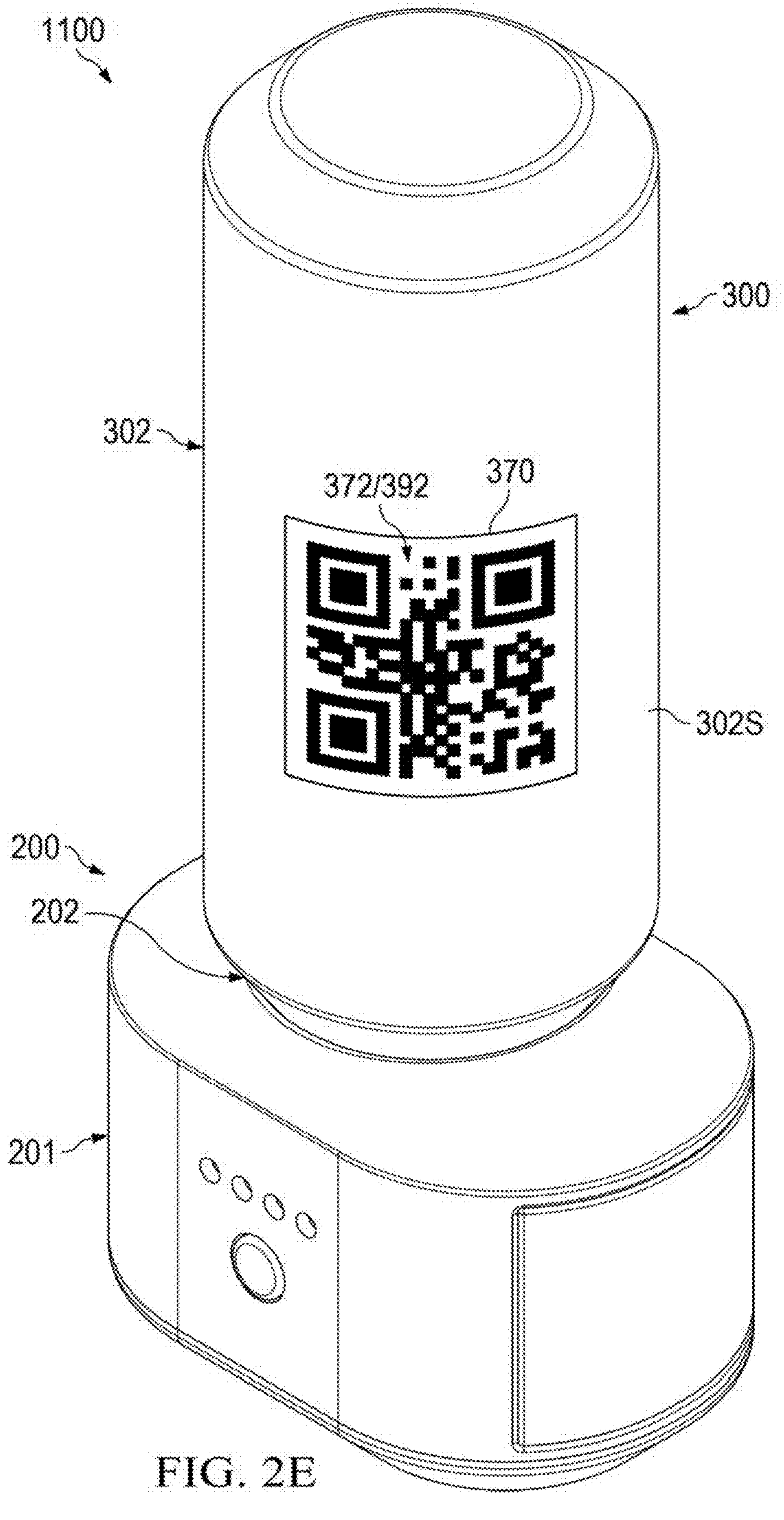
FIG. 2E is a perspective view of a cleaner dispensing system including a cleaner dispensing apparatus and a cartridge, according to some example embodiments.
Figure 2F:
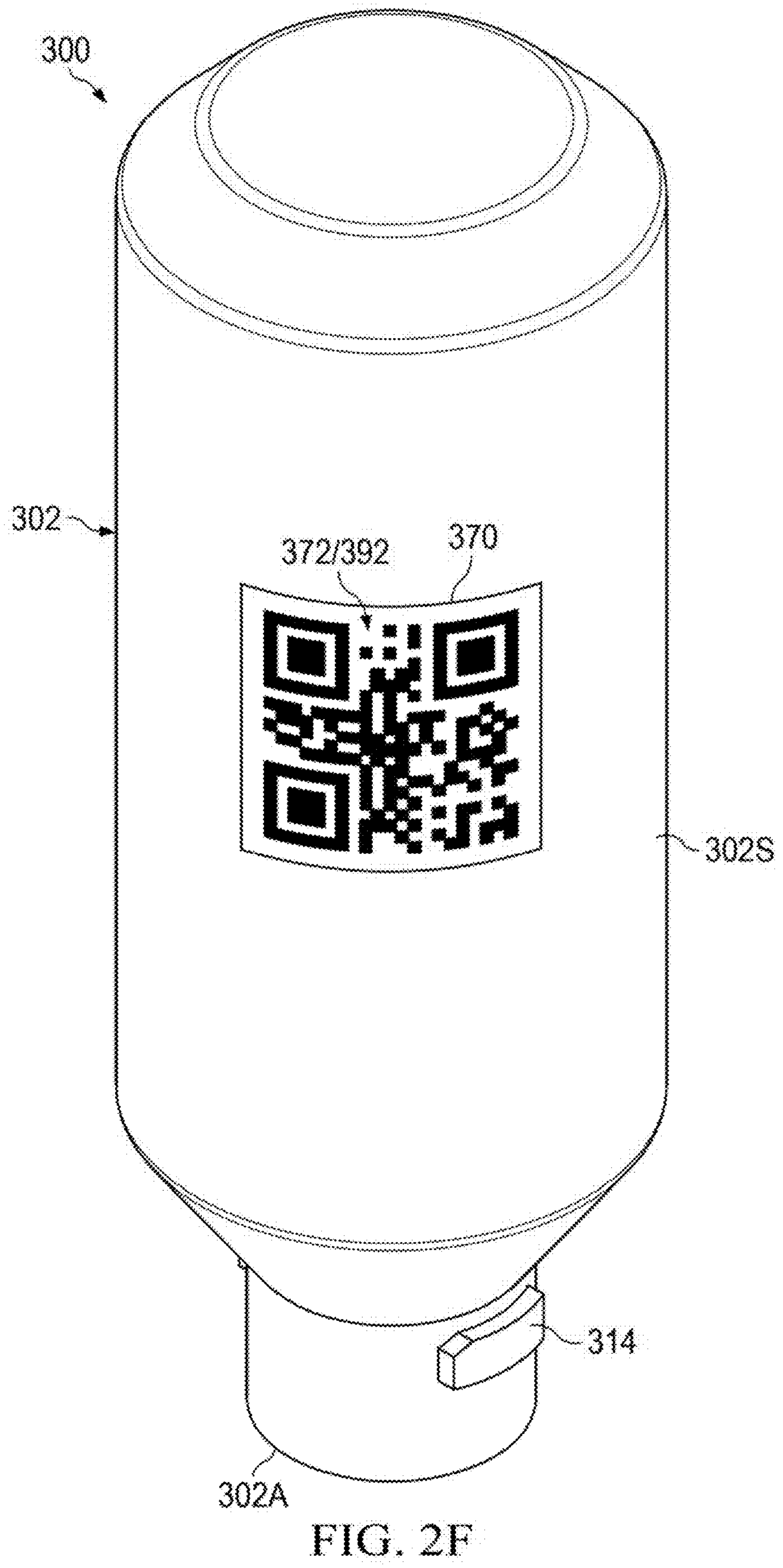
FIG. 2F is a perspective view of a cartridge for a cleaner dispensing system, according to some example embodiments.

As shown in FIGS. 2A and 2B, the apparatus reservoir 202 (which may be at least partially defined by one or more surfaces of the housing 201) may include an inner surface 202S at least partially defining an interior volume space in which a cartridge 300 may be at least partially accommodated and held. The apparatus reservoir 202 may further include an apparatus reservoir outlet 202A that is configured to be in fluid communication with the dispenser device 208 to enable cleaning composition 230 to flow from the apparatus reservoir 202 to the dispenser device 208 when the cartridge 300 is coupled to the cleaner dispensing apparatus 200. For example, the apparatus reservoir outlet 202A may be open to the internal reservoir 206, such that the apparatus reservoir outlet 202A is configured to establish fluid communication from the apparatus reservoir 202 to the dispenser device 208 inlet 208*i* via the internal reservoir 206. In some example embodiments, where the internal reservoir 206 is omitted from the cleaner dispensing apparatus 200, the apparatus reservoir outlet 202A may be open to the inlet 208*i* of the dispenser device 208 (e.g., directly, wherein the inlet 208*i* is the same as the apparatus reservoir outlet 202A, or via a conduit), such that the apparatus reservoir outlet 202A is configured to establish fluid communication from the apparatus reservoir 202 to the dispenser device 208 inlet 208*i* via the internal reservoir 206.

Still referring to FIGS. 1A and 1B and FIGS. 2A to 2F, the cleaner dispensing system 1100 may include both the cleaner dispensing apparatus 200 and a cartridge 300, also referred to interchangeably as a "cleaner cartridge." "cleaning composition cartridge." or the like according to some example embodiments. In some example embodiments, the cleaner dispensing apparatus 200 may be configured to receive and couple with a cartridge 300 that contains (e.g., holds) the cleaning composition 230 within a cartridge reservoir 304 such that a flow path is established between the cartridge reservoir 304 and the dispenser device 208. The cartridge 300 may be provided instead of the cleaning composition 230 being poured into, and directly held within, the apparatus reservoir 202 in contact with the inner surface 202S thereof. Replenishment of the cleaning composition 230 held in the cleaner dispensing apparatus 200 may be simplified based on the cleaning composition 230 being held in the cartridge 300 which is coupled (e.g., detachably coupled) with the cleaner dispensing apparatus 200 to position the cartridge reservoir 304 in fluid communication with at least the inlet 208*i* of the dispenser device 208, as replenishment of the total cleaning composition 230 held in the cleaner dispensing system 1100 (e.g., in the cleaner dispensing apparatus 200) may involve replacing a cartridge 300 that is coupled (e.g., detachably coupled) to the cleaner dispensing apparatus 200 based on being inserted into the apparatus reservoir 202 instead of directly pouring the cleaning composition 230 directly into the apparatus reservoir 202. Such simplification may include reducing or preventing inadvertent spilling of cleaning composition 230 during the replenishment process.

As shown in FIGS. 2A to 2F, the cartridge 300 may include a cartridge housing 302 that has at least an inner surface 3021 defining an interior volume space which may at least partially be a cartridge reservoir 304 which may hold the cleaning composition 230 therein, such that the inner surface 3021 may be understood to at least partially define the cartridge reservoir 304. In some example embodiments, the cartridge reservoir 304 may have a particular volume, for example 36 oz and thus may be configured to hold the particular volume (e.g., 36 oz) of cleaning composition 230.

As further shown, the apparatus reservoir 202 and the cartridge 300 may be sized and shaped so that the cartridge 300 may be received (e.g., accommodated) at least partially into the apparatus reservoir 202 to establish a sliding contact fit between the outer surface 302S of the cartridge housing 302 and the inner surface 202S of the apparatus reservoir 202, for example so that the cartridge 300 occupies all or substantially all of the internal volume space of the apparatus reservoir 202 when the cartridge 300 is coupled to the cleaner dispensing apparatus 200.

As shown in FIGS. 2A to 2E, the cartridge 300 may have a greater volume than the apparatus reservoir 202 and may protrude out of the opening 2020 of the apparatus reservoir 202 when the cartridge 300 is received into the apparatus reservoir 202 and coupled (e.g., detachably coupled) with the cleaner dispensing apparatus 200. Such protrusion of the cartridge 300 may enable easier human access to grasp the cartridge 300 to simplify replacement of cartridges 300, but example embodiments are not limited thereto: in some example embodiments the cartridge 300 may be located entirely within the apparatus reservoir 202 when the cartridge 300 is coupled to the cleaner dispensing apparatus 200.

As shown in FIGS. 2A to 2E, the cleaner dispensing apparatus 200 may include the apparatus reservoir 202 which is configured to receive the cartridge 300 to enable the cartridge 300 to be coupled with the cleaner dispensing apparatus 200, but example embodiments are not limited thereto. For example, in some example embodiments, the apparatus reservoir 202 may be entirely absent from the cleaner dispensing apparatus 200, and the cartridge 300 (e.g., a connector interface 314 thereof) may couple with a port (e.g., having a complementary connector interface 204) that is exposed at the outer surface of the housing 201 of the cleaner dispensing apparatus 200 to put the cartridge reservoir 304 in fluid communication with the dispenser device 208 (e.g., the inlet 208*i* thereof).

As shown, the cartridge 300 may have a cartridge housing 302 that defines a cartridge outlet 302A through which the cleaning composition 230 may exit the cartridge reservoir 304 when a flow path is established between the cartridge reservoir 304 and the dispenser device 208 (e.g., via apparatus reservoir outlet 202A, internal reservoir 206, etc.).

The cartridge outlet 302A may include a connector interface 314 configured to establish a connection with the cleaner dispensing apparatus 200, and the cleaner dispensing apparatus 200 (e.g., the apparatus reservoir 202, the internal reservoir 206, the housing 201, any combination thereof, or the like) may further include a complementary connector interface 204 to enable a complementary connection with the cartridge 300 to thereby detachably couple the cartridge 300 to the cleaner dispensing apparatus 200. Such complementary connector interfaces 204 and 314 may include any known connector interface, for example a friction fit connector, a threaded connector, a bayonet connector, any combination thereof, or the like.

As further shown, at least one of the cartridge 300 or the cleaner dispensing apparatus 200 may include a check valve 306 that is configured to be opened based on the cleaner dispensing apparatus 200 being coupled with the cartridge 300 (e.g., in response to establishing a threaded connection, bayonet connection, friction fit connection, or the like between the complementary connector interfaces 204 and 314 of the cleaner dispensing apparatus 200 and the cartridge 300). For example, as shown in FIGS. 2A to 2D, the check valve 306 may be a check valve 306*a* included in the cleaner dispensing apparatus 200 (e.g., coupled to the apparatus reservoir outlet 202A, the internal reservoir 206, the connector interface 204, the apparatus reservoir 202, the housing 101, the dispenser device 208, any combination thereof, or the like) and configured to selectively open to establish fluid communication through the apparatus reservoir outlet 202A to the inlet 208*i* of the dispenser device 208 based on cartridge 300 coupling with the cleaner dispensing apparatus 200 (e.g., via connector interfaces 204 and 314 detachably coupling). In another example, as shown in FIGS. 2A to 2D, the check valve 306 may be a check valve 306*b* included in the cartridge 300 (e.g., coupled to the cartridge outlet 302A, the cartridge reservoir 304, the connector interface 314, the housing 201, any combination thereof, or the like) and configured to selectively open to establish fluid communication through the cartridge outlet 302A from the cartridge reservoir 304 to the inlet 208*i* of the dispenser device 208 based on cartridge 300 coupling with the cleaner dispensing apparatus 200 (e.g., via connector interfaces 204 and 314 detachably coupling). In another example, check valves 306 and 306*b* may be separate portions of a check valve 306 and which engage to form the check valve 306 and to open same in response to the cartridge 300 coupling with the cleaner dispensing apparatus 200 (e.g., via connector interfaces 204 and 314 coupling). The check valve 306 may be configured to actuate to open a flow path between the cartridge reservoir 304 and the apparatus reservoir 202 and/or between the cartridge reservoir 304 and the dispenser device 208 and/or between the cartridge reservoir 304 and the internal reservoir 206 in response to the cleaner dispensing apparatus 200 being coupled with the cartridge 300, so that the cartridge reservoir 304 is in fluid communication with the dispenser device 208

(e.g., the inlet 208*i*) via the cartridge outlet 302A, the check valve 306, the apparatus reservoir outlet 202A, and the like.

In an example, the check valve 306 may at least partially be a part of the cartridge 300 (e.g., as check valve 306*b*) such that the check valve 306 is fixed to the cartridge housing 302 (e.g., via adhesive and/or the cartridge housing 302 being a plastic material (e.g., high density polyethylene or HDPE) that is formed to at least partially enclose the check valve 306*b*). In another example, the check valve 306 may at least partially be a part of the cleaner dispensing apparatus 200 (e.g., as check valve 306*a*) such that the check valve 306 is fixed to the housing 201 (e.g., via adhesive and/or the housing 201 being a plastic material (e.g., high density polyethylene or HDPE) that is formed to at least partially enclose the check valve 306*a*). For example, in some example embodiments, the check valve 306 may be fixed to the apparatus reservoir 202 and/or the dispenser device 208 as check valve 306*a*. The check valve 306 may be included in a connector (e.g., connector interface 204) that is configured to couple with the cartridge 300 to establish the detachable coupling between the cleaner dispensing apparatus 200 and the cartridge 300. For example, the check valve 306 may be included in a threaded connector, bayonet connector, friction fit connector, or the like. In another example, the check valve 306 may be removably (e.g., detachably) coupled to the apparatus reservoir 202, housing 201, internal reservoir 206, connector interface 204, and/or the dispenser device 208 via a set of complementary connectors (e.g., threaded, bayonet, etc.), and the check valve 306 may be detached from the cleaner dispensing apparatus 200 and coupled to the cartridge 300 prior to coupling of the cleaner dispensing apparatus 200 with the cartridge 300, and the check valve 306 may be detached from the cartridge 300 subsequent to removal of an empty cartridge 300 from the cleaner dispensing apparatus 200 and then attached to a new, full cartridge 300 prior to coupling of the full cartridge 300 to the cleaner dispensing apparatus 200, such that a check valve 306 may be re-used between separate cartridges 300.

Accordingly, in some example embodiments, the cleaner dispensing apparatus 200 (e.g., the apparatus reservoir 202) may be configured to receive (e.g., at least partially accommodate) a cartridge 300 that includes a cartridge reservoir 304 configured to hold the cleaning composition 230, and a cartridge outlet 302A, and the cleaner dispensing apparatus 200 may be configured to couple with the cartridge 300 (e.g., based on detachable coupling of the complementary and respective connector interfaces 204 and 314 of the cleaner dispensing apparatus 200 and the cartridge 300) so that the cartridge reservoir 304 is in fluid communication (e.g., via an open flow channel) with at least the dispenser device 208 (e.g., the inlet 208*i* thereof) via the cartridge outlet 302A. Additionally, in some example embodiments, the cleaner dispensing apparatus 200 or the cartridge 300 may include a check valve 306 that is configured to open in response to the cleaner dispensing apparatus 200 coupling with the cartridge 300 to establish the fluid communication between the cartridge reservoir 304 and at least the dispenser device 208 via the cartridge outlet 302A.

Still referring to FIGS. 2A to 2D, the dispenser device 208 may be configured to dispense (e.g., selectively dispense) an amount of cleaning composition 230 that is a particular amount (e.g., a particular volume, particular mass, etc.) so that the cleaner dispensing apparatus 200 may dispense a particular amount of cleaning composition 230, received through the inlet 208*i*, through the outlet 2080 (e.g., repeatedly at a fixed time interval). For example, in some example embodiments, the amount of cleaning composition 230 as described herein that is dispensed from the inlet 208*i* (e.g., from the internal reservoir 206, apparatus reservoir 202. and/or cartridge reservoir 304 via the inlet 208*i*) when the dispenser device 208 is operated once may be 3 oz of cleaning composition 230, and the dispenser device 208 may be configured to be operated (e.g., may be configured to operate for a particular period of time associated at the controller 210 with dispensing a corresponding particular amount of cleaning composition 230) to cause the particular amount of cleaning composition 230 to be dispensed from the cartridge reservoir 304 of the cartridge 300 (e.g., via internal reservoir 206) to the apparatus outlet 240 to be dispensed to one or more portions of the air conditioning system 100.

As shown in FIGS. 1A and 1B and FIGS. 2A-2B, the apparatus outlet 240 may be coupled to the condensate drain line 124 through opening 125 thereof, based on the apparatus outlet 240 being coupled to a first end 291 of a conduit 290 that has an opposite end 292 extending through and opening 125 of the condensate drain line 124 such that the apparatus outlet 240 is in fluid communication with the condensate drain line 124, and thus dispensing the cleaning composition 230 through the apparatus outlet 240 results in dispensing the cleaning composition 230 into the condensate drain line 124. However, example embodiments are not limited thereto and in some example embodiments the apparatus outlet 240 may be coupled in fluid communication with different portions of an air conditioning system 100, such as an interior 192 of the air handler 102 in fluid communication with one or more outer surfaces of the heat exchanger 110 therein. For example, in some example embodiments the apparatus outlet 240 is configured to extend through the housing 101 of the air handler 102 and into an interior thereof and further includes a spray nozzle at a distal end thereof, and the dispenser device 208 is a pump (e.g., positive displacement pump, gear pump, etc.) that is configured to operate to pump cleaning composition through the apparatus outlet 240 to be sprayed into the interior of the air handler 102 to contact one or more outer surfaces of the heat exchanger 110 therein.

In some example embodiments, the cleaner dispensing apparatus 200 includes a structure connector 220 that is configured to connect the cleaner dispensing apparatus 200 to an external structure (e.g., a housing 101 of the air handler 102 as shown) to at least partially hold the cleaner dispensing apparatus 200 in place in relation to at least a portion of the air conditioning system 100, for example in relation to the opening 125 of the condensate drain line 124, the air handler 102, or the like. The structure connector 220 may have various structures. For example, the structure connector 220 may include an adhesive connector, a magnet, or the like to couple with the housing 101 of the air handler 102.

In some example embodiments, the dispenser device 208 may include at least one valve that is configured to be actuated to be selectively opened (e.g., to selectively open a flow path through the at least one valve) based on a control signal generated by the controller 210 to establish a flow path through the at least one valve and through which the cleaning composition 230 may flow (e.g., a flow path from the apparatus internal reservoir 206 to the apparatus outlet 240). For example, a valve of the dispenser device 208 as described herein may include an electromechanically operated valve, including a solenoid valve, which may be selectively actuated based on a control signal from the controller 210. In some example embodiments, the dispenser device 208 may include any known positive displacement pump, a gear pump, or the like that is configured to operate for a particular period of time to move the amount of the cleaning composition 230 from the inlet 208*i* which is in fluid communication with the apparatus reservoir 202, cartridge reservoir 304, internal reservoir 206, or the like to the outlet 2080 which is in fluid communication with the apparatus outlet 240, based on a control signal generated by the controller 210.

As described herein, a cleaning composition 230 may be any known chemical composition (e.g., solution, liquid, fluid, etc.) that may be configured to clean (e.g., remove) potential buildup substances (e.g., mold, algae, mildew, bacteria, and/or fungi) from an outer surface 110*s* of the heat exchanger 110 of the air handler 102. In some example embodiments, the cleaning composition 230 may be a chemical substance that is or includes a chelating agent (e.g., chelant) including, for example, sodium hexametaphosphate, that is configured to remove potential buildup substances from one or more portions of the air conditioning system based on chelation upon contact with the potential buildup substances. For example, the cleaning composition 230 may be a liquid solution that includes 3%-7% sodium hexametaphosphate, by weight of the total weight of the cleaning composition 230. Based on the cleaner dispensing apparatus 200 being configured to dispense cleaning composition 230 to one or more portions of the air conditioning system 100, the cleaner dispensing apparatus 200 may be configured to enable removal of potential buildup substances (e.g., mold, algae, mildew, bacteria, and/or fungi) from one or more portions of the air conditioning system 100 based on dispensing the cleaning composition 230 thereto, which may thereby reduce or prevent the occurrence of backflow and/or overflow of the condensate drain line 124 due to clogging, reduce or prevent the reduction in heat transfer performance of the heat exchanger 110 due to the potential buildup substances, or the like.

As shown in FIGS. 2A to 2D, the cleaner dispensing apparatus 200 may include a power supply 212 that is configured to supply electrical power to devices included therein, including the controller 210, the dispenser device 208, a network communication interface 224, a sensor, or the like. As shown, the power supply 212 may include a battery 214, which may include any known rechargeable battery (e.g., a lithium-ion battery). As further shown, in some example embodiments the power supply 212 may include a wired power connection 216 which may be configured to couple to a power outlet provided at the structure 1 and/or the air handler 102. The power supply 212 may further include a charging circuit 218 that may be configured to recharge the battery 214 from the wired power connection 216 and may be configured to enable the battery 214 to supply power to operate the cleaner dispensing apparatus 200 in the absence of electrical power being received via the wired power connection 216.

As shown in FIGS. 2A to 2D, the controller 210 may be configured to operate (e.g., actuate) the dispenser device 208 to cause a particular amount of the cleaning composition 230 to be dispensed from the inlet 208*i* (e.g., from the apparatus reservoir 202, internal reservoir 206, and/or cartridge reservoir 304 via the inlet 208*i*) and through apparatus outlet 240 (e.g., via the outlet 2080) without manual intervention. For example, the controller 210 may be configured to cause an electrical signal to be generated and transmitted to the dispenser device 208 to cause the dispenser device 208 to operate (e.g., actuate a valve thereof from a closed position to an open position) for a period of time (e.g., a particular, or alternatively predetermined prior of time), to thus cause a particular amount of the cleaning composition 230 to be dispensed from the inlet 208*i* to the outlet 2080.

The controller 210 may include a memory (e.g., a solid-state drive, or SSD) storing a program of instructions, and the controller 210 may include a processor (e.g., a Central Processing Unit, or CPU) configured to execute the program of instructions to implement any functionality of the controller 210, the cleaner dispensing apparatus 200, or any portion thereof according to any example embodiments. However, example embodiments are not limited thereto. For example, in some example embodiments, the controller 210 may include circuitry that is configured to implement a timer circuit (e.g., a clock, timer, or any combination thereof) and is configured to generate a signal to operate the dispenser device 208 based on the timer circuit counting a particular time interval. It will be understood that, where the cleaner dispensing apparatus 200 is described herein to perform or be configured to perform any operation, the controller 210 may be configured to implement and/or control one or more portions, devices, elements, or the like of the cleaner dispensing apparatus 200 (e.g., based on executing a program of instructions) to cause the cleaner dispensing apparatus 200 to perform any operations according to any of the example embodiments.

In some example embodiments, the controller 210 is configured to operate the dispenser device 208 to cause the dispenser device 208 to dispense an amount of cleaning composition 230 through the apparatus outlet 240 to be dispensed (e.g., provided) to one or more portions of the air conditioning system 100. In some example embodiments, the controller 210 may be configured to generate a signal to cause at least a portion of the dispenser device 208 to operate (e.g., to actuate) to dispense cleaning composition 230 therethrough for a particular period of time that is associated, at the controller 210, with causing a particular amount of cleaning composition 230 to be dispensed by the dispenser device 208. The controller 210 may cause a particular amount of cleaning composition 230 to be dispensed based on accessing a look-up-table that is stored in a memory of the controller 210, where the look-up-table is empirically generated and associates a period of time of dispenser device operation of at least a portion of the dispenser device 208 (e.g., a period of time of generation of a control signal) with dispensing (e.g., selective dispensing) of a corresponding amount of cleaning composition 230 by the dispenser device 208. The controller 210 may determine a particular amount of cleaning composition 230 to be dispensed, access the look-up-table to determine a corresponding duration or period of applied control signal to the dispenser device 208, and then generate a control signal that is transmitted to the dispenser device 208 to cause at least a portion of the dispenser device 208 to be operated for the corresponding duration or period.

In some example embodiments, the controller 210 is configured to operate the dispenser device 208 to cause an amount of cleaning composition 230 (e.g., 3 oz) to be dispensed in response to an elapse of a particular period of time (e.g., 7 days, or 168 hours). The controller 210 may be configured to operate the dispenser device 208 repeatedly upon repeated elapse of the particular period of time, which may be referred to as a "fixed time interval" (e.g., a fixed time interval of 7 days). In some example embodiments, the apparatus reservoir 202, cartridge reservoir 304, and/or internal reservoir 206 may be configured to hold a total volume of 36 oz, so that the cleaner dispensing apparatus 200 may be configured to dispense 3 oz of cleaning composition 230 through the apparatus outlet 240 every 7 days for a period of 12 weeks (84 days).

The controller 210 may be configured to repeatedly operate the dispenser device 208 at a fixed time interval (e.g., 7 days), based on monitoring a timer that increments a timer value at a fixed frequency, operating the dispenser device 208 in response to the timer value reaching a particular time value corresponding to the elapse of the particular period of time, and resetting the timer value to an initial timer value (e.g., 0 days) in response to operating the dispenser device 208. For example, the controller 210 may include and/or implement a clock and/or timer that counts a period of elapsed time from an initial timer value (e.g., increments from 0 days) at a fixed frequency (e.g., counts days, hours, minutes and/or seconds at a fixed frequency of days, hours, minutes and/or seconds). In response to determining that a threshold timer value is reached (e.g., a timer value corresponding to the particular period of time and/or fixed time interval of 7 days), the controller 210 may generate a signal to cause the dispenser device 208 to operate for at least a particular (e.g., predetermined) period of time to cause an amount (e.g., particular amount) of the cleaning composition 230 to be dispensed through the apparatus outlet 240 via the outlet 2080 and further re-set the timer value so that the controller 210 may subsequently cause the dispenser device 208 to dispense another amount of the cleaning composition 230 upon a re-elapse of the particular period of time. The controller 210 may be configured to perform this process repeatedly so long as electrical power is supplied to the controller 210 (e.g., from power supply 212), so that the process may be performed (e.g., repeatedly at a fixed time interval) without human intervention.

In some example embodiments, the controller 210 is configured to implement a counter that increments a counter value, starting from an initial counter value (e.g., 0), in response to each operation of the dispenser device 208. As a result, where the controller 210 repeatedly operates the dispenser device 208 at a fixed time interval, the controller 210 may track the number (e.g., quantity) of dispensings of an amount of cleaning composition 230 (e.g., the number of operations of the dispenser device 208) from an initial counter value (e.g., a zero value, such as zero (0)) over time. Therefore, where the cleaner dispensing apparatus 200 and/or cleaner dispensing system 1100 is configured to hold a particular total amount of cleaning composition 230 (e.g., 36 oz) (e.g., in the cartridge reservoir 304), and where the counter value is (re)set to an initial counter value (such as a zero value) prior to a start of dispensing cleaning composition 230 received at the dispenser device 208 from the cartridge reservoir 304 of the cartridge 300, the controller 210 may track the counter value to determine when the total amount of cleaning composition 230 held in the cartridge reservoir 304 is about to be depleted or is depleted and may generate a signal (e.g., a depletion signal) in response to the counter value reaching a threshold counter value that corresponds to partial or complete (e.g., total, final, etc.) depletion of the cleaning composition 230 held in the cartridge reservoir 304.

For example, where the cartridge reservoir 304 of the cartridge 300 is configured to hold a particular total amount of cleaning composition 230 that is 36 oz, and where the controller 210 is configured to cause the dispenser device 208 to dispense an amount of 3 oz of cleaning composition 230 at a fixed time interval of 7 days, the total amount of cleaning composition 230 held in the cartridge reservoir 304 may be depleted upon completion of 12 dispensings (e.g., 12 dispensing operations of the dispenser device 208 under control of the controller 210). The controller 210 may store a threshold counter value of 10, 11, or 12 that corresponds to partial depletion, near-depletion, or total depletion of the total amount of cleaning composition 230 held in the cartridge reservoir 304 of the cartridge 300. The controller 210 may implement and/or monitor a counter that increments a counter value in response to each operation of the dispenser device 208 and generate (e.g., generate and/or transmit) a signal in response to the counter value reaching a particular threshold counter value that corresponds to at least partial depletion of the cartridge reservoir 304 of the cleaning composition (e.g., 10, 11, or 12). As described herein, the controller 210 may transmit such a signal to a display interface (e.g., an LED, an audio speaker), which may be included in the cleaner dispensing apparatus 200 or may be included in a remote computing device, to provide a warning indication. The controller 210 may further or alternatively be configured to cause the signal to be transmitted to a computing device 700 (e.g., via a network communication interface 224 and network communication link 702 as described herein) in order to inform a remote human user supported by the computing device 700 of the partial or complete depletion (e.g., final depletion) of the total amount of cleaning composition 230 held in the cartridge reservoir 304 of the cartridge 300. The human user may then be informed of the partial or complete depletion so that the human user may take action to replenish the cleaning composition held in the cleaner dispensing system 1100 (e.g., based on detaching and replacing the depleted cartridge 300 with a new, full cartridge 300 coupled to the cleaner dispensing apparatus 200).

Additionally, the controller 210 may be configured to cause the counter value to be reset to an initial counter value (e.g., 0) in response to receiving a signal from the computing device 700, such as a reset signal, an unlocking signal as described herein, or the like.

As shown in at least FIGS. 2A to 2D, the cleaner dispensing apparatus 200 may include an electrical switch device 1280 that may include a structure extending into the apparatus reservoir 202 (e.g., through and/or into a portion of the connector interface 204) and configured to be engaged and moved from a switch-open position to a switch-closed position by at least a portion of the cartridge 300 when a connector interface of the cartridge 300 (e.g., connector interface 314) couples with a connector interface of the cleaner dispensing apparatus 200 (e.g., connector interface 204). In some example embodiments, the electrical switch device 1280 may be configured to be engaged and moved from a switch-open position to a switch-closed position by at least a portion of the cartridge 300 the cartridge 300 is received into the apparatus reservoir 202 such that at least a portion of the outer surface 302S of the cartridge 300 engages at least portion of the electrical switch device 1280 which may extend through at least a portion of the inner surface 202S into the apparatus reservoir 202. The electrical switch device 1280 may be configured to close an electrical circuit that includes the controller 210 when moved to the switch-closed position, thereby enabling an electrical signal to be received at the controller 210. The controller 210 may be configured to apply electrical power to the circuit and may be configured to determine that the cartridge 300 is coupled with the cleaner dispensing apparatus 200 in response to determining that the circuit including the electrical switch device 1280 is closed such that an electrical signal (e.g., an induced current) is present in the circuit. The controller 210 may be configured to selectively enable or inhibit (e.g., unlock or lock) operation of at least a portion of the cleaner dispensing apparatus 200, including operation of the dispenser device 208, based upon whether a cartridge 300 is determined to be coupled to the cleaner dispensing apparatus 200 (e.g., based upon receiving an electrical signal via the circuit including the electrical switch device 1280 to determine that the circuit is closed due a cartridge 300 being coupled with the cleaner dispensing apparatus 200 to move the electrical switch device 1280 to the switch-closed position). As described herein, selectively enabling or selectively inhibiting, at least a dispenser device 208 of a cleaner dispensing apparatus 200 may be referred to interchangeably as selectively enabling or selectively inhibiting, respectively, the cleaner dispensing apparatus 200.

Still referring to FIGS. 2A to 2D, the cleaner dispensing apparatus 200 may include a network communication interface 224 that is communicatively coupled to the controller 210. It will be understood that the network communication interface 224 may be separate from the controller 210 as shown or may be included in and/or implemented by the controller 210. The network communication interface 224 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like.

The controller 210 may be configured to establish a network communication link 702 (which may be a wired network communication link, a wireless network communication link, an ad hoc wireless network communication link, or the like) with a computing device 700 (also referred to interchangeably as a remote computing device) as described herein and may engage in one-way or two-way communication with the computing device 700 via the network communication link 702.

In some example embodiments, the controller 210 may communicate signals over the network communication link that indicate operations of the controller 210 (e.g., indicating operation of the dispenser device 208 at particular points in time, a present timer value, a present counter value, etc.). In some example embodiments, the controller 210 may communicate (e.g., transmit) one or more signals (e.g., a final depletion signal generated in response to the counter value reaching a final depletion threshold value) to the computing device 700 via the network communication link 702.

In some example embodiments, the controller 210 may be configured to perform operations in response to receiving signals from the computing device 700 via the network communication link 702. For example, the controller 210 may be configured to cause the counter value of the counter of the cleaner dispensing apparatus 200 to be reset to an initial counter value (e.g., 0) in response to receiving a reset signal and/or unlocking signal from the remote computing device via the network communication link (which may be transmitted by the remote computing device in response to authentication of a new cartridge 300 that is coupled or is to be coupled to the cleaner dispensing apparatus 200).

Still referring to FIGS. 2A to 2D, in some example embodiments, the cleaner dispensing system 1100 (e.g., the cleaner dispensing apparatus 200) may be communicatively coupled to a computing device 700 communicatively via a network communication link 702. In some example embodiments, the network communication interface 224 (e.g., a wireless network communication transceiver) is configured to establish a network communication link with a computing device 700. The computing device 700 may be configured to support a human user.

As shown, the computing device 700 may include a processor 720 (e.g., a CPU), a memory 730 (e.g., a SSD), a power supply 740 (e.g., a rechargeable battery), a network communication interface 750 (e.g., a wireless network communication transceiver), and an interface 760 that may include a display device (e.g., an LED display panel, an OLED display panel, or the like) a button, a touchscreen display device, any combination thereof, or the like that are communicatively and/or electrically coupled via a bus connection 710. As further shown, the computing device 700 may include one or more detection devices 770 which may be controlled to enable detection of a cartridge indicator 370 of the cartridge 300. The computing device 700 as shown may be physically separate (e.g., remote, external, etc.) from the cleaner dispensing apparatus 200 and may be communicatively coupled to the cleaner dispensing apparatus 200 via a network communication link 702, although example embodiments are not limited thereto. The computing device 700 may include a mobile electronic device configured to support a human user, such as a smartphone, mobile computing device, laptop computer, notebook computer, or the like. The computing device 700 as described herein be configured to implement any of the functionality of the computing device 700 as described herein based on the computing device 700 implementing a program of instructions (e.g., based on the processor 720 thereof executing a program of instructions stored on the memory 730 thereof) that may be referred to as an "application." "app," or the like. Such an "application" or "app" that is implemented by the computing device 700 to implement any of the functionality of the computing device 700 as described herein may be referred to as a "drain cleaner control app," a "drain cleaner authentication and control app," an "application" associated with the drain cleaning system 1100, or the like.

At least some of the computing device 700 (also referred to herein interchangeably as a computing device 700), including for example the processor 720, the memory 730, the network communication interface 750, the one or more detection devices 770, or any combination thereof, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. It will be understood that any type of non-transitory computer readable storage device may be used as the memory 730 in addition or alternative to an SSD. In some example embodiments, the processing circuitry may include a non-transitory computer readable storage device, or memory (e.g., memory 730), for example a solid state drive (SSD), storing a program of instructions, and a processor (e.g., processor 720) that is communicatively coupled to the non-transitory computer readable storage device (e.g., via a bus connection 710) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, any part of the computing device 700) will be understood to implement the functionality of said implemented element (e.g., the functionality of the computing device 700).

As shown, the network communication interface 224 of the cleaner dispensing apparatus 200 may be configured to establish a network communication link 702 with the computing device 700 (e.g., with network communication interface 750) and may be configured to implement one-way or two-way communication between the cleaner dispensing apparatus 200 and the computing device 700. As further shown in at least FIGS. 2A and 2C, the network communication interface 224 may be further communicatively coupled to the controller 140 of at least a portion of the air conditioning system 100 (e.g., controller 140 of the air handler 102 via a network communication link (which may be a wired, wireless, and/or ad hoc network communication link). In some example embodiments, the controller 210 may be configured to generate a shutdown signal and communicate (e.g., transmit) the shutdown signal to the controller 140 via the network communication interface 224 and the network communication link to cause the controller 140 to shut down at least a portion of the air conditioning system 100 (e.g., shut down operation of at least the air handler 102). In some example embodiments, the controller 210 may generate the shutdown signal and communicate the shutdown signal to the controller 140 via network communication link in response to one or more of receiving a shutdown command signal from the computing device 700 via network communication link 702, determining that a final depletion threshold associated with a cartridge 300 coupled to the cleaner dispensing apparatus 200 is reached, any combination thereof, or the like.

Still referring to FIGS. 2A to 2D, in some example embodiments, the computing device 700 may be communicatively coupled to a remote system 800 (also referred to herein as a remote computing network, cloud computing network, remote network service, or the like), which may be implemented by a separate remote computing device 810, communicatively via a network communication link 802. In some example embodiments, the computing device 700 (also referred to herein as a computing device, user device, end-user device, user computing device, end-user computing device, electronic device, or the like) may include a network communication interface 750 (e.g., a wireless network communication transceiver) that is configured to establish a network communication link 802 with a remote system 800, including a network communication link 802 with a remote computing device 810 at least partially supporting and/or implementing the remote system 800. The remote system 800 may be a computing network, cloud computing network, or the like which is at least partially implemented and/or supported by the remote computing device 810. The remote computing device 810 may, in some example embodiments, be configured to support a human user.

As described herein, the remote system 800, as at least partially implemented by the remote computing device 810, may be configured to manage user accounts 734 associated with one or more various cleaner dispensing systems 1100 (including user accounts 734 associated with one or more various cleaner dispensing apparatuses 200), manage databases of authentic cartridge identifier codes 774 which may be associated with (e.g., may uniquely identify) various "authentic" cartridges 300 which may be provided to human users to detachably couple with cleaner dispensing apparatuses 200 to provide cleaning composition 230 to be dispensed by the cleaner dispensing apparatuses 200. The remote system 800 may be further configured to command ordering, purchase, and/or delivery (herein referred to as "ordering" or the like) of one or more cartridges 300 in association with one or more user accounts, including ordering one or more cartridges 300 to be delivered to a physical mailing address which may be associated with a cleaning dispensing apparatus 200 (e.g., a physical mailing address that is associated with a user account 734 to which the cleaning dispensing apparatus 200 is further associated with). Thus, the remote system 800 may enable delivery of new, authentic cartridges 300 having full or substantially full cartridge reservoirs 304 which are full or substantially full of cleaning composition 230 to enable replacement of depleted cartridges 300 at the cleaner dispensing apparatuses 200 associated with the user accounts 734. An "authentic" cartridge 300 as described herein may refer to a cartridge 300 which is known to have been manufactured for use in a cleaner dispensing system 1100 and which is known to have not been previously coupled to a cleaner dispensing apparatus 200 of any cleaner dispensing systems 1100. Each authentic cartridge 300 may be associated with a particular "authentic" cartridge identifier code 774 that is stored in a database, where dispensing operation of the cleaner dispensing apparatus 200 (e.g., operation of at least the dispenser device 208 thereof) may be selectively enabled (e.g., "unlocked") such that operation of at least the dispenser device 208 of a cleaner dispensing apparatus 200 is selectively enabled based on a determination that a cartridge 300 associated with a particular authentic cartridge identifier code 774 that is stored in the database, and thus an "authentic" cartridge 300, has been provided to be coupled (or is already coupled) to the cleaner dispensing apparatus 200. Such selective enablement (e.g., selective unlocking) of at least a dispenser device 208 of the cleaner dispensing apparatus 200 based on authenticating a cartridge 300 that is coupled or provided to be coupled to the cleaner dispensing apparatus 200 may improve performance of the cleaner dispensing system 1100 due to reducing the likelihood of the cleaner dispensing apparatus 200 dispensing "inauthentic" cleaning composition 230 from a cartridge 300 or dispensing cleaning composition 230 from a cartridge 300 which has a partially-depleted cartridge reservoir 304 due to having previously supplied cleaning composition to be dispensed by a separate cleaner dispensing apparatus 200.

In some example embodiments, the computing device 700 and/or the remote system 800 may create and/or maintain a user account 734 (also referred to as a user account entry) that may associate at least one user (e.g., human user and/or entity) and/or user information thereof with at least one particular cleaner dispensing apparatus 200. For example, a cleaner dispensing apparatus 200 may include, at controller 210 (e.g., stored in a memory thereof) apparatus identity information 280 (e.g., a particular alphanumeric code) that uniquely identifies the cleaner dispensing apparatus 200. The computing device 700 may be configured to, based on communication with the controller 210 of the cleaner dispensing apparatus 200 via the network communication link 702, obtain the apparatus identity information 280 from the cleaner dispensing apparatus 200 and associate the apparatus identity information 280 with a user account 734 that includes user information 736 which may identify (e.g., uniquely identifier) at least one user (e.g., a name, physical mailing address, purchase information, etc.), such that the apparatus identity information 280 is included within user account information 738 of the user account 734. Accordingly, it will be understood that the user account 734 and/or any user account information 738 thereof (e.g., a physical mailing address included in the user information 736 of the user account 734) may be associated with a cleaner dispensing apparatus 200 that is associated with the user account 734 based on the apparatus identity information 280 associated with the cleaner dispensing apparatus 200 being included in the user account information 738 of the user account 734.

In some example embodiments, the user account information 738 may include information identifying one or more cartridges 300 which have been authenticated and used to selectively enable ("unlock") a cleaner dispensing apparatus 200 via an apparatus enable command signal, thereby providing a record of authentic cartridges 300 used in association with the user account 734. Such information that may be included in the user account information 738 may include a detected particular cartridge identifier code 374 that is associated with the cartridge 300 and which is determined to match an authentic cartridge identifier code 774 as described herein.

The computing device 700 may further receive user information 736 via user interaction with interface 760, via information received from a remote source via a network communication link via network communication interface 750 (e.g., from remote system 800 via network communication link 802), or the like. Such user information 736 may include information indicating a username associated with the user, a physical mailing address associated with the user, user purchasing information associated with the user such as credit card information (e.g., one or more credit card numbers), bank account information, or the like. The user information 736 may include information indicating whether automatic (e.g., without manual user intervention) ordering and/or purchasing of additional cartridges is authorized in response to receiving a warning signal from a cleaner dispensing apparatus 200 with which the computing device 700 is linked via a network communication link 702 and/or a cleaner dispensing apparatus 200 which is associated with the user account 734 as indicated by apparatus identity information 280 included in the user account 734. The computing device 700 may create and/or update a user account 734 which associates the apparatus identity information 280 with the user information 736 to establish user account information 738 of the user account 734 which includes both the apparatus identity information 280 and the user information 736. User account information 738 associated with a user account 734, including information 280 and/or 736, may be understood to be user account information "of" the user account 734, user account information included in the user account 734, or the like. The user account 734 may be used to enable selective control of the cleaner dispensing apparatus 200 in association with the user account 734, purchasing and/or delivery of cartridges 300 to an address indicated in the user information 736 of the user account 734, using purchasing information (also referred to herein interchangeably as user financial information) such as credit card information in the user information 736 of the user account 734, or the like. The computing device 700 may store the user account 734, and thus the user account information 738 thereof, locally at the computing device 700.

In some example embodiments, the computing device 700 may communicate the user account 734 and/or any user account information 738 thereof (e.g., information indicating the user account 734 and the user account information 738 associated therewith) to the remote system 800. As a result, the user account 734 and associated information (which may be understood to be information included in the user account), including the apparatus identity information 280 and at least a portion of the user information 736, may be stored at the remote system 800 (e.g., at a memory of a remote computing device 810 at least partially supporting and/or implementing the remote system 800). In some example embodiments, user account information (e.g., information 280 and/or 736 associated with a given user account 734) may be updated, changed, or the like at the remote system 800 and the updated user account 734 information may be provided to the computing device 700 via network communication link 802 to enable the computing device 700 to update the corresponding user account 734 stored locally at the computing device 700. In some example embodiments, the computing device 700 may communicate received apparatus identity information 280 and user information 736 to the remote system 800, where the remote system 800 may create and/or update the user account 734 at the remote system 800 based on information received from the remote device, instead of the computing device 700 maintaining the user account information 738 at the computing device 700.

In some example embodiments, the computing device 700 may be configured to cause the remote system 800 to perform one or more operations associated with a particular user account 734 based on communication between the computing device 700 and the remote system 800 via network communication link 802. For example, the computing device 700 may communicate an order command signal to the remote system 800 via network communication link 802, where the order command signal may include information identifying a particular user account 734 (e.g., at least a portion of the user account information 738 thereof, including for example a physical mailing address, purchase information, etc.) and may include a command to purchase and/or order (herein referred to as simply "order") at least one cartridge 300 for delivery to a physical mailing address that is associated with the user account 734 (e.g., a physical mailing address included in user information 736 of the user account 734) and thus is associated with at least one particular cleaner dispensing apparatus 200 that is associated with the user account 734. The remote system 800 may be configured to, in response to receiving such an order command signal, create and/or execute an order (e.g., a purchase order and/or delivery order) which causes one or more cartridges 300 to be purchased and/or ordered using purchase information (e.g., credit card information) associated with the user account 734 and to be delivered to a physical mailing address associated with the user account 734 and thus associated with the cleaner dispensing apparatus 200 that is also associated with the user account 734.

As further shown in FIGS. 1A and 1B and FIGS. 2A to 2F, each cartridge 300 may include a cartridge indicator 370 that is configured to indicate a particular cartridge identifier code 374 that is associated with (e.g., uniquely associated with, uniquely identifies, etc.) the particular cartridge 300, for example based on the cartridge indicator 370 providing a visible pattern 392 and/or transmitting a signal representing cartridge information 372 which may be processed to detect the particular cartridge identifier code 374. The cartridge indicator 370 thus may be understood to be configured to provide cartridge information 372 which enables the particular cartridge 300 to be identified (e.g., uniquely identified), including for example providing cartridge information 372 which may be processed by the computing device 700 to detect a particular cartridge identifier code 374 which may uniquely identify the particular cartridge 300 that includes the particular cartridge indicator 370. For example, the cartridge indicator 370 may be configured to provide cartridge information 372, for example in the form of a visible pattern, a transmitted signal, or the like, which may be processed to detect a particular cartridge identifier code 374 which is associated with (e.g., uniquely associated with) the cartridge 300. The particular cartridge identifier code 374 may be an alphanumeric code, a data code, or the like.

The cartridge indicator 370 may be one of various types of indicators, indicator devices, etc., as described herein. In some example embodiments, including the example embodiments shown in FIGS. 1A and 1B, 2E, and 2F, the cartridge indicator 370 may include a device that is at least partially visible on an outer surface 302S of the cartridge 300, where at least the visible portion of the cartridge indicator 370 may present cartridge information 372 in the form of a visible pattern 392 which may indicate a particular cartridge identifier code 374 when processed. For example, the cartridge indicator 370 may include a visible pattern 392 that is externally visible on an outer surface 302S of the cartridge 300, where the visible pattern (e.g., an image of the visible pattern 392) may be processed to detect the particular cartridge identifier code 374 that is associated with the cartridge 300. Such a device comprising the cartridge indicator 370 may include a sticker, label, or the like that is on (e.g., adhered to via any known adhesive or bond) the outer surface 302S of the cartridge 300 and which displays the cartridge information 372 in the form of a visible pattern 392, a printed visible pattern 392 that is printed on the outer surface 302S of the cartridge 300 based on an ink being deposited on the outer surface 302S, and/or based on the visible pattern 392 being formed in the outer surface 302S of the cartridge 300 due to patterning of the outer surface 302S (e.g., etching, laser etching, etc. of the outer surface 302S). The visible pattern 392 of the cartridge information 372 may represent cartridge information 372 that includes a machine-readable code that, when processed, indicates the particular cartridge identifier code 374 associated with the particular cartridge 300 that includes the particular cartridge indicator 370. The machine-readable code may be obtained by a separate device (e.g., computing device 700) based on the separate device generating (e.g., capturing) an image of the visible pattern and processing the image of the visible pattern to enable the separate device to obtain (e.g., detect, identify, etc.) the particular cartridge identifier code 374 based on processing the code represented by the cartridge information 372. For example, the visible pattern 392 which may a barcode, such as a quick response (QR) code, which may be processed based on a separate device capturing and processing an image of the visible pattern to obtain (e.g., identify) the particular cartridge identifier code 374 associated with the particular cartridge 300 that includes the particular cartridge indicator 370. As described herein, where a signal, information or the like is described to "indicate" certain information, codes, or the like, it will be understood that a device such as a computing device, controller, system supported by a computing device, or the like as described herein may be configured to process the signal, information or the like to detect, determine, etc. the certain information, codes, or the like. It will also be understood that in some example embodiments the cartridge information 372 and the particular cartridge identifier code 374 may be identical, such that the particular cartridge identifier code 374 may be detected based on simply obtaining and processing the cartridge information 372. It will be understood that the visible pattern 392 may be described as representing cartridge information 372, but in some example embodiments the visible pattern 392 and the cartridge information 372 may be identical to each other and may be referred to interchangeably to refer to the information, provided (e.g., transmitted, displayed, etc.) by the cartridge indicator 370, to indicate the particular cartridge identifier code 374 that is associated with the cartridge 300 that includes the cartridge indicator.

In some example embodiments, the cartridge indicator 370 may include a wireless communication interface device that is configured to transmit a signal that indicates (e.g., includes, may be processed to obtain, etc.) the cartridge information 372. For example, the cartridge indicator 370 of a cartridge 300 may include a near-field communication (NFC) device that is configured to transmit a signal (e.g., an NFC signal) in response to an NFC field (e.g., an RF field generated by an NFC antenna of a separate device) being received at the NFC device. The transmitted NFC signal may represent cartridge information 372 which may be processed to detect the particular cartridge identifier code 374 associated with the particular cartridge 300 that includes the particular cartridge indicator 370. The NFC signal may be received and processed by a separate device (e.g., computing device 700) to enable the separate device to obtain (e.g., detect, identify, etc.) the particular cartridge identifier code 374 that is associated (e.g., uniquely associated) with the particular cartridge 300 that includes the cartridge indicator 370. Such a cartridge indicator 370 which includes an NFC device may be partially or completely obscured from visible exposure to an exterior of the cartridge 300, thereby reducing the risk of removal, alteration, and/or replacement of the cartridge indicator 370.

Different cartridges 300 may include separate, respective cartridge indicators 370 which are each configured to provide different (e.g., unique) cartridge information 372 indicating a different (e.g., unique) particular cartridge identifier code that is associated (e.g., uniquely associated) with the separate, respective cartridge 300 that includes the separate cartridge indicator 370. Each separate cartridge indicator 370 of each separate cartridge 300 may thus be configured to identify (e.g., uniquely identify) the specific cartridge 300 in, at, and/or on which the cartridge indicator 370 is included. As a result, each cartridge 300 may be configured to be uniquely identified based on obtaining and processing of cartridge information 372 from the cartridge indicator 370 of the cartridge 300 to detect the particular cartridge identifier code 374 that is specifically indicated by the cartridge indicator 370, for example based on communication with the cartridge indicator 370, generating and processing an image of a visible pattern 392 representing cartridge information 372 that is present on at least an externally visible (e.g., visible externally to the cartridge 300) portion of the cartridge indicator 370, etc.

As shown in at least FIGS. 1A and 1B and 2A to 2D, the computing device 700 may include one or more detection devices 770 which may be configured to obtain 790 and process the cartridge information 372 provided (e.g., indicated, displayed, transmitted, etc.) by the cartridge indicator 370 to detect a particular cartridge identifier code 374 indicated by the cartridge information 372 (and thus, indicated by the cartridge indicator 370 and therefore associated with the cartridge 300 that includes the cartridge indicator 370) such that the computing device 700 may be configured to detect the particular cartridge identifier code 374 that is associated with cartridge 300 based on obtaining cartridge information 372 from the cartridge indicator 370, thereby enabling the computing device 700 to uniquely identify a cartridge 300 that is provided to be detachably coupled to the cleaner dispensing apparatus 200 to provide cleaning composition 230 thereto.

In some example embodiments, a detection device 770 may include a camera (e.g., camera device, image sensor, etc.) configured to generate (e.g., capture) an image of an environment within a particular field of view 780 of the camera. The computing device 700 may be configured to process an image of the field of view 780 generated by the camera to detect a visible pattern 392 representing cartridge information 372 of a cartridge indicator 370 that is located within the field of view 780 in the image (e.g., a visible pattern 392 of cartridge information 372 in the form of a visible barcode, QR code, or the like that may be visible in the generated image). The computing device 700 may be configured to process the cartridge information 372 indicated (e.g., graphically represented) by the visible pattern 392, and which is obtained 790 from the cartridge indicator 370 via the generated image, to identify (e.g., detect, obtain, etc.) a particular cartridge identifier code 374 associated with the cartridge 300 that includes the cartridge indicator 370.

In some example embodiments, a detection device 770 may include an NFC communication interface (which may include one or more NFC antennas, RF antennas, NFC transmitters, NFC receivers, NFC transceivers, or the like). The NFC communication interface may be configured to transmit and/or emit an NFC signal and/or NFC field (e.g., an RF field). The NFC communication interface may be configured to receive a signal (e.g., NFC signal, RF signal, or the like) that is generated by a separate NFC device (e.g., an NFC device included in a cartridge indicator 370) in response to the transmitted/emitted NFC signal and/or field. The computing device 700 may be configured to detect a particular cartridge identifier code 374 that is indicated by a cartridge indicator 370 of a cartridge 300 based on obtaining 790 cartridge information 372 via receiving an NFC signal from the cartridge indicator 370 and processing the received NFC signal to identify (e.g., detect) the particular cartridge identifier code 374.

Obtaining 790 cartridge information 372 from a cartridge indicator 370 may include recognition, by a device such as a detection device 770 and/or computing device 700 including same, of the presence of at least a portion of a cartridge indicator 370 (e.g., a visible pattern 392 representing cartridge information 372) within a proximity and/or field of view 780 of at least the detection device 770. For example, where a detection device 770 includes a camera configured to generate (e.g., capture) an image of an environment within a particular field of view 780, the computing device 700 may process an image generated by the camera to determine that a visible pattern 392 associated with a cartridge indicator 370 and thus representing cartridge information 372, such as a barcode, QR code, or the like, is present within the generated image of the field of view 780. As a result, the computing device 700 may recognize the presence of the cartridge indicator 370 based on processing the generated image. The detection of the particular cartridge identifier code 374 may include processing the cartridge information 372 represented as the visible pattern 392 located (e.g., visible, represented, etc.) in the generated image to determine (e.g., detect) the particular cartridge identifier code 374 as a particular code (e.g., an alphanumeric code, such as a 16-character code such as WW123456789ABCWW) represented by the pattern, barcode, QR code, or the like of the cartridge information 372. In another example, where the detection device 770 includes an NFC communication interface, the computing device 700 may cause the NFC communication interface to emit an NFC field (e.g., an RF field) and detect an NFC signal that is received from an NFC device of the cartridge indicator 370 in response to the NFC field, where receiving the NFC signal may amount to obtaining cartridge information 372 indicated by the NFC signal from the cartridge indicator 370. The computing device 700 may process the received NFC signal to obtain the cartridge information 372 indicated thereby and further process the cartridge information to identify (e.g., detect) a particular cartridge identifier code 374 that is associated with a particular cartridge 300 that includes the cartridge indicator 370.

As further shown in FIGS. 1A and 1B and FIGS. 2A to 2D, the control system 3000 (which may be referred to in some example embodiments as a cleaner dispensing system cartridge authentication and control) may include the computing device 700 and the remote system 800 in addition to the cleaner dispensing system 1100, although example embodiments are not limited thereto. The computing device 700 may be configured to be communicatively coupled to the cleaner dispensing apparatus 200 of the cleaner dispensing system 1100 via the network communication link 702 and/or to the remote system 800 via the network communication link 802. The control system 3000 may be configured to control one or more operations of the cleaner dispensing system 1100 based on authenticating a cartridge 300 that is coupled or is provided to be coupled to the cleaner dispensing apparatus 200 (e.g., determining that such a cartridge is "authentic") and selectively enabling (e.g., activating, "unlocking," etc.) or inhibiting (e.g., deactivating, "locking," etc.) at least a portion of the cleaner dispensing apparatus 200 based on such authentication of the cartridge 300 (e.g., specifically selectively enabling/unlocking or inhibiting/locking operation of at least the dispenser device 208 thereof). Accordingly, the control system 3000 may be configured to control operation of the cleaner dispensing system 1100 to dispense cleaning composition 230 based on whether an authenticated cartridge 300 is provided to be coupled to the cleaner dispensing apparatus 200 of the cleaner dispensing system 1100 included in the control system 3000. In some example embodiments. the control system 3000 may omit the remote system 800.

As shown, the computing device 700 and the remote system 800 may comprise an authentication and control system 3010 that excludes the cleaner dispensing system, such that the control system 3000 includes the authentication and control system 3010 and the cleaner dispensing system 1100.

As described herein, the control system 3000 may selectively enable (e.g., selectively enable or inhibit, selectively unlock or lock, etc.) operation of at least the dispenser device 208 of a cleaner dispensing apparatus 200, thereby selectively enabling the cleaner dispensing the cleaner dispensing apparatus 200 to operate the dispenser device 208 to dispense cleaning composition 230, based on authentication of the cartridge 300 coupled or provided to be coupled to the cleaner dispensing apparatus 200. The cleaner dispensing apparatus 200 may then operate to dispense cleaning composition 230 provided from the cartridge reservoir 304 of the cartridge 300, based on operation of the dispenser device 208, until a determination is made that the authenticated cartridge 300 is depleted of cleaning composition 230 (e.g., that a counter value of a counter implemented by the cleaner dispensing apparatus 200 as described herein has at least reached a threshold counter value associated with such depletion). In response to such a determination, the cleaner dispensing apparatus 200 may inhibit (e.g., deactivate, lock, etc.) further operation of at least the dispenser device 208 until a new cartridge 300 is authenticated (as indicated for example by an apparatus enable command signal received at the cleaner dispensing apparatus 200) to cause re-enablement (e.g., re-activation) of at least the dispenser device 208 of the cleaner dispensing apparatus 200.

Based on such authenticated control of the cleaning composition dispensing operation, the control system 3000 may be configured to improve the likelihood of operation of the cleaner dispensing system 1100 using cleaning composition provided by authenticated cartridges 300, thereby reducing the risk of use of improper cleaning composition provided from inauthentic cartridges in the cleaner dispensing system 1100, and thereby improving operational reliability and performance of the cleaner dispensing system 1100. For example, as described herein, the computing device 700 may be configured to authenticate a cartridge 300 that is coupled or provided to be coupled to a cleaner dispensing apparatus 200 based on detecting the particular cartridge identifier code 374 that is indicated by a cartridge indicator 370 of the cartridge 300, based on processing cartridge information 372 obtained from the cartridge indicator 370. The computing device 700 may, in response to authenticating the cartridge 300, transmit an unlocking command signal (also referred to herein as an "apparatus enable command signal," "apparatus activation command signal," etc.) to the cleaner dispensing apparatus 200. The apparatus enable command signal may, upon being received and processed by the controller 210, cause the cleaner dispensing apparatus 200 (e.g., the controller 210) to, in response to the apparatus enable command signal, selectively enable (e.g., unlock, activate, etc.) operation of at least the dispenser device 208 to dispense cleaning composition 230 received from the cartridge reservoir 304 of the cartridge 300.

It will be understood that, in some example embodiments, the controller 210 may be configured to selectively enable at least the dispenser device 208 in response to receiving the apparatus enable command signal subsequent to and/or and concurrently with the cartridge 300 being coupled to the cleaner dispensing apparatus 200 (e.g., based on determining that the electrical switch device 1280 is in a switch-closed position as described herein prior to and/or concurrently with receiving the apparatus enable command signal). It will be understood that, in some example embodiments, the controller 210 may be configured to selectively enable at least the dispenser device 208 in response to receiving the apparatus enable command signal subsequent to a determination that a new cartridge 300 is coupled to the cleaner dispensing apparatus 200 subsequently to an old cartridge 300 being decoupled from the apparatus. The controller 210 may determine that an old cartridge 300 is decoupled from the cleaner dispensing apparatus 200 and a new cartridge 300 is subsequently coupled to the cleaner dispensing apparatus 200 to replace the old cartridge in response to a determination that the electrical switch device 1280 moves from a switch-closed position as described herein to a switch-open position as described herein and then subsequently moves back to the switch-closed position. The controller 210 may be configured to selectively enable at least the dispenser device 208 in response to receiving the apparatus enable command signal subsequent to and/or concurrently with the electrical switch device 1280 being determined to be moved from the switch-open position to the switch-closed position.

The cleaner dispensing apparatus 200 (e.g., controller 210) may further selectively inhibit (e.g., lock, disable) operation of at least the dispenser device 208, to inhibit further dispensation of cleaning composition 230 therefrom, in response to a determination at the controller 210 that the cartridge reservoir 304 of the authenticated cartridge 300 is depleted (e.g., totally depleted) of cleaning composition 230. The cleaner dispensing apparatus 200 may be configured to inhibit further operation of at least the dispenser device 208 until a new apparatus enable command signal is subsequently received from computing device 700 at the cleaner dispensing apparatus 200. The computing device 700 may transmit a new apparatus enable command signal in response to authenticating a new cartridge 300 (based on detecting a new particular cartridge indicator code indicated by the cartridge indicator 370 of the new cartridge 300).

In some example embodiments, the control system 3000 may maintain one or more databases 732 and/or 832 of authentic cartridge identifier codes 774 (e.g., confirmed authentic cartridge identifier codes) which are each associated with a confirmed authentic cartridge 300. The control system 3000 may be configured to selectively "unlock" (e.g., selectively enable) operation of at least dispenser device 208 at a cleaner dispensing apparatus 200 in response to a determination that an authentic cartridge 300 is detected by the computing device 700 (e.g., the cartridge 300 is "authenticated" by at least the computing device 700), independently of or in combination with a determination that the particular cartridge 300 is coupled to the cleaner dispensing apparatus 200 (via determination that the electrical switch device 1280 is in a switch-closed position). A particular cartridge identifier code 374 of (e.g., associated with) a particular cartridge 300 may be detected based on obtaining 790 cartridge information 372 from the cartridge indicator 370 of the particular cartridge 300 by the computing device 700 via operation of one or more detection devices 770 thereof. The particular cartridge 300 may be authenticated (e.g., determined to be an authentic cartridge) in response to a determination that a particular cartridge identifier code 374 that is indicated by the cartridge indicator 370, and thus is associated with the particular cartridge 300, matches (e.g., is identical to) a stored authentic cartridge identifier code 774. Such matching may include matching the particular cartridge indicator code with at least one authentic cartridge identifier code 774 that is stored in a database 732 and/or 832 of authentic cartridge identifier codes 774 that are known to be associated with one or more authentic cartridges 300.

In some example embodiments, a database 832 of authenticated cartridge identifier codes 774 may be generated at the remote system 800 in response to information received from a cartridge 300 manufacturer. Such information received at the remote system 800 from a cartridge manufacturer may include a list of "authentic" cartridge identifier codes 774 that are indicated by cartridge indicators 370 included in manufactured "authentic" cartridges 300, where "authentic" cartridges 300 are cartridges 300 which are known to be manufactured by a recognized proper cartridge manufacturer and are known to have not been already used in a cleaner dispensing system 1100 such that the cartridge reservoirs 304 of the "authentic" cartridges 300 are known to be full of an authentic cleaning composition 230. The remote system 800 may update the database 832 to add or remove authentic cartridge identifier codes 774 from the database 832 in response to information received from various sources, including a manufacturer, one or more computing devices 700 via one or more network communication links 802, or the like.

In some example embodiments, the computing device 700 may detect a particular cartridge identifier code 374 based on processing cartridge information 372 obtained from a detected cartridge indicator 370 of a particular cartridge 300 based on operation of one or more detection devices 770 of the computing device 700. The computing device 700 may transmit the an authentication request signal that includes the detected particular cartridge identifier code 374 to the remote system 800 for authentication of the detected particular cartridge identifier code 374 and further includes a request for the remote system 800 to respond with an indication of whether the particular cartridge identifier code 374 is an authentic cartridge identifier code (e.g., matches, or is identical to, at least one of the authentic cartridge identifier codes 774). The remote system 800 may, in response to receiving the authentication request signal from the computing device 700, compare the particular cartridge identifier code 374 that is included in the authentication request signal with the authentic cartridge identifier codes 774 that are stored in the database 832. In response to determining that the particular cartridge identifier code 374 matches (e.g., is identical to) one or more authentic cartridge identifier codes 774 stored in the database 832, the remote system 800 may transmit, to the computing device 700 from which the authentication request signal was received via network communication link 802, an authentication confirmation signal that includes information indicating that the particular cartridge identifier code 374 matches at least one authentic cartridge identifier code 774 and thus the particular cartridge identifier code 374 is an authentic cartridge identifier code.

The computing device 700 may determine that the particular cartridge 300 associated with the detected particular cartridge identifier code 374 is "authentic", and thus authenticate the particular cartridge 300 (e.g., determine that the cartridge 300 associated with the detected particular cartridge identifier code 374 is an authentic cartridge 300), in response to receiving the authentication response signal that includes information indicating that the particular cartridge identifier code 374 is an authentic cartridge identifier code from the remote system 800.

As shown in FIGS. 2A to 2D, in some example embodiments the remote system 800 may provide the database 832 to the computing device 700 via network communication link 802 to be stored at the memory 730 of the computing device 700 as a local database of authentic cartridge identifier codes 774. The computing device 700 may be configured to, in response to detecting a particular cartridge identifier code 374 indicated by a cartridge indicator 370 of a particular cartridge 300 that is coupled to or provided to be coupled to a cleaner dispensing apparatus 200 via cartridge information 372 obtained from the cartridge indicator 370, compare the particular cartridge identifier code 374 to the authentic cartridge identifier codes 774 stored at the local database 732. In response to determining that the detected particular cartridge identifier code 374 matches (e.g., is identical to) one or more authentic cartridge identifier codes 774 stored in the database 732, the computing device 700 may determine that the particular cartridge 300 associated with the detected particular cartridge identifier code 374 is "authentic", and thus authenticate the particular cartridge 300 that is associated with the particular cartridge identifier code 374.

The computing device 700 may, in response to authenticating the particular cartridge 300, transmit an apparatus enable command signal to a cleaner dispensing apparatus 200 that is associated with a user account 734 that is supported by the computing device 700, via the network communication link 702, to cause the controller 210 of the cleaner dispensing apparatus 200 to, in response to receiving the apparatus enable command signal, selectively enable, or "unlock," operation of at least the dispenser device 208 of the cleaner dispensing apparatus 200. For example, the computing device 700 may support a user account 734 that is associated with a particular cleaner dispensing apparatus 200 to which the computing device 700 may be communicatively linked via a network communication link 702, and the computing device 700 may associate a cartridge 300 that is associated with a detected particular cartridge identifier code 374 that is detected at the computing device 700 with the same user account 734, such that the computing device 700 may determine that the cartridge 300 associated with the detected particular cartridge identifier code 374 is provided to be coupled to (or is already coupled to) the cleaner dispensing apparatus 200 associated with the user account 734.

Selective enabling of at least the dispenser device 208 of a cleaner dispensing apparatus 200 by the controller 210 thereof may include the controller 210 re-setting the counter value of the counter implemented by the cleaner dispensing apparatus 200 to an initial counter value, to represent a new cartridge 300 having a full cartridge reservoir 304 being coupled with the cleaner dispensing apparatus 200. The computing device 700 may authenticate a cartridge 300 in association with a specific user account 734 that is represented by information stored at the computing device 700, and thus the computing device 700 may transmit the enable command signal to a specific cleaner dispensing apparatus 200 to which the computing device 700 is presently communicatively coupled (e.g., "linked") via an established network communication link 702 and/or to a specific cleaner dispensing apparatus 200 identified by the apparatus identity information 280 included in a user account 734.

In some example embodiments, the computing device 700 and/or the remote system 800 may add information identifying the authenticated cartridge (e.g., the authenticated particular cartridge identifier code 374) to information of the user account 734, to thereby track authenticated cartridges that are used in association with the user account 734. For example, in response to authenticating a cartridge 300, the computing device 700 may both associate the authenticated cartridge 300 (via the "authenticated" detected particular cartridge identifier code 374) with the user account 374 so that the authenticated cartridge 300 is associated with the cleaner dispensing apparatus 200 that is itself associated with the user account 734. The computing device 700 may thus transmit the apparatus enable command signal that is based upon authentication of the cartridge 300 to the cleaner dispensing apparatus 200 that is associated with the user account 734. In some example embodiments, the computing device 700 may simply transmit the apparatus enable command signal based on authentication of a cartridge 300 to one or any cleaner dispensing apparatus 200 that is presently communicatively coupled to the computing device 700 at the time of the authentication of the cartridge 300, independently of whether the cleaner dispensing apparatus 200 is presently associated with a user account 734 supported by the computing device 700 or not.

In some example embodiments, the cleaner dispensing apparatus 200 (e.g., controller 210) may be configured to transmit an enable confirmation signal to the computing device 700 in response to selectively enabling at least the dispenser device 208 based on a received apparatus enable command signal that is received from the computing device 700 (e.g., via the network communication link 702). The enable confirmation signal may include information identifying the apparatus enable command signal that was received at the cleaner dispensing apparatus 200 to prompt the selectively enabling and thus may be transmitted to inform the computing device 700 that the cleaner dispensing apparatus 200 or any portion thereof (e.g., dispenser device 208 operation) is selectively enabled (e.g., unlocked) in response to the apparatus enable command signal that is itself based on authentication of the cartridge 300 that is coupled to or provided to be coupled to the cleaner dispensing apparatus 200.

As noted above, the controller 210 of a cleaner dispensing apparatus 200 may selectively enable the cleaner dispensing apparatus 200 or any portion thereof (e.g., dispenser device 208 operation) in response to both 1) receiving the apparatus enable command signal and 2) determining that the electrical switch device 1280 of the cleaner dispensing apparatus 200 is in the closed-switch position prior to, concurrently with, and/or subsequently to receiving the apparatus enable command signal. In some example embodiments, the cleaner dispensing apparatus 200 may transmit the enable confirmation signal in response to operating the dispenser device 208 at least once after selectively enabling (unlocking) at least the dispenser device 208 of the cleaner dispensing apparatus 200 so as to postpone the enable confirmation signal transmission until the cartridge reservoir 304 has been at least partially used to dispense cleaning composition 230 therefrom. The control system 3000 may be configured to de-authenticate a particular cartridge 300 in response to a determination that the particular cartridge 300 has been used to selectively enable (e.g., unlock) a cleaner dispensing apparatus 200, so as to prevent re-use of the cartridge 300 to unlock (enable) one or more cleaner dispensing apparatuses 200 in the future after having been at least partially depleted of cleaning composition 230 from the cartridge reservoir 304 thereof.

In some example embodiments, the computing device 700 may, in response to transmitting the apparatus enable command signal to the cleaner dispensing apparatus 200 and/or in response to receiving the enable confirmation signal from the cleaner dispensing apparatus 200, de-authenticate the particular cartridge 300 and/or de-authenticate the authentic cartridge identifier code 774 that is matched with the detected particular cartridge identifier code 374 of the particular cartridge 300. Such de-authentication may include deleting, and/or marking as de-authenticated, the authentic cartridge identifier code(s) 774 in database 732 that matches the particular cartridge identifier code 374 used to authenticate the particular cartridge 300. Such de-authentication may include transmitting a de-authentication signal to the remote system 800 to cause the remote system 800 to delete, or mark as de-authenticated, the authentic cartridge identifier code(s) 774 in database 832 that matches the particular cartridge identifier code 374 used to authenticate the particular cartridge 300. De-authentication of an authentic cartridge identifier code 774 based on marking the code as de-authenticated may include adding or alternating information in a database 732 entry for an authentic cartridge identifier code 774, such as adding a prefix and/or altering a character of the stored authentic cartridge identifier code 774, adding information in a field of the database entry for the particular authentic cartridge identifier code 774 that identifies the code as de-authenticated, or the like. Such de-authentication of a given authentic cartridge identifier code 774, based on the code being matched with a particular cartridge identifier code 374 to authenticate a cartridge 300, may prevent the given authentic cartridge identifier code 774 from being matched with a particular cartridge identifier code 374 in the future. De-authenticating an authentic cartridge identifier code 774 that was matched to a cartridge identifier code 374 to authenticate a cartridge 300 and to subsequently enable/unlock a cleaner dispensing apparatus 200 (e.g., at least the dispenser device 208 thereof) may reduce or prevent the likelihood of future authentication of cartridges 300 having cartridge indicators 370 that indicate the same particular cartridge identifier code 374 (e.g., prevent re-use of the particular cartridge 300), for example where each cartridge 300 that may be manufactured may be associated with a unique particular cartridge identifier code 374.

In some example embodiments, in response to selectively enabling (unlocking) at least a dispenser device 208 of a particular cleaner dispensing apparatus 200, the controller 210 of the cleaner dispensing apparatus 200 may operate (e.g., actuate) the dispenser device 208 of the cleaner dispensing apparatus 200 upon elapse of a particular (e.g., fixed) amount of time based on monitoring a timer and may increment a counter value of a counter in response to each operation of the dispenser device 208, in order to track the cumulative amount of cleaning composition 230 dispensed by the cleaner dispensing system 1100 subsequently to enabling at least the dispenser device 208. The cumulative amount, represented by the counter value, may correspond in an inverse relationship to the amount of cleaning composition 230 remaining in the cartridge reservoir 304 of the particular cartridge 300 that was authenticated to facilitate enabling/unlocking of at least the dispenser device 208. In response to the counter value reaching a threshold value that is associated with depletion of the cartridge reservoir 304 of cleaning composition 230 (e.g., a first threshold counter value), the controller 210 may inhibit (e.g., disable, lock, etc.) at least the dispenser device 208 to inhibit the dispenser device 208 from future operation (e.g., actuation) in response to elapsed timer values, manual input commands (e.g., user input), etc. For example, such inhibiting of at least the dispenser device 208 may include disabling (e.g., stopping) operation of the timer, thereby preventing the timer value from reaching a threshold value that causes the controller 210 to operate (e.g., actuate) the dispenser device 208. In another example, such inhibiting of at least the dispenser device 208 may include disabling a supply of electrical power to the dispenser device 208 (e.g., operating an electrical switch to open a power supply electrical circuit) to prevent further operation of the dispenser device 208. The cleaner dispensing apparatus 200 (e.g., controller 210) may be configured to re-enable (e.g., unlock, activate, etc.) at least the dispenser device 208 in response to subsequently receiving a new apparatus enable command signal from the computing device 700, which the computing device 700 may transmit in response to authenticating a new cartridge 300 to replace the depleted cartridge 300.

Figure 3:
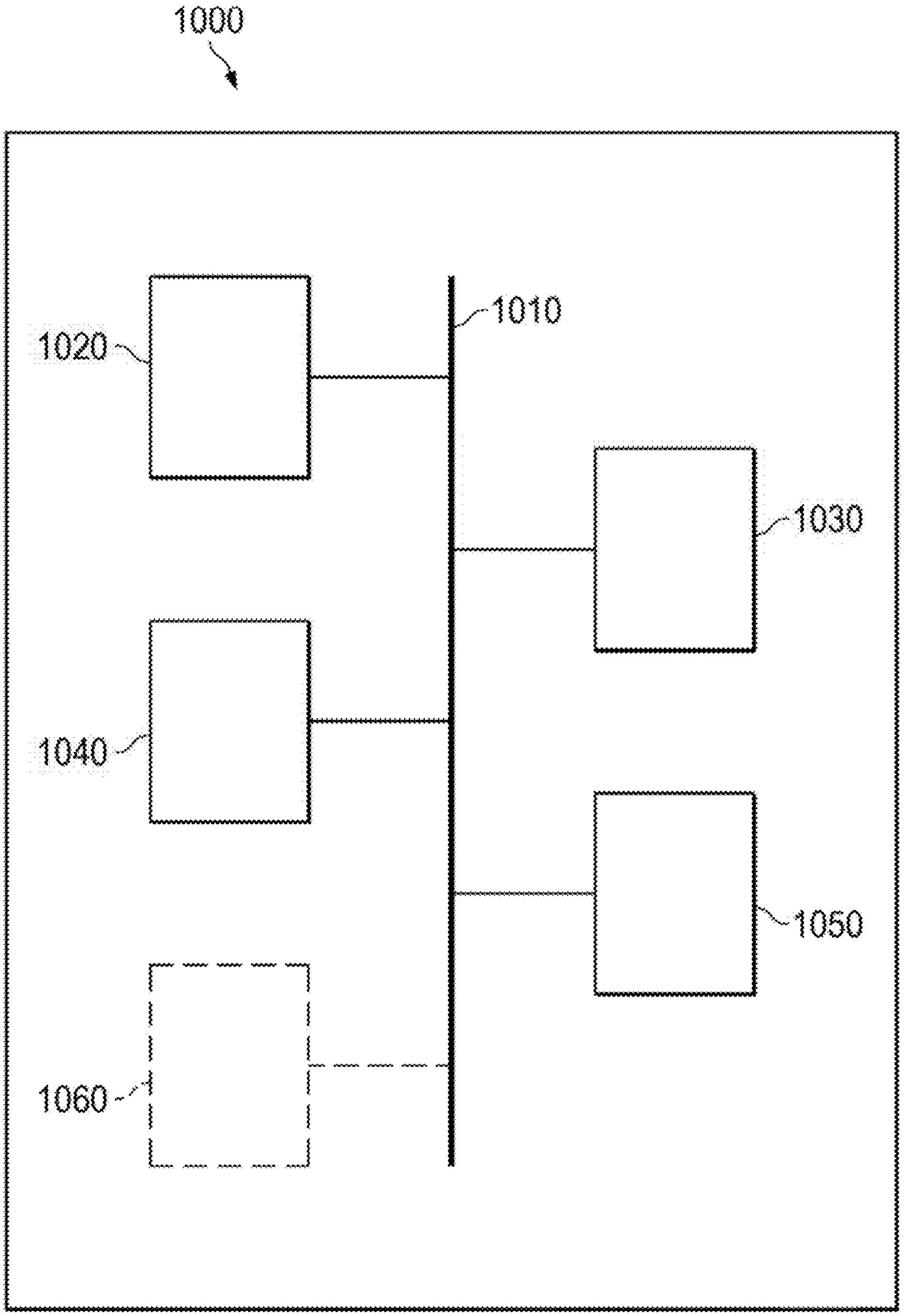
FIG. 3 is a schematic view of a computing device according to some example embodiments.

FIG. 3 is a schematic view of a controller of a computing device 1000 according to some example embodiments. The computing device 1000 may implement any of the computing devices, controllers, processors, or the like according to any of the example embodiments, including controller 140, controller 210, any portion of computing device 700, and any portion of any portion of remote system 800 and/or any remote computing device 810 configured to implement some or all of remote system 800.

As shown in FIG. 3, the computing device 1000 may include some or all of a processor 1020 (e.g., a CPU), a memory 1030 (e.g., a solid state drive, or SSD), a communication interface 1040 (e.g., a wireless network communication interface, which may for example implement network communication interface 224, network communication interface 750, a network communication interface of the air conditioning system 100, or the like), and a power supply 1050 that are communicatively coupled together via a bus connection 1010. It will be understood that any type of non-transitory computer readable storage device may be used as the memory 1030 in addition or alternative to an SSD. The computing device 1000 may include additional devices, including a user interface device 1060 (e.g., "interface") that may include a display device (e.g., an LED display screen, OLED display screen, etc.), a touchscreen display, a button interface, any combination thereof, or the like. The user interface device 1060 may be communicatively coupled to the bus connection 1010.

In some example embodiments, some or all of any of the computing device 1000 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. In some example embodiments, the processing circuitry may include a non-transitory computer readable storage device, or memory (e.g., memory 1030), for example a solid state drive (SSD), storing a program of instructions, and a processor (e.g., processor 1020) that is communicatively coupled to the non-transitory computer readable storage device (e.g., via a bus connection 1010) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., controller 210, cleaner dispensing apparatus 200, controller 140, air conditioning system 100, computing device 700, remote system 800, etc.) will be understood to implement the functionality of said implemented element and/or any other elements (e.g., the functionality of the controller 210, the functionality of the cleaner dispensing apparatus 200, the functionality of the controller 140, the functionality of the air conditioning system, the functionality of the computing device 700, remote system 800, etc.).

Figure 4:
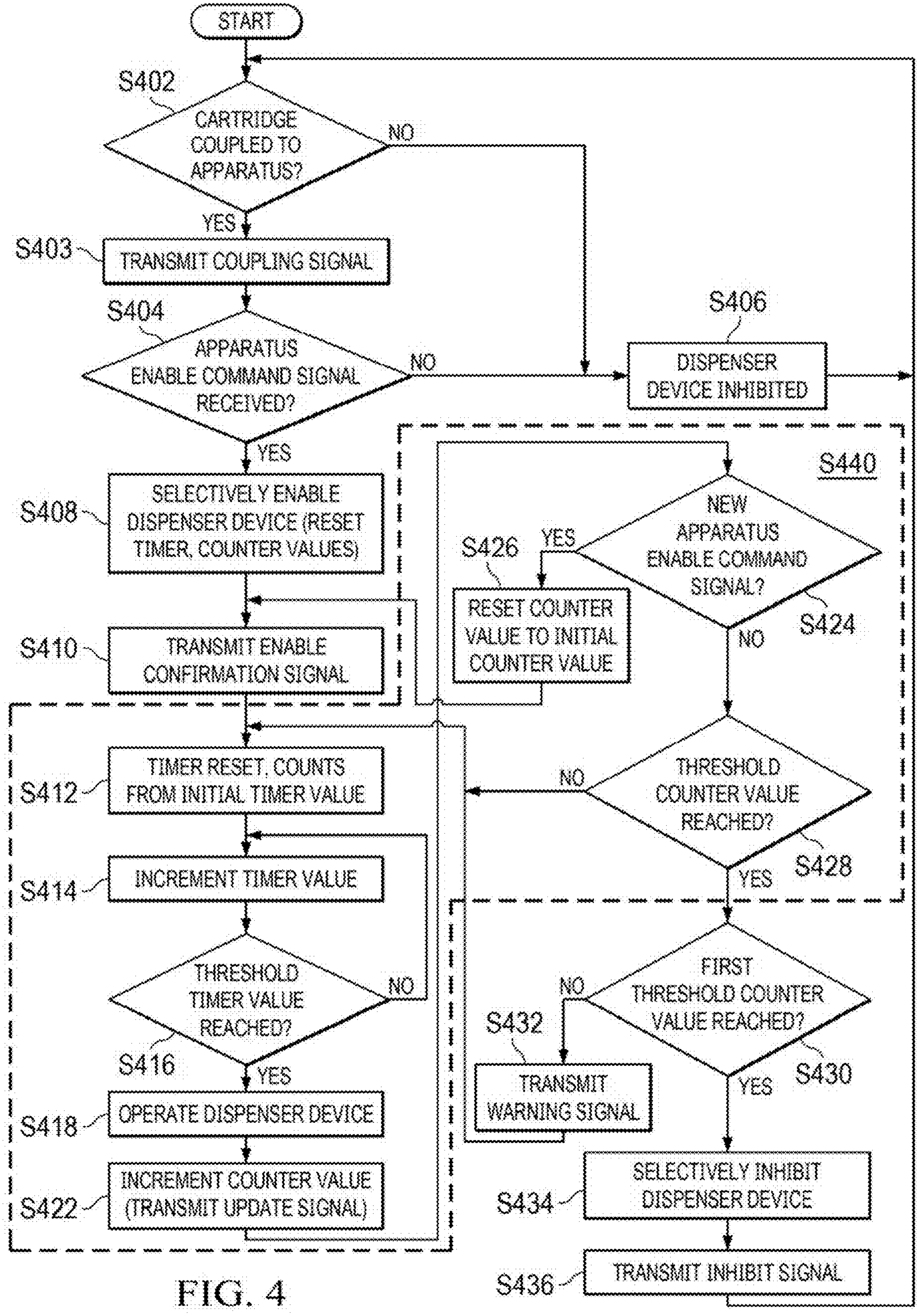
FIG. 4 is a flowchart illustrating a method of operation of the cleaner dispensing apparatus according to some example embodiments.

FIG. 4 is a flowchart illustrating a method of operation of the cleaner dispensing apparatus 200 according to some example embodiments. The method shown in FIG. 4 may be implemented by any example embodiment of the cleaner dispensing apparatus 200 according to any example embodiments.

It will be understood that operations of the method shown in FIG. 4 may be changed in order relative to what is shown in FIG. 4. It will further be understood that one or more operations of the method shown in FIG. 4 may be omitted from the method shown in FIG. 4. It will further be understood that one or more operations may be added to the method shown in FIG. 4.

Referring to FIG. 4, the method shown in FIG. 4 includes a method for operating a cleaner dispensing apparatus 200 according to any of the example embodiments to dispense (e.g., supply, etc.) a cleaning composition 230 through an apparatus outlet 240 thereof. Some or all of the operations of the method shown in FIG. 4 may be implemented by controller 210, for example based on a processor of the controller 210 executing a program of instructions stored at a memory of the controller 210.

As shown, the method of FIG. 4 includes controlling a dispenser device 208 of the cleaner dispensing apparatus 200 to cause the dispenser device 208 to dispense an amount (e.g., 3 oz) of the cleaning composition 230 from a reservoir in fluid communication with an inlet of the dispenser device 208 (e.g., an internal reservoir 206 of the cleaner dispensing apparatus 200, a cartridge reservoir 304 of a cartridge 300 detachably coupled to the cleaner dispensing apparatus 200) and through the apparatus outlet 240 without manual intervention (e.g., without human intervention). It will be understood that some or any of the operations shown in FIG. 4 may be performed (e.g., performed by controller 210) without human intervention (e.g., some or any operations may be performed by controller 210 based on programming of the controller 210 and may be performed independently of any commands or signals received at the controller 210 based on human interaction with an interface (e.g., button, touchscreen display, etc.)).

At S402, the controller 210 determines whether a cartridge 300 is coupled to the cleaner dispensing apparatus 200. Such a determination may include determining whether an electrical circuit of the cleaner dispensing apparatus 200 which extends through electrical switch device 1280 of the cleaner dispensing apparatus 200 is closed, based on the electrical switch device 1280 is in a closed-switch position. If so (S402=YES), at S403 the controller 210 may transmit a coupling signal S403 to a computing device 700 with which the cleaner dispensing apparatus 200 is linked via network communication link 702 to indicate that a new cartridge 300 is coupled to the cleaner dispensing apparatus 200, and the method may further proceed to S404. If the cleaner dispensing apparatus 200 is determined to not be coupled to a cartridge 300, for example in response to a determination that the electrical circuit of the apparatus which extends through electrical switch device 1280 is open based on the electrical switch device 1280 is in an open-switch position (S402=NO), at S406 the controller 210 causes at least the dispenser device 208 of the cleaner dispensing apparatus 200 to be selectively inhibited ("locked") and/or maintained in an inhibited state.

In some example embodiments, in response to determining that a cartridge 300 is coupled to the cleaner dispensing apparatus 200 (S402=YES), for example in response to a determination that the electrical switch device 1280 has moved from a closed-switch position to an open-switch position and then subsequently returned to the closed-switch position within a particular period of time (e.g., 2 minutes), the controller 210 may cause the coupling signal to be transmitted at S403 to the computing device 700 via the network communication link 702 to indicate that a new cartridge 300 is coupled to the cleaner dispensing apparatus 200.

At S404, the controller 210 determines whether an apparatus enable command signal is received at the cleaner dispensing apparatus 200. Such an apparatus enable command signal may be received at the cleaner dispensing apparatus 200 from a computing device 700 via the network communication link 702. The apparatus enable command signal may include and/or indicate a command to selectively enable (e.g., unlock) operation of at least the dispenser device 208 of the cleaner dispensing apparatus 200. For example, the apparatus enable command signal may include a command to close a power supply switch of the cleaner dispensing apparatus 200 to enable a supply of electrical power to the dispenser device 208. In another example, the apparatus enable command signal may include a command to initialize, enable, etc. a timer that is used to determine whether to operate (e.g., actuate) the dispenser device 208.

If no apparatus enable command signal is received at the cleaner dispensing apparatus 200 (S404=NO), for example in response to a determination that no unlocking command signal is received within a particular fixed period of time (e.g., 5 seconds), at S406 the controller 210 causes at least the dispenser device 208 to be inhibited (e.g., disabled, deactivated, "locked", etc.) and/or maintained in an inhibited state. As described herein, inhibiting at least the dispenser device 208 may include disabling a supply of electrical power to the dispenser device, disabling the timer used as described herein to trigger operation of the dispenser device 208, configuring the controller 210 to ignore commands to operate (e.g., actuate) the dispenser device 208, or the like.

In response to a determination that an apparatus enable command signal is received at the cleaner dispensing apparatus 200 (S404=YES), for example in response to a determination that an apparatus enable command signal is received within a particular fixed period of time (e.g., 5 seconds) of a determination that a cartridge 300 is coupled to the cleaner dispensing apparatus 200 (S402=YES), at S408 the controller 210 causes at least the dispenser device 208 to be selectively enabled (e.g., activated, initialized, "unlocked", etc.). Such selective enablement of at least the dispenser device 208 may include one or more of closing an electrical switch to enable a supply of electrical power to the dispenser device 208, re-setting the timer value of the timer to an initial value (e.g., a timer value of zero) and activating the timer to begin counting (e.g., incrementing) a timer value thereof at a particular (e.g., fixed) frequency, setting or re-setting the counter value of the counter as described herein to an initial counter value (e.g., a counter value of zero) and activating the counter to increment in response to each successive operation (e.g., actuation) of the dispenser device 208, configuring the controller 210 to operate (e.g., actuate) the dispenser device 208 in response to commands to operate the dispenser device, or any combination thereof. Some or all above-noted operations described above to be included in the selective enablement at S408 may be referred to interchangeably as being performed in response to the selective enablement. For example, the cleaner dispensing apparatus may, at S408, set or re-set the counter value of the counter to the initial counter value in response to selectively enabling operation of at least the dispenser device 208.

It will be understood that the determination at S402 may be performed concurrently with the determination at S404 or in response to S404=YES, so that the method proceeds to S408 in response to a combination of both S402=YES and S404=YES. In some example embodiments, the method shown in FIG. 4 proceeds to S408 in response to simultaneously determining that S402=YES and S404=YES and/or in response to determining that S402=YES and S404=YES within a particular fixed time window (e.g., determining both S402=YES and S404=YES within a 5-second time period starting at performing one or both of S402 or S404) and, if not (e.g., if S402 and S404 are not determined to be "YES" simultaneously or within a certain, particular time window), proceeds to S406. It will be understood that in some example embodiments the electrical switch device 1280 may be absent from the cleaner dispensing apparatus 200, and thus at least operation S402 may be omitted from the method so that the method proceeds to S408 if S404=YES.

At S410, in response to the dispenser device 208 being selectively enabled (unlocked), the controller 210 causes an enable confirmation signal to be transmitted from the cleaner dispensing apparatus 200, for example transmitted to the computing device 700 via the network communication link 702. The enable confirmation signal may include information indicating that at least the dispenser device 208 is enabled (e.g., unlocked) in response to a specific apparatus enable command signal determined to be received at S404. The enable confirmation signal may include information identifying the specific apparatus enable command signal upon which the selective enablement at S408 and the enable confirmation signal at S410 are based. For example, the apparatus enable command signal received at S404 may indicate a particular code, for example a particular cartridge identifier code 374, and the enable confirmation signal may thus indicate the same particular cartridge identifier code. As described herein with regard to FIGS. 5, 8A and 8B, and 9A and 9B, the computing device 700 may respond to the enable confirmation signal by at least de-authenticating an authentic cartridge identifier code that matches the particular cartridge identifier code 374 as described herein (e.g., the particular cartridge identifier code 374 indicated in the enable confirmation signal at S410), in order to prevent future unlocking of at least the dispenser devices 208 of one or more cleaner dispensing apparatuses 200 based on the same particular cartridge identifier code 374.

At S412, the controller 210 causes the timer of the controller 210 to reset the timer value thereof to an initial timer value (e.g., zero) so that the timer may count from the initial timer value. At S414, the timer of the controller 210 may count (e.g., increment the timer value at a fixed frequency) from the initial timer value (e.g., 0). At S416, the controller 210 compares the present (e.g., incremented) timer value with a threshold (e.g., particular) timer value (e.g., 7 days) that may be stored at the controller 210 and determines whether the present timer value has reached (e.g., is equal to or greater than) the threshold timer value. If not (S416=NO), the controller 210 permits the timer to continue to increment at S414. If so (S416=YES), at S418 the controller 210 operates (e.g., actuates) the selectively-enabled dispenser device 208 (e.g., causes electrical power to be supplied to the dispenser device 208 to cause the dispenser device 208 to operate, actuate, etc.) to cause the dispenser device 208 to dispense (e.g., pump, supply, etc.) a particular amount of cleaning composition 230 (e.g., 3 oz) through the outlet 2080 to the apparatus outlet 240, thereby operating the dispenser device 208 in response to an elapse of a particular period of time.

At S422, in response to the operating at S418, the controller 210 causes the counter to count (e.g., increment) the counter value, thereby tracking a quantity of dispenser device operations, dispsensings, actuations, or the like (S418) and thus tracking a cumulative amount of cleaning composition 230 that is dispensed during the period in which the dispenser device 208 is enabled (e.g., unlocked).

At S424, a determination is made regarding whether a new apparatus enable command signal (which may indicate a new authenticated cartridge identifier code 374) is received from a computing device 700 at the cleaner dispensing apparatus 200 to cause the controller 210 to, at S426, re-enable (e.g., re-set) the dispenser device 208, which may include resetting the counter value to the initial counter value. If a new apparatus enable command signal is determined to be received at S424 (S424=YES), at S426 the controller 210 resets the counter value to the initial counter value (e.g., zero) and proceeds to S410 to transmit a new enable confirmation signal indicating that at least the dispenser device 208 is selectively (re) enabled in response to the new apparatus enable command signal to the computing device 700, and proceeds to S412 to reset the timer value and then resume incrementing of the timer value at S414. If not (S424=NO), the method proceeds to S428 without performing the reset at S426.

At S428, the controller 210 compares the present (e.g., incremented at S422) counter value with one or more threshold (e.g., particular) counter values (e.g., 10, 11, 12, etc.) that may be stored at the controller 210 and determines whether the present counter value (e.g., as incremented at S422) has reached (e.g., is equal to or greater than) the one or more threshold counter values. If not (S428=NO), the controller 210 returns to S412 to reset the timer value and then resume incrementing of the timer value at S414. If so (S428=YES), at S430 a further determination is made regarding whether the present counter value is equal or greater than a first threshold counter value which may be a final depletion threshold counter value (e.g., 12) that indicates complete depletion (e.g., final depletion) of cleaning composition 230 held in the cartridge reservoir 304 of the cartridge 300 presently coupled to the cleaner dispensing apparatus 200.

In some example embodiments, the operations performed at S412 to S428 may encompass an operation at S440 of controlling the cleaner dispensing apparatus 200 to repeatedly (e.g., iteratively) operate the dispenser device 208 to repeatedly (e.g., iteratively) dispense cleaning composition 230 received at the dispenser device 208 from the cartridge reservoir 304 of the cartridge 300 coupled to the cleaner dispensing apparatus 200. Such an operation at S440 may further encompass operations S430 and S432, exclude operation S428, or the like. The operation at S440 may terminate upon a determination that the first threshold counter value is reached (S430=YES). It will be understood that the cleaner dispensing apparatus 200 may transmit one or more update signals to a computing device 700 via network communication link 702 in response to performing one or more of operations S412-S440, including for example in response to an incrementing of the counter value at S422, to enable the computing device 700 to maintain a present indication of the present counter value and thus an indication of the amount of dispensing operations and/or the amount of cleaning composition remaining with regard to the presently-coupled cartridge 300 (e.g., the number of remaining dispensing associated with the presently-coupled cartridge 300 may be a difference between the present counter value and the first threshold counter value).

If the present counter value is not equal to or greater than the first threshold counter value, thereby indicating that the present counter value at least meets a second threshold counter value indicating that the cartridge reservoir 304 is partially depleted but not totally depleted, (S428=YES and S430=NO, e.g., a second "partial depletion" threshold counter value of 11 is determined to be reached at S428 but the first "final depletion" threshold counter value of 12 is determined to not be reached at S430), then at S432 the controller 210 transmits a warning signal (which may also be referred to interchangeably herein as an order command signal, a warning/order signal, or the like) to the computing device 700 via the network communication link 702 and may then proceed to S412 to reset the timer value and then resume incrementing of the timer value at S414.

The controller 210 may monitor multiple possible threshold counter values, including a "second threshold counter value" partial depletion threshold counter value (e.g., 10 and/or 11) and a "first threshold counter value" final depletion threshold counter value (e.g., 12) and the controller 210 may generate a particular warning signal at S432 that indicates that the second threshold counter value is reached, thereby indicating at least partial depletion of cleaning composition 230 held in the cartridge reservoir 304 of the particular cartridge 300 that is detachably coupled to the cleaner dispensing apparatus 200) at S432. Restated, the warning signal may include information indicating that the cartridge reservoir 304 of the cartridge 300 that is presently coupled to the cleaner dispensing apparatus 200 contains an amount of the cleaning composition that is equal to or less than a threshold amount (e.g., a near-depletion threshold amount) as indicated by the present counter value of the counter as determined at least at S428 (and further indicated to be a counter value that is less than the first threshold value which indicates complete depletion of the cartridge reservoir 304 at S430=NO). The controller 210 may cause the warning signal to be transmitted to a computing device 700 via a network communication link 702 to cause the computing device 700 to respond to the warning signal as described further herein. As described herein with regard to FIGS. 6, 8A and 8B, and 9A and 9B, the computing device 700 may respond to receipt of the warning signal transmitted at S432 by causing one or more new cartridges 300 to be purchased and/or ordered (collectively referred to herein as simply being ordered) such that the one or more new cartridges 300 are caused to be delivered to a specific physical mailing address, which may be a physical mailing address that is associated with a user account 734 that is further associated with the cleaner dispensing apparatus 200 as described herein so that the physical mailing address is understood to be associated with the cleaner dispensing apparatus 200 that is performing the method shown in FIG. 4, to replace the near-depleted cartridge 300 that is presently detachably coupled to the cleaner dispensing apparatus 200.

If, at S430, the controller 210 determines that the threshold counter value that is reached by the present counter value at S428 includes (e.g., is equal to or greater than) a first threshold counter value (e.g., 12) that indicates complete depletion (e.g., final depletion) of cleaning composition 230 held in the cartridge reservoir 304 of the cartridge 300 presently coupled to the cleaner dispensing apparatus 200 (e.g., S430=YES), at S434 the controller 210 inhibits (e.g., deactivates, "locks", disables etc.) at least the dispenser device 208 of the cleaner dispensing apparatus 200 to prevent further operation of the dispenser device 208 in response to a present timer value, manual dispensing command, or the like. As described with regard to S406, such inhibiting of at least the dispenser device 208 may include disabling a supply of electrical power to the dispenser device, disabling the timer used as described herein to trigger operation of the dispenser device 208, configuring the controller 210 to ignore commands to operate (e.g., actuate) the dispenser device 208, or the like.

Accordingly, as shown at S408, S440, S430, and S434, the cleaner dispensing apparatus 200 may, at S408, set a counter value of a counter to an initial counter value in response to the selectively enabling the operation of at least the dispenser device 208, operate the dispenser device at S440 (S418 therein), subsequently to the selectively enabling the operation of the dispenser device 208, to dispense the cleaning composition 230 received at the dispenser device 208 from the cartridge reservoir, increment the counter value at S440 (S422 therein) in response to each operation of the dispenser device 208 to dispense the cleaning composition 230 to the apparatus outlet 240, and selectively inhibit operation of at least the dispenser device 208 at S434, in response to a determination at S430 that the counter value at least meets a first threshold counter value associated with depletion of the cleaning composition 230 in the cartridge reservoir 304 of the cartridge 300.

In some example embodiments, the first threshold counter value indicates that the remaining amount of cleaning composition 230 in the cartridge reservoir 304 of the presently coupled cartridge 300 is at or below a threshold amount and is greater than a complete depletion (e.g., null value) of cleaning composition 230 in the cartridge reservoir 304, such that there is at least some cleaning composition 230 remaining in the cartridge reservoir 304 when the first threshold counter value is reached (S430=YES) and the cleaner dispensing apparatus 200 responsively selectively inhibits operation of at least the dispensing device 208 at S434. As a result, the cleaner dispensing apparatus 200 may prevent the cartridge reservoir 304 of the presently coupled cartridge 300 from becoming completely depleted of cleaning composition 230 based on causing selectively inhibited operation of at least the dispenser device 208 prior to such complete depletion occurring due to excessive operation of the dispenser device 208 at S440 and S418.

The threshold value against which the present counter value is compared at S428 may be the same as the first threshold counter value against which the present counter value is compared at S430 or a different threshold counter value from the first threshold counter value. In some example embodiments, the determination at S428 is a determination of whether the present counter value (the counter value as incremented in the most recent previous operation of S422) is equal to or greater than (e.g., at least meets, has reached, etc.) at least the second threshold counter value that is a smaller counter value than the first threshold counter value (e.g., is between the initial counter value and the first threshold counter value). For example, in some example embodiments where the initial counter value is a value of "0," the first threshold counter value is a value of "12" and the second threshold counter value is a value of "11", and where the present counter value as incremented in the most recent previous operation of S422 is an integer value inclusively between "1" and "10" and thus is smaller than "11", the determination at S428 may include a determination that the present counter value is a value that is less (e.g., smaller) than the second threshold counter value of "11" (S428=NO) and the method may in response proceed to S412 of a next iteration of operation S440 in response to a determination. In another example, in example embodiments where the initial counter value is "0," the first threshold counter value is a value of "12" and the second threshold counter value is a value of "11", and where the present counter value as incremented in the most recent previous operation of S422 is an integer value equal to or greater than "11" and thus is equal to or greater than "11", the determination at S428 may include a determination that the present counter value is a value that is equal to or greater than (e.g., at least meets, has reached, etc.) the second threshold counter value of "11" (S428=YES) and the method may in response proceed to S430. At S430, in response to a determination that the present counter value is less than the first threshold counter value of "12" (e.g., the present counter value is "11", such that S430=NO), the method proceeds to S432. At S430 in response to a determination that the present counter value is equal to or greater than (e.g., at least meets, has reached, etc.) the first threshold counter value of "12" (e.g., the present counter value is "12", such that S430=YES), the method proceeds to S434.

In response to the dispenser device 208 being inhibited at S434, at S436 the controller 210 transmits an inhibit signal indicating that at least the dispenser device 208 of the cleaner dispensing apparatus 200 is inhibited (locked), such that the cleaner dispensing apparatus 200 itself is inhibited. The controller 210 may cause the inhibit signal to be transmitted to the computing device 700 via the network communication link 702 to inform the computing device 700 that the final depletion threshold counter value (e.g., first threshold counter value) is reached (indicating that the cartridge 300 detachably coupled to the cleaner dispensing apparatus 200 is completely depleted of cleaning composition 230) and to further indicate that at least the dispenser device 208 of the cleaner dispensing apparatus 200 is presently inhibited. As described herein with reference to FIGS. 6, 8A and 8B, and 9A and 9B, the computing device 700 may respond to such an inhibit signal by providing a notification to a user supported by the computing device 700 via an interface 760 and/or to a remote system 800 via network communication link 802.

In response to the dispenser device 208 being inhibited at S434 and/or the inhibit signal being transmitted at S436, the method implemented by the controller 210 at FIG. 4 may then return to S402 to await a new apparatus enable command signal (transmitted from the computing device 700 and/or determination of coupling of a new cartridge 300 to the cleaner dispensing apparatus 200 to replace the depleted cartridge 300.

Figure 5:
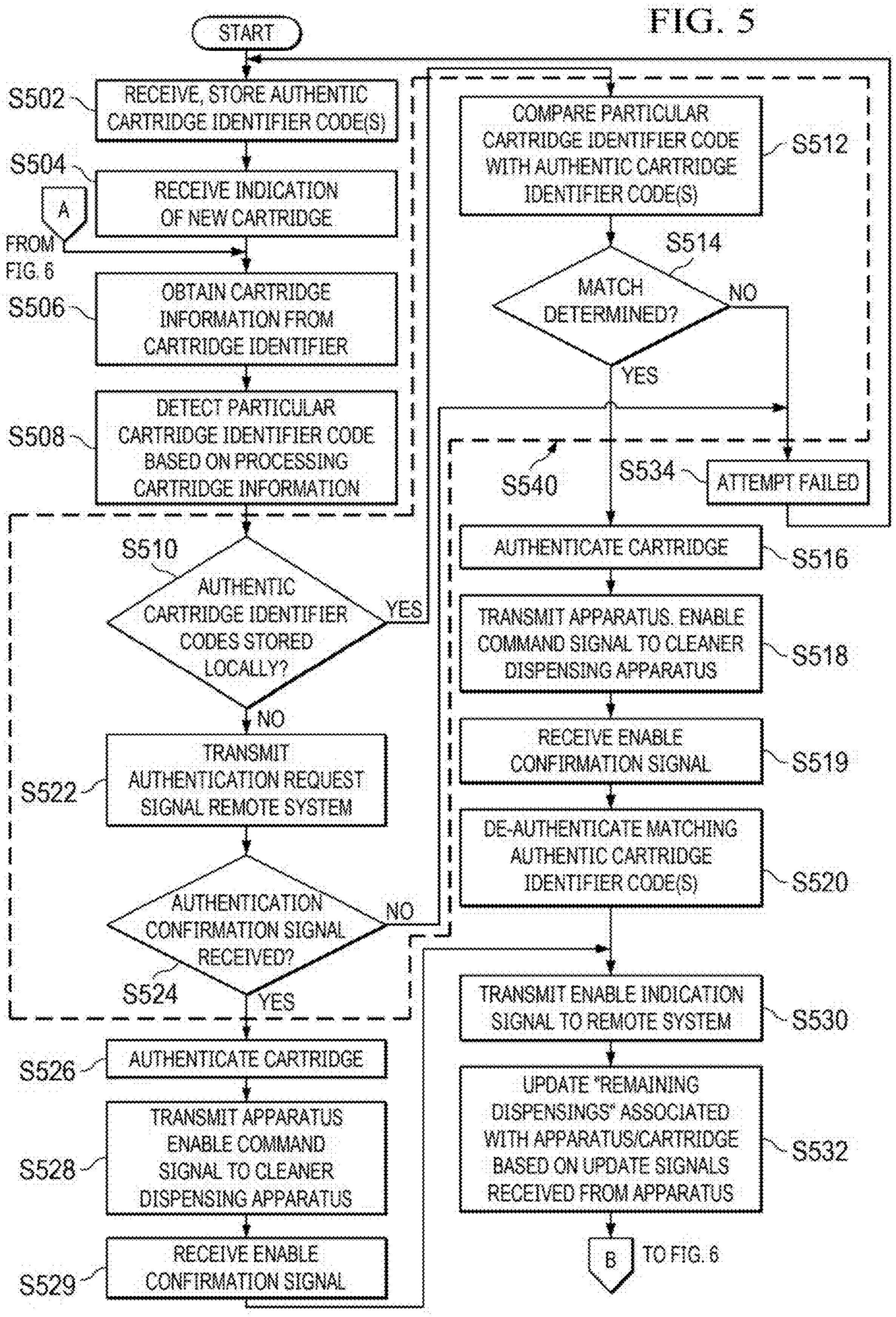
FIG. 5 is a flowchart illustrating a method of operation of the computing device according to some example embodiments.
Figure 6:
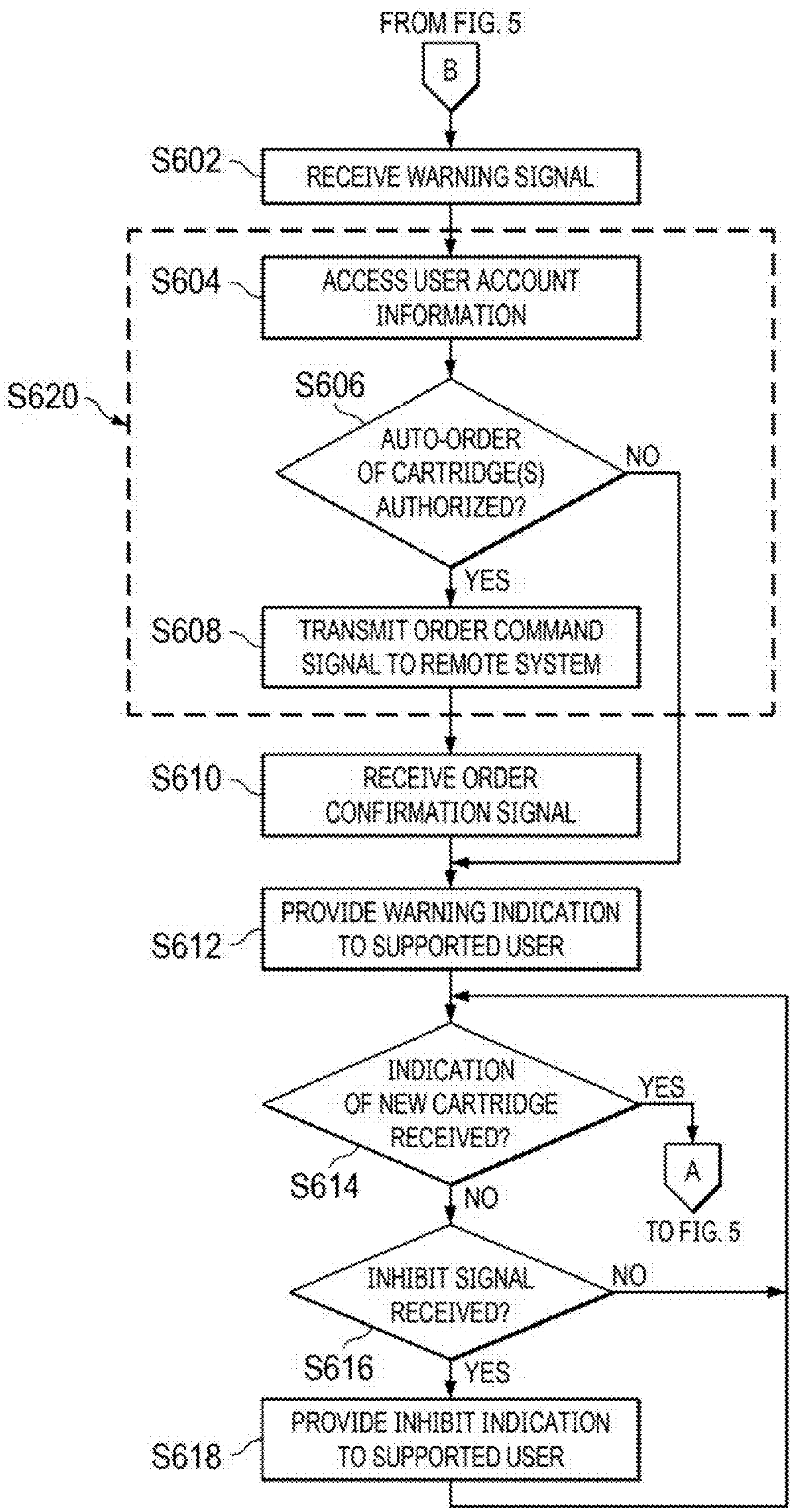
FIG. 6 is a flowchart illustrating a method of operation of the computing device according to some example embodiments.
Figure 7:
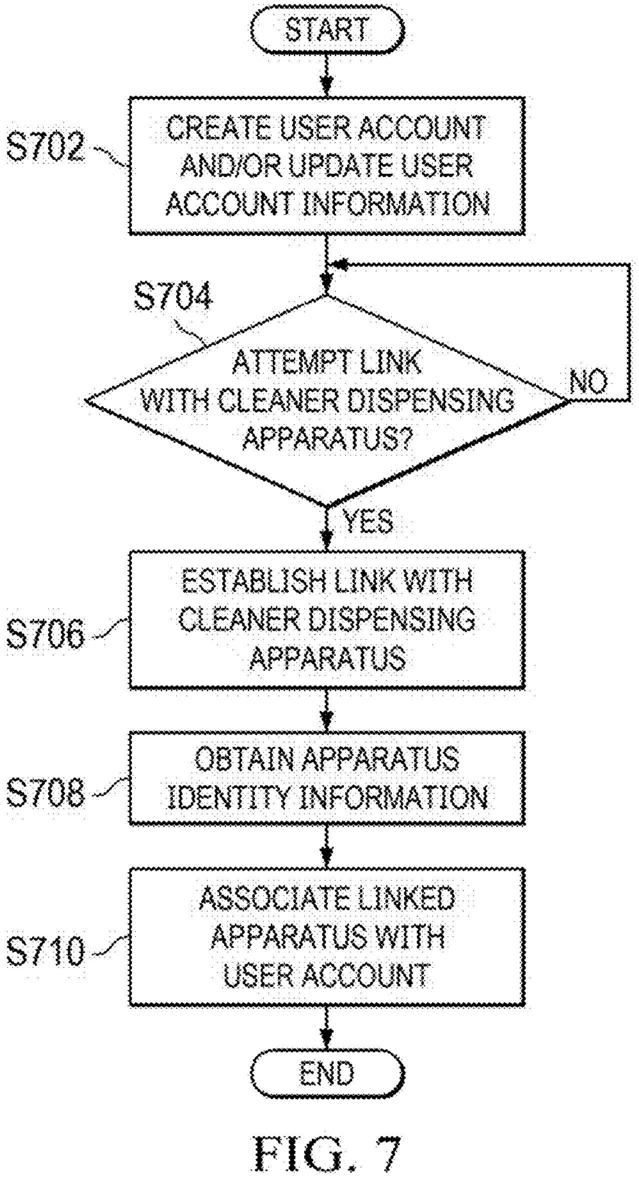
FIG. 7 is a flowchart illustrating a method of operation of the computing device according to some example embodiments.
Figure 8A:
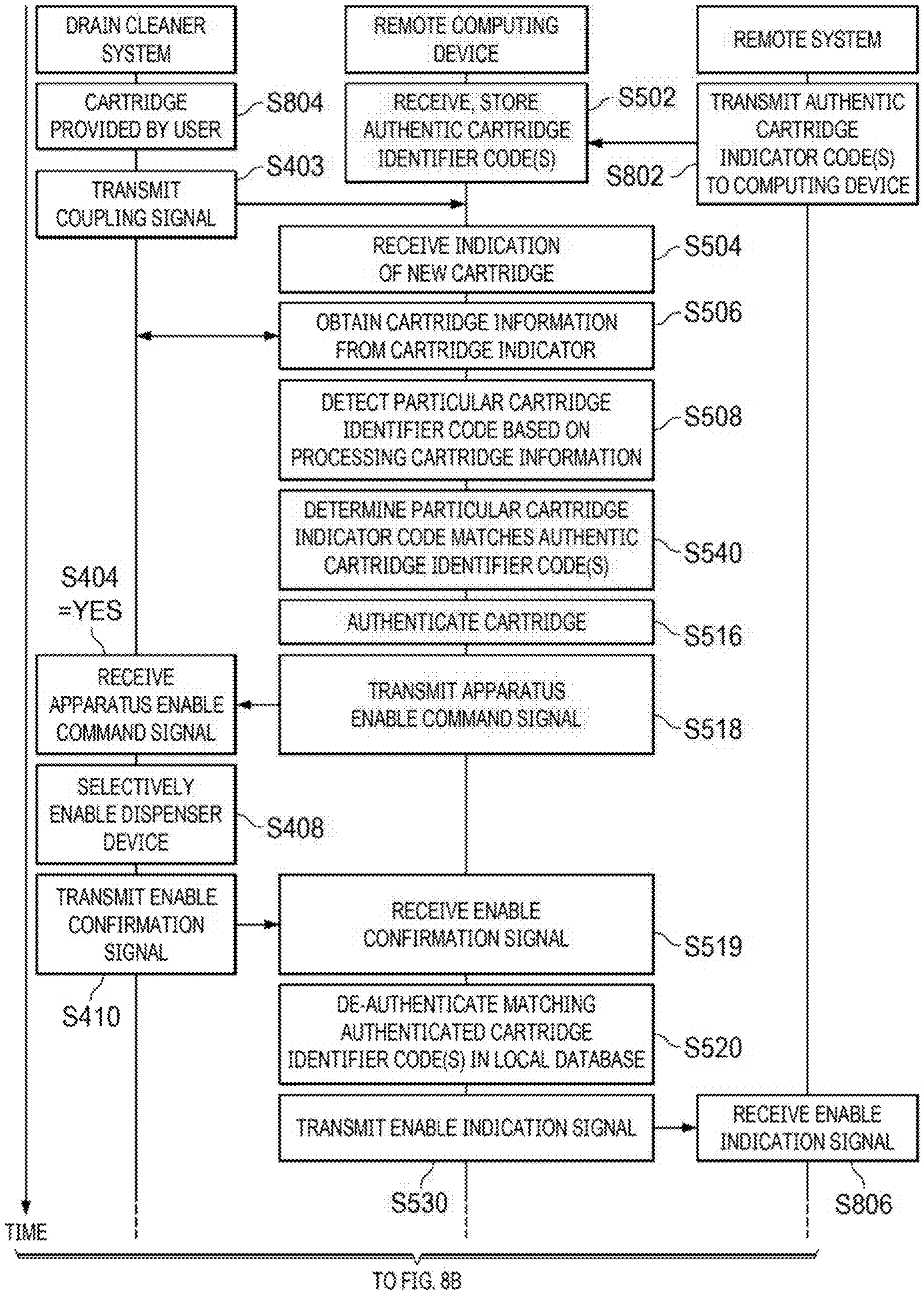
FIGS. 8A and 8B are flowcharts illustrating a method of operation of a control system according to some example embodiments.
Figure 8B:
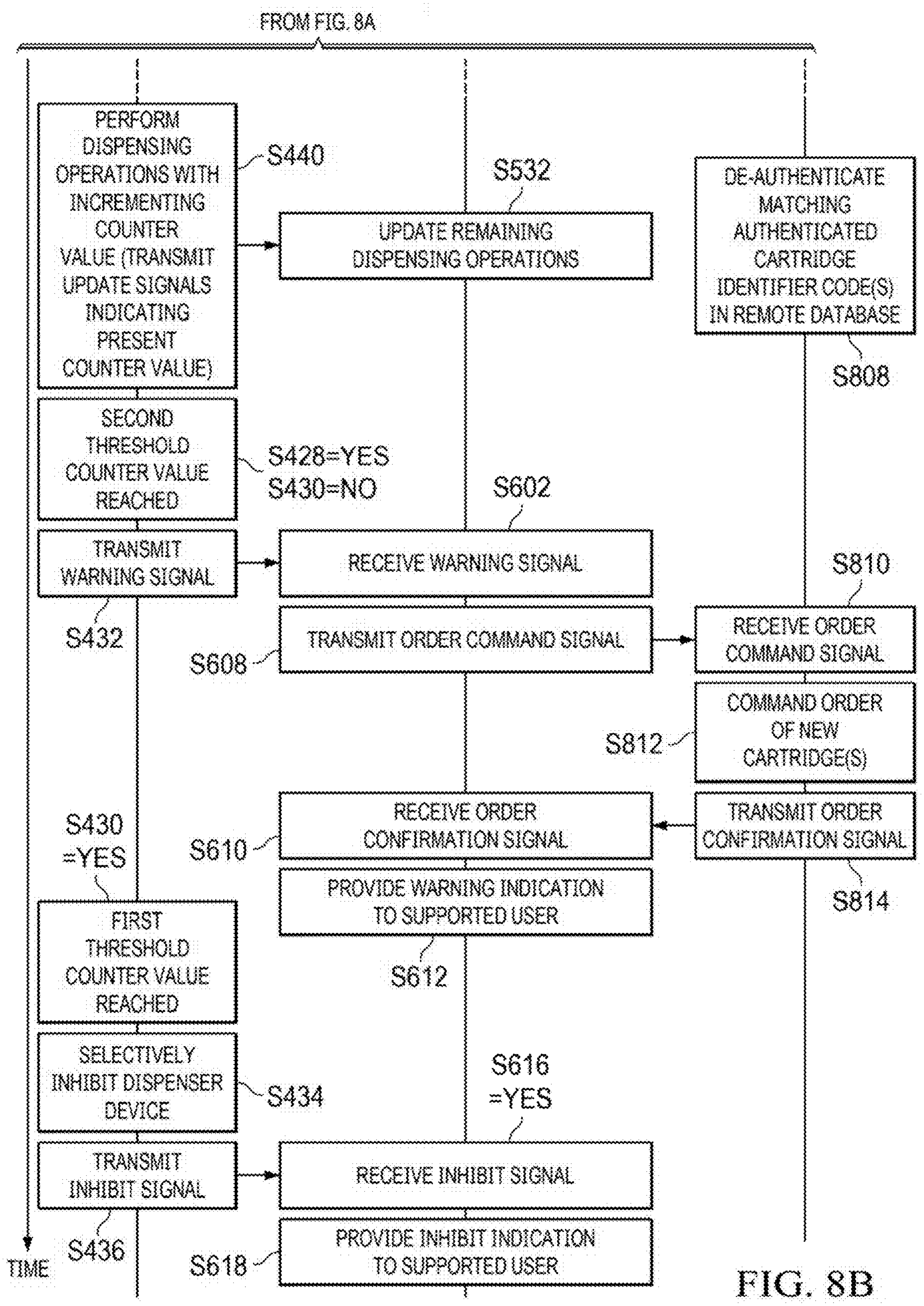
Figure 9A:
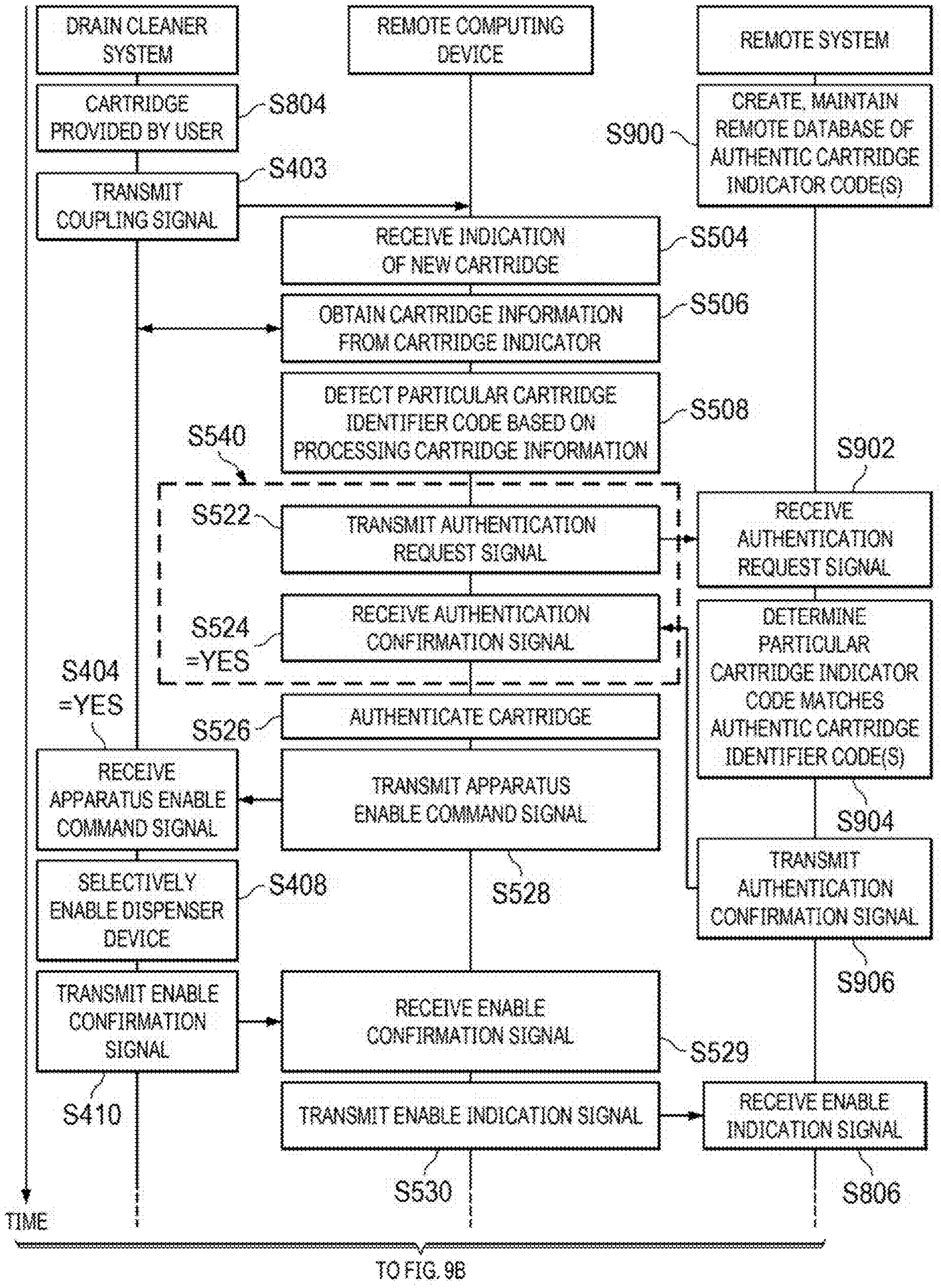
FIGS. 9A and 9B are flowcharts illustrating a method of operation of a control system according to some example embodiments.
Figure 9B:
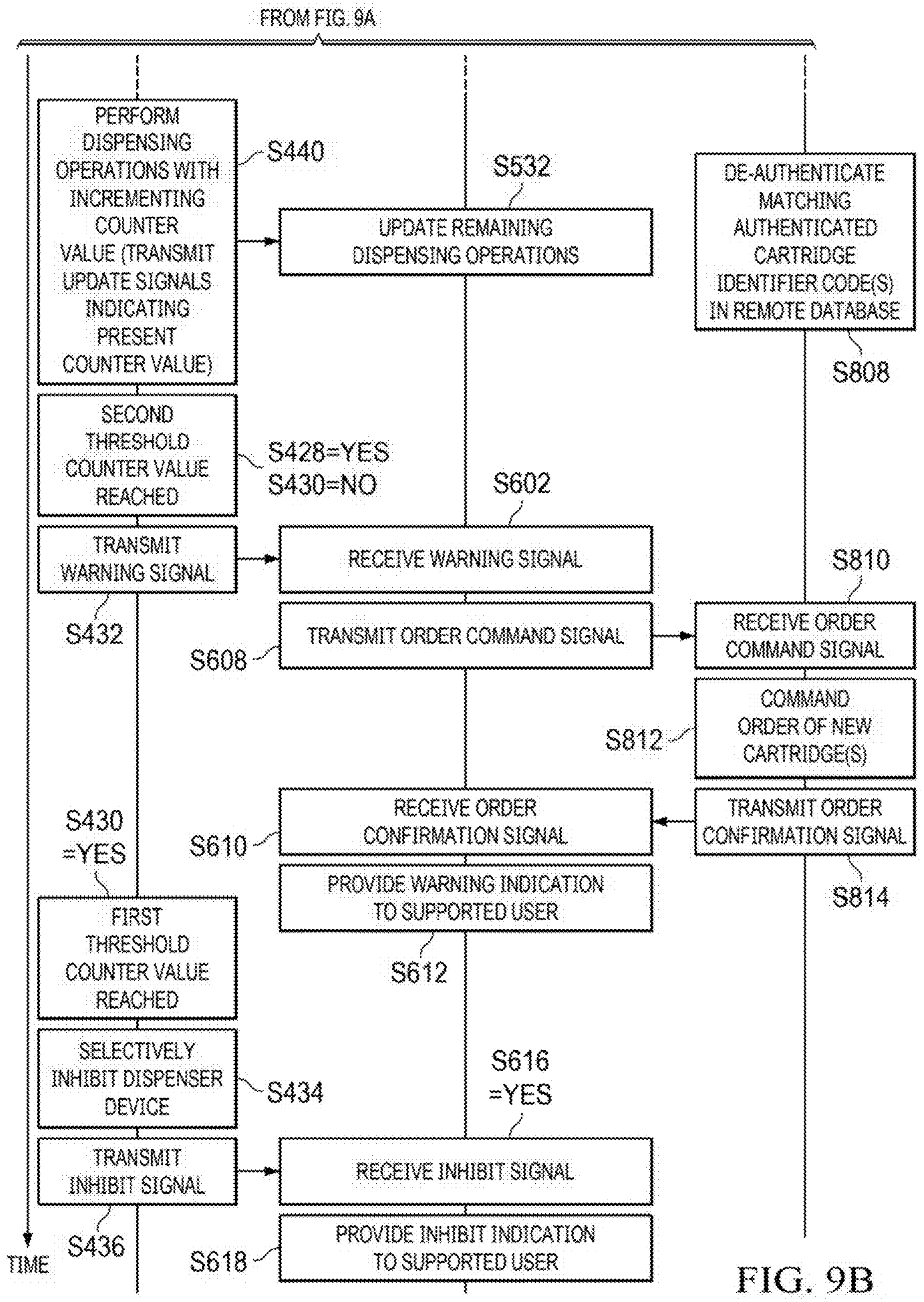

FIG. 5 is a flowchart illustrating a method of operation of the computing device 700 according to some example embodiments. FIG. 6 is a flowchart illustrating a method of operation of the computing device 700 according to some example embodiments. FIG. 7 is a flowchart illustrating a method of operation of the computing device 700 according to some example embodiments. FIGS. 8A and 8B are flowcharts illustrating a method of operation of the control system 3000 according to some example embodiments. FIGS. 9A and 9B are flowcharts illustrating a method of operation of the control system 3000 according to some example embodiments. The methods shown in FIGS. 5, 6, and 7 may be implemented by any example embodiment of the computing device 700 according to any example embodiments. The methods shown in FIGS. 8A, 8B, 9A, and 9B may be implemented by any example embodiment of the control system 3000 according to any example embodiments. It will be understood that operations of the methods shown in FIGS. 5 to 9B may be changed in order relative to what is shown in any of FIGS. 5 to 9B. It will further be understood that one or more operations of any of the methods shown in FIGS. 5 to 9B may be omitted from the respective methods shown in FIGS. 5 to 9B. It will further be understood that one or more operations may be added to any of the methods shown in FIGS. 5 to 9B.

Referring to FIG. 5, the method shown in FIG. 5 includes a method for operating a computing device 700 of control system 3000 according to any of the example embodiments to control operation of a cleaner dispensing system 1100 (e.g., selective enablement and/or inhibiting of at least a dispenser device 208 of a cleaner dispensing apparatus 200 thereof) via the network communication link 702 and to further interact with a remote system 800 to enable such control and/or to enable purchasing and/or delivery of additional new cartridges 300 to replace near-depleted or totally depleted cartridges 300 of the cleaner dispensing system 1100. Some or all of the operations of the method shown in FIG. 5 may be implemented by the computing device 700, for example based on a processor 720 of the computing device 700 executing a program of instructions stored at a memory 730 of the computing device 700.

At S502, the computing device 700 may establish a network communication link 802 with a remote system 800 (e.g., a remote network service supported by one or more remote computing devices 810) via network communication interface 750, and the computing device 700 may receive and store (e.g., at memory 730) a database 732 of authentic cartridge identifier codes 774 that are each associated with one or more "authentic" cartridges 300 as described herein. In some example embodiments, one or more authentic cartridge identifier codes 774 that are stored in the database 732 may be associated with (e.g., may identify) only one single cartridge 300, such that different authentic cartridges 300 may include separate, respective cartridge indicators 370 that are configured to indicate separate, respective and different authentic cartridge identifier codes 774. In some example embodiments, one or more authentic cartridge identifier codes 774 that are stored in the database 732 may be associated with (e.g., may identify) multiple authentic cartridges 300, for example a particular batch of manufactured authentic cartridges 300, such that multiple authentic cartridges 300 may each include a cartridge indicator 370 that is configured to indicate the same authentic cartridge identifier code 774. Cartridges 300 that are associated with one or more authentic cartridge identifier codes 774 may be referred to herein as authentic cartridges, authenticated cartridges, or the like. In some example embodiments, operation S502 is omitted where the database 832 is maintained at the remote system 800 and where the computing device 700 transmits signals indicating detected particular cartridge identifier codes 374 to the remote system 800 to determine whether the detected particular cartridge identifier codes 374 match one or more authentic cartridge identifier codes 774 (e.g., at S510=NO and at least S522-S524 in FIGS. 5 and 9A).

At S504, the computing device 700 receives an indication that a new cartridge 300 is provided and/or is presently coupled the cleaner dispensing apparatus 200 that is communicatively coupled via network communication link 702 with the computing device 700 and/or that authentication of the new cartridge 300 is desired. Such a cleaner dispensing apparatus 200 may be a specific cleaner dispensing apparatus 200 that is associated with a user account 734 supported by the computing device 700 and/or a cleaner dispensing apparatus 200 that is presently communicatively coupled with the computing device 700 via a network communication link 702. The indication may be received at the computing device 700 based on user interaction with a graphical user interface displayed by an interface 760 of the computing device 700, for example based on user interaction with a graphical icon of a graphical user interface displayed by a touchscreen display interface 760 as described herein with regard to FIG. 10A to provide an indication to the computing device 700 that a new cartridge 300 is obtained. In some example embodiments, the indication may be received at S504 based on user interaction with a graphical icon of a graphical user interface displayed by a display interface 760 such as a touchscreen display interface 760 to generate a command to the computing device 700 to control (e.g., activate) one or more detection devices 770 to attempt detection of a particular cartridge identifier code 374 associated with a new cartridge 300 at S506. Such a received command may be considered to be a receipt of a user indication of a new cartridge at S504. In some example embodiments, the indicated at S504 may be received In some example embodiments, the indication at S504 may be received at the computing device 700 independently of any manual user interaction with the computing device 700. For example, in some example embodiments a new cartridge 300 may include a cartridge indicator 370 that includes a wireless communication transceiver (e.g., an ad hoc wireless network communication interface, an NFC communication interface, or the like) which may be configured to transmit a signal to be received by the computing device 700 (e.g., a network communication interface 750 and/or detection device 770 thereof) in response to the computing device 700 entering a certain threshold physical proximity to the cartridge 300 and/or to the cartridge indicator 370 thereof (e.g., 5 feet proximity with regard to an ad hoc wireless network communication link, 1 inch proximity with regard to an NFC interface, etc.). The computing device 700 may be configured to receive and process the received signal to determine that an indication of a new cartridge 300 is received at S504. In another example, referring to S403 of the method shown in FIG. 4, the indication at S504 may be received based on the computing device 700 receiving a coupling signal that is transmitted from a cleaner dispensing apparatus 200 via the network communication link 702, where the cleaner dispensing apparatus 200 causes the coupling signal to be transmitted to the computing device 700 in response to determining that a cartridge 300 is coupled (e.g., newly-coupled) to the cleaner dispensing apparatus 200 (e.g., S402=YES). The computing device 70 at S504 may respond to the coupling signal receipt by determining that a new cartridge 300 is coupled to the cleaner dispensing apparatus 200, where the cleaner dispensing apparatus 200 may be a specific cleaner dispensing apparatus 200 that is associated with a user account 734 supported by the computing device 700 and/or a cleaner dispensing apparatus 200 that is presently communicatively coupled with the computing device 700 via a network communication link 702.

At S506, the computing device 700 controls one or more detection devices 770 (e.g., a camera, an NFC transceiver, etc.) to obtain 790 cartridge information 372 associated with the new cartridge 300 from the cartridge indicator 370 of the new cartridge 300, based for example on communication between the cartridge indicator 370 and one or more detection devices 770 of the computing device 700, one or more detection devices 770 generating information regarding the cartridge 300 (e.g., generating an image, also referred to herein as image data), or the like.

For example, in some example embodiments the cartridge indicator 370 is configured to present (e.g., display) the cartridge information 372 as a visible pattern 392 (e.g., such that the visible pattern 392 represents the cartridge information 372) that is externally visible from an exterior of the cartridge 300, such as a pattern that is displayed on an outer surface 302S of the cartridge 300 (e.g., an alphanumeric code, a barcode, a QR code, or the like). One or more detection devices 770 of the computing device 700 may be a camera device (which may be any known type of camera device, such as any known digital camera configured to generate a digital signal representing an image (e.g., image 2058 shown in FIG. 10D) that is generated or captured by the camera device). The computing device 700 may at S506 be configured to control the camera device to generate an image of a field of view 780 of the camera device in which the visible pattern 392 representing the cartridge information 372 of the cartridge indicator 370 is located (e.g., image 2058 shown in FIG. 10D). The computing device 700 may process an image generated by the camera detection device 770 (e.g., image 2058 shown in FIG. 10D) to identify or recognize the presence of the visible pattern 392 within the image, and the computing device 700 may process the image to obtain the cartridge information 372, and/or the particular cartridge identifier code 374 indicated thereby, as indicated by the visible pattern 392 that is located in the image.

In another example, in some example embodiments the cartridge indicator 370 includes a near-field communication (NFC) device that is configured to generate an NFC signal in response to receiving an NFC field, such as a radio-frequency (RF) field, for example in response to the NFC device being within the generated NFC field. One or more detection devices 770 may be configured to generate such an NFC field (e.g., an RF antenna configured to generate an RF field) and one or more detection devices 770 may be configured to receive the NFC signal generated by the NFC device of the cartridge indicator 370 in response to such an NFC field (e.g., an NFC receiver, transceiver, etc.). Such detection device(s) 770 may include any known NFC communication device, transmitter, receiver, transceiver, or the like. The computing device 700 may at S506 control one or more detection devices 770 to generate, emit, and/or transmit an NFC field to cause an NFC device cartridge indicator 370 to responsively generate and/or transmit an NFC signal to be received by one or more detection devices 770 of the computing device. Receiving such an NFC signal may be considered to be obtaining cartridge information 372 from the cartridge indicator 370 at S506. The computing device 700 may be configured to process an NFC signal received at one or more detection devices 770 to obtain the cartridge information 372 at S506.

At S508, the computing device 700 processes the cartridge information 372 that is obtained at S506 to detect a particular cartridge identifier code 374 that is associated with the particular cartridge 300 (e.g., a particular cartridge identifier code 374 indicated by a visible pattern 392 such as a barcode or QR code that is present in an image (e.g., image 2058 shown in FIG. 10D) of the outer surface 302S of the cartridge 300, a code indicated by a signal such as an NFC signal received at the computing device 700 from the cartridge indicator 370 of the cartridge 300, etc.). In some example embodiments, each particular cartridge identifier code 374 that may be associated with any cartridge 300 may have particular characteristics that enable the code to be identified as a particular cartridge identifier code 374. For example, where each particular cartridge identifier code 374 is an alphanumeric code that is identified by a signal (e.g., NFC signal), pattern (e.g., QR code), or the like that is provided by the cartridge indicator 370, each alphanumeric code for each cartridge identifier code may have a particular character length (e.g., 16 characters) and may include particular (or, alternatively, predetermined) first character, final character, any combination thereof, or the like. For example, each particular cartridge identifier code 374 may be a 16-character code where the first, second fifteenth, and sixteenth characters are all a same character such as "W" and the remaining characters are variable and potentially different between different cartridge identifier codes 374 (e.g., "WW123456789ABCWW"), where the character length and particular characters of the first, second, fifteenth, and sixteenth characters enables the particular cartridge identifier code 374 identified via processing the cartridge information 372 to be identified (e.g., "detected") at S508 as a particular cartridge identifier code 374 that is associated with at least one particular cartridge 300.

In an example, where the cartridge indicator 370 includes a visible pattern 392 that is externally visible on an outer surface 302S of the cartridge 300, and the computing device 700 includes a detection device 770 that further includes a camera device, it will be understood that the computing device 700 may be configured to, at S506 and S508, obtain the cartridge information 372 from the cartridge indicator 370 based on controlling the camera device to generate an image (e.g., image 2058 shown in FIG. 10C) of the visible pattern 392 and detect the particular cartridge identifier code 374 based on processing the image of the visible pattern 392.

In another example, where the cartridge indicator 370 includes a near-field communication (NFC) device that is configured to transmit an NFC signal that indicates the particular cartridge identifier code 374 in response to an NFC field, and where the computing device 700 includes one or more detection devices that collectively comprise one or more NFC communication interfaces that are collectively configured to generate the NFC field to receive the NFC signal transmitted by the NFC device in response to the NFC field, the computing device 700 may be configured to, at S506 and S508, obtain 790 the cartridge information 372 from the cartridge indicator 370 based on causing the one or more NFC communication interfaces of the computing device 700 to collectively generate the NFC field and to receive the NFC signal transmitted by the NFC device in response to the NFC field, and detect the particular cartridge identifier code 374 based on processing the NFC signal.

At S540, in response to detecting a particular cartridge identifier code 374, the computing device 700 determines whether the detected particular cartridge identifier code 374 is an authenticated cartridge identifier code based on a determination of whether the detected particular cartridge identifier code 374 matches one or more authentic cartridge identifier codes 774 (e.g., at a local database 732 and/or at a remote database 832 as described herein).

In some example embodiments, one or more of operations S502-S508, S540, S516, S526, etc. includes selecting a particular user account 734 supported by the computing device 700 (which may be by default a particular or sole user account 734 supported by the computing device 700) and/or a presently-linked cleaner dispensing apparatus 200 (via a present network communication link 702) to associate with the authentication determination at S540, so that the apparatus enable command signal is transmitted at S518 and/or S528 to a cleaner dispensing apparatus 200 that is associated with the selected user account 734 and/or is the selected presently-linked cleaner dispensing apparatus 200.

At S510 and S540, if the computing device 700 stores a local database 732 of authentic cartridge identifier codes 774 (S510=YES), the computing device 700 determines whether the particular cartridge identifier code 374 that is detected at S508 is (e.g., matches) an authentic cartridge identifier code 774 stored in the local database 732, matches one or more known authentic cartridge identifier codes 774 stored in the local database 732, or the like, such that the computing device 700 determines whether the detected particular cartridge identifier code 374 is authentic at S540. As shown, the authentication determination at S540 may include, at S512, comparing the detected particular cartridge identifier code 374 with the authentic cartridge identifier code(s) 774 stored in the database 732 to determine, at S514, whether the detected particular cartridge identifier code 374 matches (e.g., is identical to) any authentic cartridge identifier codes 774 stored at the local database 732. If no match is found (S514=NO), the computing device 700 may determine that the authentication attempt fails and may, at S534, generate a notification, which may include a graphical and/or audio indication provided to a user via one or more interfaces 760 of the computing device 700, that indicates that the authentication attempt fails, for example due to the detected particular cartridge identifier code 374 being determined to be associated with a non-authenticated or de-authenticated cartridge identifier code. A determination that the detected particular cartridge identifier code 374 is determined to match at least one authentic cartridge identifier code 774 at S514 (S514=YES) may be referred to as a determination that the particular cartridge identifier code 374 is (e.g., matches) an authentic cartridge identifier code 774 and therefore is "authenticated."

If the detected particular cartridge identifier code 374 is determined to match at least one authentic cartridge identifier code 774 at S514 (S514=YES), at S516 the computing device 700 determines that the particular cartridge 300 that is associated with particular cartridge identifier code 374 is an authentic cartridge 300 that is associated with an authentic cartridge identifier code 774. Such a determination may be referred to as "authenticating" the cartridge 300 that is associated with the detected particular cartridge identifier code 374. Such a determination may include determining that the detected particular cartridge identifier code 374 is associated with (e.g., identifies) an authentic cartridge 300 based on the particular cartridge identifier code 374 being authenticated. Such a determination may include associating the authenticated cartridge identifier code 374 with a user account 734 that is further associated with a particular cleaner dispensing apparatus 200. Such a particular cleaner dispensing apparatus 200 may be a specific cleaner dispensing apparatus 200 associated with a user account 734 supported by the computing device 700 and in association with the authentication at S540 is performed, a specific cleaner dispensing apparatus 200 from which a coupling signal is received at S504, a specific cleaner dispensing apparatus 200.

At S518, the computing device 700, in response to authenticating a cartridge 300 associated with the detected (and authenticated) particular cartridge identifier code 374, based on determining that the particular cartridge identifier code 374 is authenticated at S540 (e.g., S514=YES), generates and/or transmits an apparatus enable command signal to a cleaner dispensing apparatus 200 to command the cleaner dispensing apparatus 200 (e.g., the controller 210 thereof) to selectively enable (e.g., unlock) operation of at least the dispenser device 208 thereof. Accordingly, the computing device 700 at S518 may transmit an apparatus enable command signal to the cleaner dispensing apparatus 200 to cause the cleaner dispensing apparatus to selectively enable operation of at least the dispenser device 208 thereof, in response to a determination (e.g., at S540 via S514=YES) that the detected particular cartridge identifier code 374 matches an authentic cartridge identifier code 774.

The computing device 700 may specifically transmit the apparatus enable command signal to a particular cleaner dispensing apparatus 200 associated with apparatus identity information 280 of a particular user account 734 supported by the computing device 700 and thus associated with the particular user account 734. The computing device 700 may specifically transmit the apparatus enable command signal to a particular cleaner dispensing apparatus 200 from which a coupling signal is received at S504, or the like.

As described herein with regard to FIG. 4, the cleaner dispensing apparatus 200 (e.g., controller 210) may be configured to selectively enable at least the dispenser device 208 thereof (e.g., at S408) in response to receiving the apparatus enable command signal that is transmitted by the computing device 700 at S518. The apparatus enable command signal may include information identifying the particular cartridge 300 that is authenticated at S516 (e.g., information indicating the particular cartridge identifier code 374 that is authenticated at S514=YES), which may be stored at the cleaner dispensing apparatus 200, used to transmit an enable confirmation signal (e.g., at S410) indicating that the cleaner dispensing apparatus 200 is being enabled or "unlocked" in association with a particular cartridge 300 associated with the authenticated particular cartridge identifier code 374, and/or which may be transmitted by the cleaner dispensing apparatus 200 to a separate device via a remote network communication.

As a result, at S519, the computing device 700 may receive an enable confirmation signal from the cleaner dispensing apparatus 200 to which the apparatus enable command signal was transmitted at S518. The enable confirmation signal may include information indicating that the enable confirmation signal is being transmitted based on selective enabling of at least a dispenser device of the cleaner dispensing apparatus 200 in response to the apparatus enable command signal that was transmitted to the cleaner dispensing apparatus 200 at S518. For example, the enable confirmation signal may include information identifying the particular detected cartridge identifier code 374 that was authenticated at S540 and which caused the apparatus enable command signal to be transmitted at S518.

At S520, in response to transmitting the apparatus enable command signal to the cleaner dispensing apparatus 200 at S518 and/or in response to receiving an enable confirmation signal at S519 based on the detected particular cartridge identifier code 374 being authenticated at S540, the computing device 700 may "de-authenticate" the one or more authentic cartridge identifier codes 774 with which the detected particular cartridge identifier code 374 is determined to match at S514. Such de-authentication may include deleting the authenticated cartridge identifier code 774 from database 732, marking a de-authentication field of the database 732 entry for the authentic cartridge identifier code 774 as "used," "de-authenticated," or the like, altering the authenticated cartridge identifier code 774 in database 732 as being "used" or "de-authenticated." (e.g., when the cartridge identifier codes are 16-character codes with first, second, fifteenth, and sixteenth characters being "W", changing the sixteenth character to a different character such as "C"), or the like. Such de-authentication at S520 may prevent or reduce the likelihood of unauthorized re-use of the particular (authenticated) cartridge identifier code 374 in the future to unlock at least the dispenser device 208 of one or more cleaner dispensing apparatuses 200 (e.g., to unlock a cleaner dispensing apparatus 200 based on a partially or completely depleted cartridge 300) and thereby to reduce or prevent the likelihood of the cleaner dispensing apparatus 200 being caused to dispense an unauthorized composition.

At S510 and S540, if the computing device 700 does not store a local database 732 of authentic cartridge identifier codes 774 (S510=NO), then at S522 the computing device 700 may transmit an authentication request signal which includes information indicating the detected particular cartridge identifier code 374 (including for example a signal that includes the particular cartridge identifier code 374) to a remote system 800 (e.g., to a remote computing device 810 which at least partially supports the remote system 800) via a network communication link 802. Such an authentication request signal may include information identifying the cartridge identifier code 374, a request to determine whether the cartridge identifier code 374 is authenticated (e.g., matches one or more authentic cartridge identifier codes 774), information identifying a cleaner dispensing apparatus 200 and/or a user account 734 associated with the computing device 700 and/or with the authentication request signal, or the like.

As described herein with respect to FIGS. 9A and 9B, the remote system 800 may determine whether the particular cartridge identifier code 374 that is identified in the authentication request signal transmitted at S522 is authentic based on determining whether the particular cartridge identifier code 374 is an authentic cartridge identifier code stored in the remote database 832, matches one or more known authentic cartridge identifier codes 774 stored in the remote database 832, or the like.

Similarly to the determination at S512 and S514 as described herein, the determination made at the remote system 800 in response to the authentication request signal transmitted at S522 may include 1) comparing the detected particular cartridge identifier code 374 indicated by the authentication request signal with the authentic cartridge identifier codes 774 stored in the database 832 to determine 2) whether the detected particular cartridge identifier code 374 matches (e.g., is identical to) any of the authentic cartridge identifier codes 774 stored at the remote database 832.

If no match is found and/or if the remote system 800 does not transmit an authentication confirmation signal to the computing device 700 within a particular time window (e.g., a time window of 30 seconds, 1 minute, 10 minutes, etc.) after the authentication request signal is transmitted at S522, the computing device 700 may determine at S524 that an authentication confirmation signal is not received from the remote system 800 in response to the authentication request signal (S524=NO), and the computing device 700 may in response determine that the authentication attempt fails and may, at S534, generate a notification, which may include a graphical and/or audio indication provided to a user via one or more interfaces 760 of the computing device 700, that indicates that the authentication attempt fails, for example due to the detected particular cartridge identifier code 374 being determined to be associated with a non-authenticated or de-authenticated cartridge identifier code.

If the detected particular cartridge identifier code 374 is determined by the remote system 800 to match at least one authentic cartridge identifier code 774, the remote system 800 may in response transmit an authentication confirmation signal to the computing device 700, where the authentication confirmation signal may identify the detected particular cartridge identifier code 374 and/or an indicator of the authentication request signal transmitted at S522 and may further include information confirming that the detected particular cartridge identifier code 374 is an authenticated cartridge identifier code (e.g., matches at least one authentic cartridge identifier code 774).

In response to receiving and processing the authentication confirmation signal to determine that the authentication confirmation signal is associated with the detected particular cartridge identifier code 374 and is received, for example received within a particular time window (e.g., 2 minutes) elapsed since the transmission of the authentication request signal at S522 (S524=YES), at S526 the computing device 700 determines that the detected particular cartridge identifier code 374 is an authenticated cartridge indicator code and thus determines that the particular cartridge 300 that is associated with the detected particular cartridge identifier code 374 is an authentic cartridge 300 that is associated with an authentic cartridge identifier code 774. Such a determination may include associating the authenticated cartridge identifier code 374 with a user account 734 that is further associated with a particular cleaner dispensing apparatus 200.

At S528, the computing device 700, in response to authenticating a cartridge 300 associated with the detected (and authenticated) particular cartridge identifier code 374, based on determining that the particular cartridge identifier code 374 is authenticated at S540 (e.g., S524=YES), generates and/or transmits an apparatus enable command signal to a cleaner dispensing apparatus 200 to command the cleaner dispensing apparatus 200 (e.g., the controller 210 thereof) to selectively enable (e.g., unlock) operation of at least the dispenser device 208 thereof. Accordingly, the computing device 700 at S528 may transmit an apparatus enable command signal to the cleaner dispensing apparatus 200 to cause the cleaner dispensing apparatus to selectively enable operation of at least the dispenser device 208 thereof, in response to a determination (e.g., at S540 via S524=YES) that the detected particular cartridge identifier code 374 matches an authentic cartridge identifier code 774.

The computing device 700 may specifically transmit the apparatus enable command signal to a particular cleaner dispensing apparatus 200 associated with apparatus identity information 280 of a particular user account 734 supported by the computing device 700 and thus associated with the particular user account 734. The computing device 700 may specifically transmit the apparatus enable command signal to a particular cleaner dispensing apparatus 200 from which a coupling signal is received at S504, or the like.

As described herein with regard to FIG. 4, the cleaner dispensing apparatus 200 (e.g., controller 210) may be configured to selectively enable at least the dispenser device 208 thereof (e.g., at S408) in response to receiving the apparatus enable command signal that is transmitted by the computing device 700 at S528. The apparatus enable command signal may include information identifying the particular cartridge 300 that is authenticated at S526 (e.g., information indicating the particular cartridge identifier code 374 that is authenticated at S524=YES), which may be stored at the cleaner dispensing apparatus 200, used to transmit an enable confirmation signal (e.g., at S410) indicating that the cleaner dispensing apparatus 200 is being enabled or "unlocked" in association with a particular cartridge 300 associated with the authenticated particular cartridge identifier code 374, and/or which may be transmitted by the cleaner dispensing apparatus 200 to a separate device via a remote network communication.

As a result, at S529, the computing device 700 may receive an enable confirmation signal from the cleaner dispensing apparatus 200 to which the apparatus enable command signal was transmitted at S528. The enable confirmation signal may include information indicating that the enable confirmation signal is being transmitted based on selective enabling of at least a dispenser device of the cleaner dispensing apparatus 200 in response to the apparatus enable command signal that was transmitted to the cleaner dispensing apparatus 200 at S528. For example, the enable confirmation signal may include information identifying the particular detected cartridge identifier code 374 that was authenticated at S524=YES and which caused the apparatus enable command signal to be transmitted at S528.

At S530, in response to transmitting the apparatus enable command signal to the cleaner dispensing apparatus 200 at S518 or S528 and/or in response to the enable confirmation signal received from the cleaner dispensing apparatus 200 at S519 or S529, the computing device 700 may transmit an enable indication signal to the remote system 800 to cause the remote system 800 to "de-authenticate" the one or more authentic cartridge identifier codes 774 with which the detected particular cartridge identifier code 374 is determined to match as determined at S536 (S524=YES). Such de-authentication may include deleting the authenticated cartridge identifier code 774 from database 832, marking a de-authentication field of the database 732 entry for the authentic cartridge identifier code 774 as "used," "de-authenticated," or the like, altering the authenticated cartridge identifier code 774 in database 832 as being "used" or "de-authenticated." (e.g., when the cartridge identifier codes are 16-character codes with first, second, fifteenth, and sixteenth characters being "W", changing the sixteenth character to a different character such as "C"), or the like. Such de-authentication may prevent or reduce the likelihood of unauthorized re-use of the particular (authenticated) cartridge identifier code 374 in the future to unlock at least the dispenser device 208 of one or more cleaner dispensing apparatuses 200 (e.g., to unlock a cleaner dispensing apparatus 200 based on a partially or completely depleted cartridge 300) and thereby to reduce or prevent the likelihood of the cleaner dispensing apparatus 200 being caused to dispense an unauthorized composition.

At S532, the computing device 700 may receive one or more update signals from the cleaner dispensing apparatus 200 in response to the cleaner dispensing apparatus 200 performing one or more incrementings of a counter value as part of one or more interactive operations S440, thereby indicating repeated incrementing of the counter value of the cleaner dispensing apparatus 200 from an initial counter value. The computing device 700 may determine a number (quantity) of remaining dispensing operations remaining until the cleaner dispensing apparatus 200 is inhibited due to depletion of the presently-coupled cartridge 300 that is presently coupled to the cleaner dispensing apparatus 200 and upon which the authentication at S540 is performed. The computing device 700 associate the number of remaining dispensings with the cleaner dispensing apparatus 200 presently linked to the computing device 700 and/or to a user account 734 presently associated with the cleaner dispensing apparatus 200 from which the update signals are received. The computing device 700 may perform various operations in response to determining the number of remaining dispensings associated with the cleaner dispensing apparatus 200, including presenting an indication (e.g., graphical indication via a touchscreen display interface 760, such as fields 2014, 2062, 2074, 2084 in the interfaces 2000*a*, 2000*d*-2000*f* shown in FIGS. 10A and 10D-10F) of the remaining dispensings to a supported user, transmit an order command signal to a remote system 800 via a network communication link 802, or the like.

Referring to FIG. 6, the method shown in FIG. 6 includes a method for operating a computing device 700 of control system 3000 according to any of the example embodiments. Some or all of the operations of the method shown in FIG. 6 may be implemented by the computing device 700, for example based on a processor 720 of the computing device 700 executing a program of instructions stored at a memory 730 of the computing device 700.

At S602, the computing device 700 receives a warning signal (also referred to as a warning/purchase signal, purchase command signal, or the like) from a cleaner dispensing apparatus 200 via a network communication link 702, where the cleaner dispensing apparatus 200 may be presently associated with a user account 734 supported by the computing device 700. The warning signal may include information indicating that a counter value of a counter implemented by the cleaner dispensing apparatus 200 has reached a particular threshold counter value (e.g., a second threshold counter value as described herein) and thus may indicate that a cartridge 300 that is presently coupled to the cleaner dispensing apparatus 200 is nearly depleted (e.g., depleted below at least a certain threshold) of cleaning composition 230 within a cartridge reservoir 304 of the cartridge 300. As described with reference to FIG. 4, such a warning signal may be transmitted by the cleaner dispensing apparatus 200 (e.g., by controller 210 thereof) at S422 in response to determining that a threshold counter value that does not meet a final depletion threshold counter value, for example a second threshold counter value that is between the initial counter value and a first threshold counter value that indicates full depletion of the cartridge 300, is reached (e.g., S428=YES and S430=NO). The warning signal may include information identifying the particular cleaner dispensing apparatus 200 transmitting the warning signal (e.g., apparatus identity information 280), information identifying the cartridge 300 presently coupled to the cleaner dispensing apparatus 200 (e.g., a particular cartridge identifier code 374 associated with the cartridge), or the like. The warning signal may indicate a present, incremented counter value of the counter implemented by the cleaner dispensing apparatus 200.

At S620, the computing device 700 processes the warning signal to determine that a cartridge 300 coupled to a particular cleaner dispensing apparatus 200 that is associated with a user account 734 is nearly depleted (e.g., partially depleted to a threshold amount that is between a final depletion threshold and a near-depletion threshold), such that the computing device 700 determines, based on receiving and processing the warning signal, that the cartridge reservoir 304 of the cartridge 300 that is presently coupled to the cleaner dispensing apparatus 200 from which the warning signal is received contains an amount of cleaning composition 230 that is equal to or less than a threshold amount. The computing device 700 may process the received warning signal to identify apparatus identity information 280 included in the warning signal and compare such apparatus identity information 280 to apparatus identity information 280 included in one or more user accounts 734 stored locally at the computing device 700 to determine a particular user account 734 associated with the cleaner dispensing apparatus 200 from which the warning signal is received. In some example embodiments, the computing device 700 may determine that the warning signal is received via a particular known network communication link 702 with a cleaner dispensing apparatus 200 that is already associated with at least one user account 734.

As shown in FIG. 6, the processing at S620 may include, at S604, accessing the user account information 738 (e.g., user information 736) of the user account 734 with which the cleaner dispensing apparatus 200 from which the warning signal is received is associated (via apparatus identity information 280 included in the user account 734 and matching apparatus identity information included with the warning signal transmitted by the cleaner dispensing apparatus 200 at S432 in FIG. 4). As described herein, such user account information 738 may include user information 736 indicating whether automatic (e.g., without manual user intervention) ordering and/or purchasing (herein collectively referred to as "ordering") of additional cartridges to be delivered to a physical mailing address associated with the user account 734 (and thus associated with the cleaner dispensing apparatus 200 from which the warning signal is received) is authorized in response to receiving a warning signal from a cleaner dispensing apparatus 200 with which the computing device 700 is linked via a network communication link 702 and/or a cleaner dispensing apparatus 200 which is associated with the user account 734 as indicated by apparatus identity information 280 included in the user account 734.

Accordingly, at S606, the computing device 700 determines whether the user account information 738 of the user account 734 associated with the cleaner dispensing apparatus 200 authorizes ordering of one or more new (e.g., additional) cartridges to be delivered to a physical mailing address associated with the user account 734 (and thus associated with the cleaner dispensing apparatus 200 from which the warning signal is received) in response to a warning signal from the cleaner dispensing apparatus 200. Such a determination at S606 may include determining whether the user account 734 includes address information identifying a particular physical mailing address to which ordered cartridge(s) are to be delivered, purchase information including information that may be used to implement a purchase transaction, order transaction, delivery transaction, or the like with a purchasing service (e.g., bank account information, credit card information, etc.), or the like. The presence or absence of such information in the account information may prompt a YES or NO determination at S606.

At S608, in response to determination at S606 that automatic ordering of new cartridges to be delivered to a physical mailing address associated with the user account 734 (and thus associated with the cleaner dispensing apparatus 200 from which the warning signal is received) is authorized, at S608 the computing device 700 transmits an order command signal to a remote system 800 (e.g., a remote computing device 810 at least partially supporting the remote system 800) via network communication link 802. The order command signal may include a command to the remote system 800 to cause one or more cartridges to be ordered to be delivered to a physical mailing address associated with the user account 734 (and thus associated with the cleaner dispensing apparatus 200 from which the warning signal is received), to enable replacement of the near-depleted cartridge 300 which triggered the warning signal receipt.

Such an order command signal may include information, obtained from the user information 736 accessed at S604, including physical mailing address information indicating a delivery address to which to deliver the one or more new ordered cartridges, purchase information which may be utilized to execute the financial transaction to facilitate ordering and/or delivering of the one or more new cartridges, information specifying a particular quantity of cartridges to order, or the like. As described herein with regard to at least FIGS. 8A, 8B, 9A, and 9B, the remote system 800 may, in response to receiving the order command signal transmitted at S608, cause one or more cartridges (e.g., the quantity of cartridges specified in the order command signal) to be purchased, ordered, and/or caused to be delivered to a physical mailing address associated with the user account 734 (and thus associated with the cleaner dispensing apparatus 200 from which the warning signal is received), where the physical mailing address may be specified in the order command signal. The remote system 800 may further cause a user account 734 to be charged for the purchase of the one or more new cartridges in response to receiving the order command signal.

In some example embodiments, the remote system 800 may store a copy of the user account information 738 of the user account 734, including user information 736, and the order command signal may simply identify a particular user account 734 and command an order of one or more cartridges to be delivered to a physical mailing address associated with the user account 734 (and thus associated with the cleaner dispensing apparatus 200 from which the warning signal is received) as specified by the user information 736 of the user account 734. In response, the remote system 800 may access the user information 736 of the user account 734 stored at remote computing device 810 to determine the specific quantity of cartridges to be purchased or ordered, the physical mailing address to which to ship ("deliver") the purchased/ordered cartridges, and purchase information that the remote system 800 utilizes to execute the financial transaction to order and/or deliver the one or more new cartridges. The remote system 800 may then implement the purchase and/or order of the quantity of cartridges specified by the user account information 738 of the user account 734, using the purchase information specified by the user account information 738, to be delivered to the physical mailing address specified by the user account 734 information.

At S610, the remote system 800 may transmit, to the computing device 700, an order confirmation signal in response to receiving the order command signal that was transmitted to the remote system 800 by the computing device 700 at S608 and implementing the order (e.g., purchase and/or order) of one or more cartridges to be delivered to a physical mailing address associated with the user account 734 (and thus associated with the cleaner dispensing apparatus 200 from which the warning signal is received at S602). The remote system 800 may transmit the order confirmation signal in response to processing the order command signal and causing the purchase, order, and/or delivery of one or more new cartridges to be implemented. The order confirmation signal may include information indicating the quantity of cartridges purchased/ordered/commanded to be delivered, a physical mailing address to which the cartridges are to be delivered, an estimated delivery date for the delivery of the cartridges, a financial amount charged to a user account 734 and/or associated financial account (e.g., bank account, credit card account, etc.), or the like.

Figure 10A:
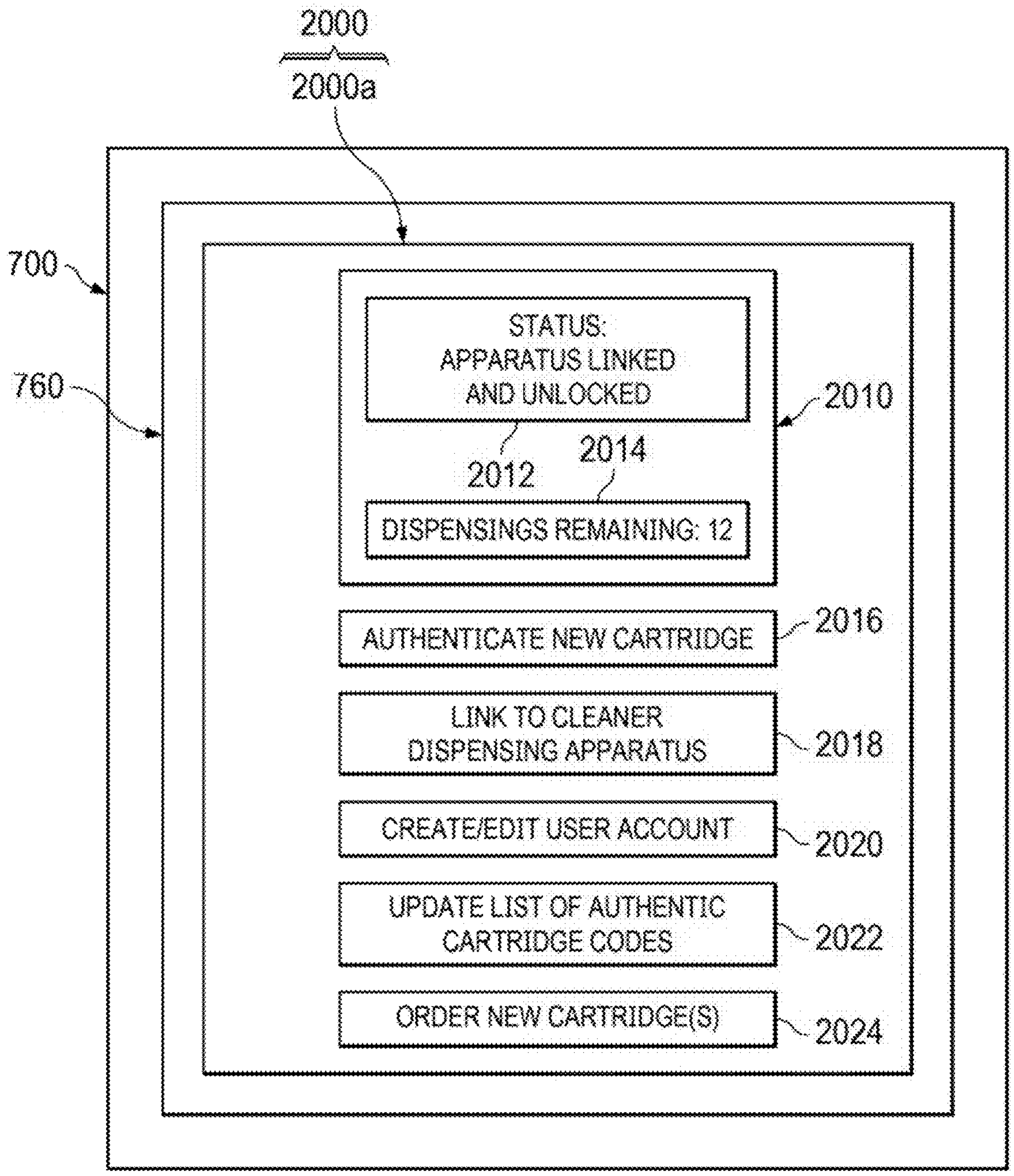
FIGS. 10A, 10B, 10C, 10D, 10E, and 10F are views of graphical user interfaces displayed by the remote computing device according to some example embodiments.
Figure 10B:
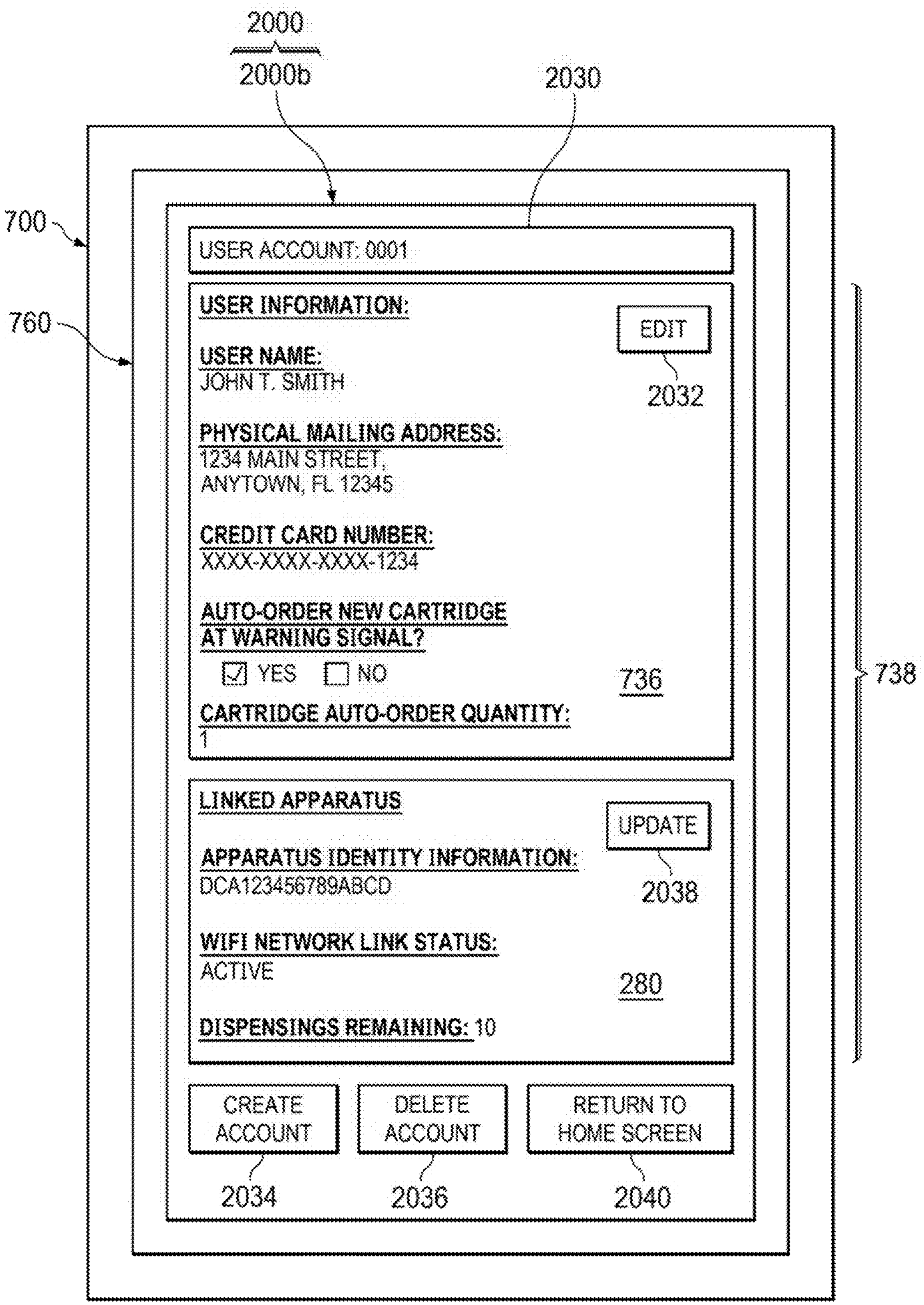
Figure 10C:
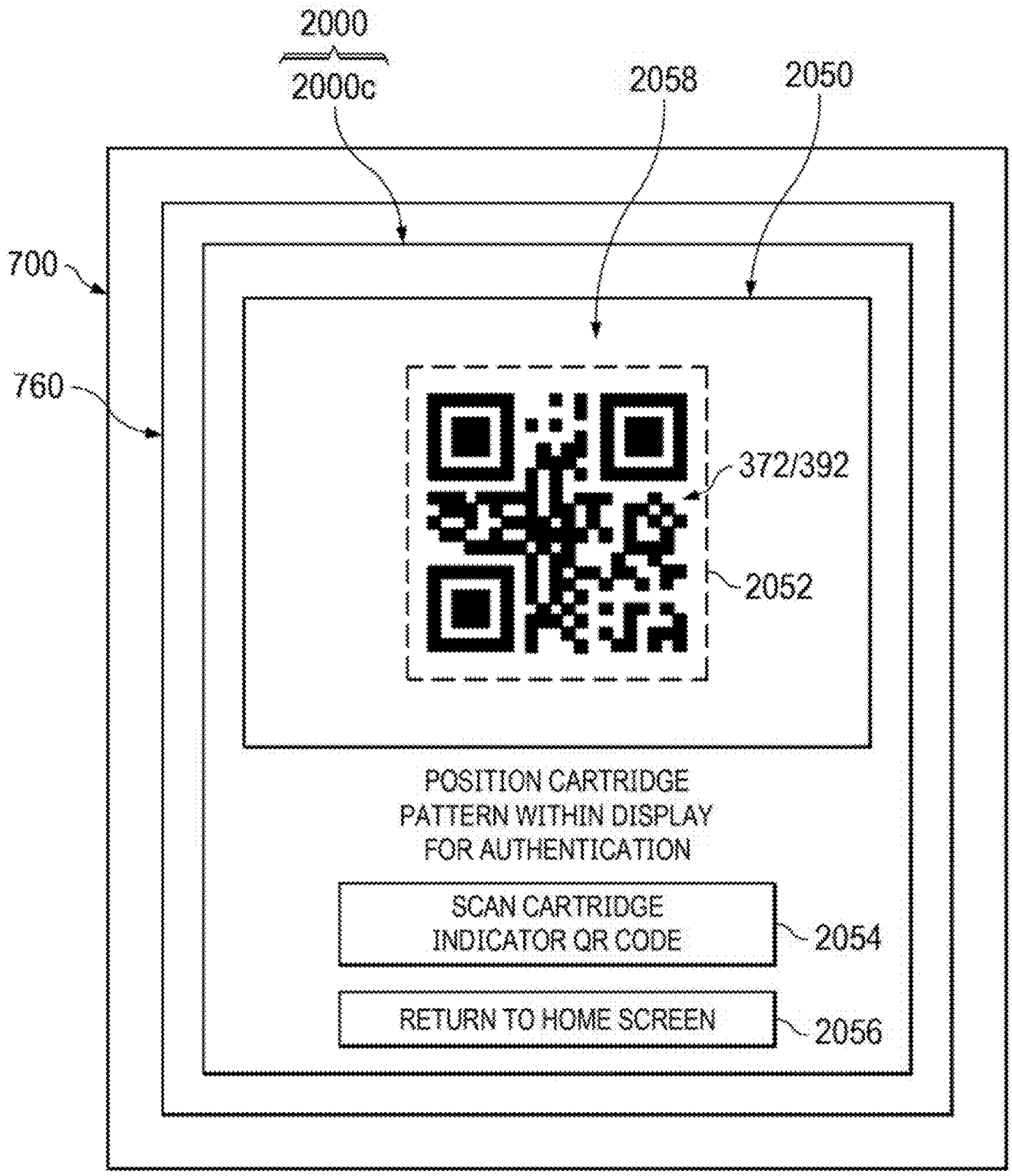
Figure 10D:
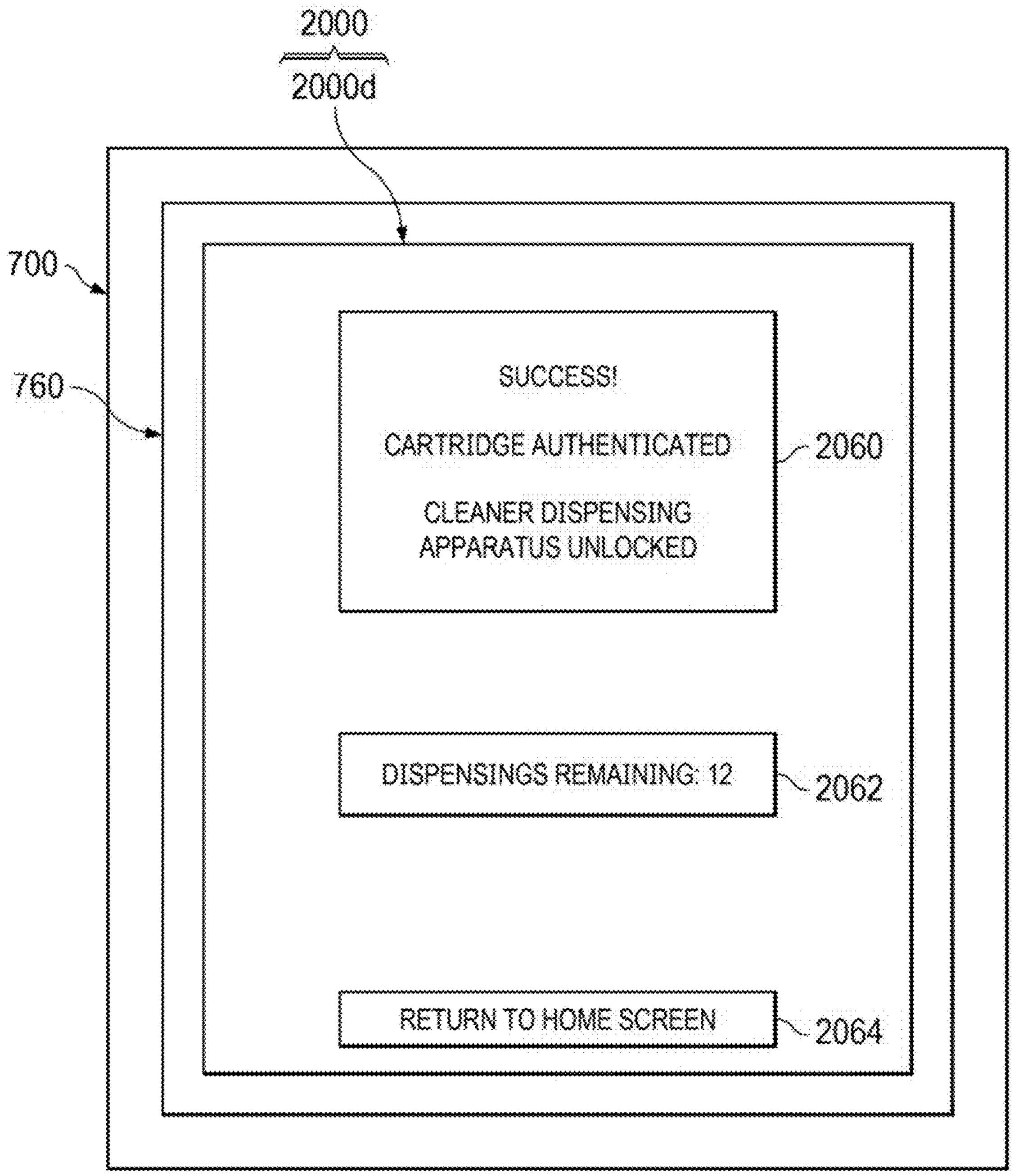
Figure 10E:
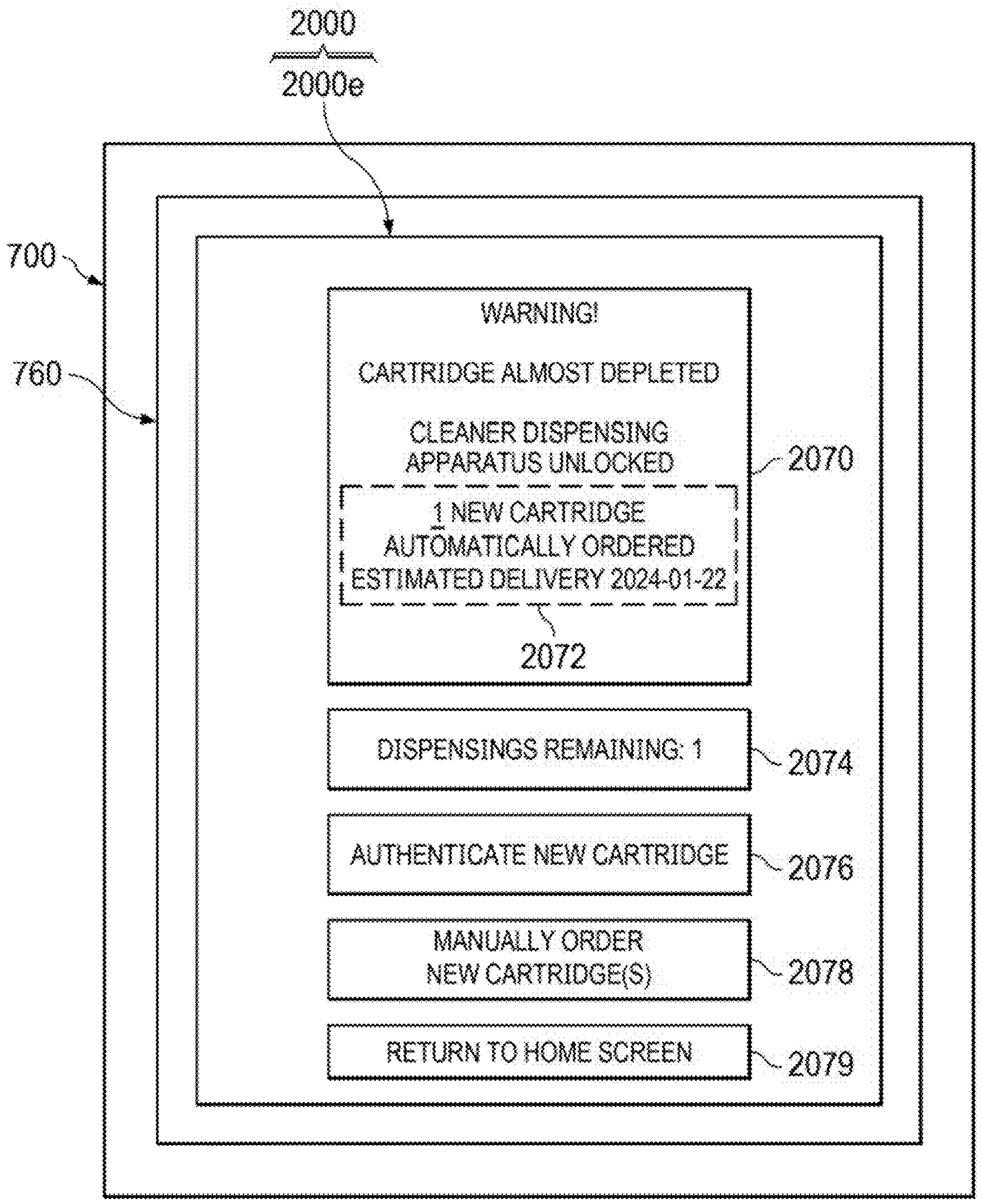

At S612, the computing device 700 generates a warning indication that is provided to a user supported by the computing device 700 via an interface 760 of the computing device 700, such as a graphical indication provided via a graphical user interface displayed on a touchscreen display interface 760 as shown for example in FIG. 10E. Such a warning indication may indicate that a cartridge 300 presently coupled to a cleaner dispensing apparatus 200 with which the computing device 700 is communicatively linked via the network communication link 702 and/or an apparatus associated with a particular user account 734 that is supported by the computing device 700 is nearly depleted and/or depleted below a threshold (e.g., a threshold number of remaining dispensings by the cleaner dispensing apparatus 200 before selective inhibition of at least the dispenser device 208 thereof). Where a purchase of new cartridges is authorized at S606, such that operations S608 and S610 are performed, the warning indication S622 may include information (e.g., a graphical icon, as shown for example in FIG. 10E) indicating that one or more new cartridges are purchased, ordered, and/or commanded to be delivered to a particular mailing address associated with the computing device 700, with the cleaner dispensing apparatus 200, and/or with a user account 734 for which information is stored at the computing device 700. Where a purchase and/or order of new cartridges is not authorized at S606, the warning indication may include an invitation (e.g., an icon presented in a display interface 760 as shown in FIG. 10E) which a supported user may interact to manually command a purchase, ordering, and/or delivery of one or more new cartridges 300 to cause operation S608 to be performed in response.

At S614, the computing device 700 determines whether an indication is received that a new cartridge 300 is obtained by a supported user and is ready to be coupled to the cleaner dispensing apparatus 200 linked to the computing device 700 and/or the user account 734 supported by the computing device 700 (or is already coupled to such apparatus), such that the user requests authentication of the obtained new cartridge 300 and responsive unlocking of the associated cleaner dispensing apparatus 200. Such a determination may be the same a determination that an indication of a new cartridge is received as described herein with regard to S504 as shown in FIG. 5. If so (S614=YES), the process proceeds to operation "A" to proceed to operation S506 of the method shown in FIG. 5.

Figure 10F:
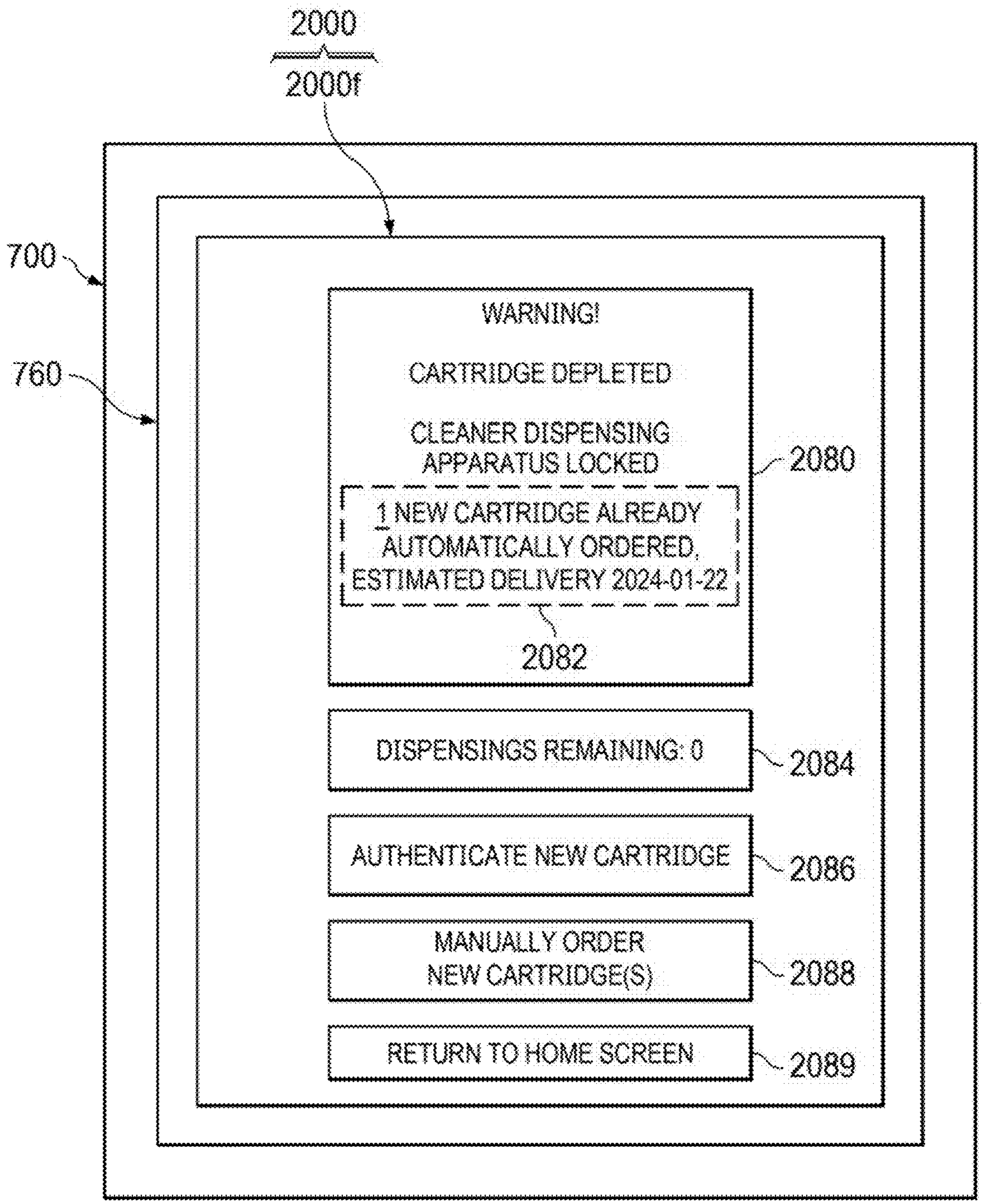

If not (S614=NO), the computing device 700 determines at S616 whether an inhibit signal is received from the cleaner dispensing apparatus 200 (e.g., the inhibit signal described at S436 in the method of FIG. 4), where the inhibit signal indicates that at least the dispenser device 208 of the cleaner dispensing apparatus 200 is selectively inhibited. If not (S616=NO), the method returns to S614 to await a new cartridge indication or an inhibit signal. If so (S616=YES), at S618 the computing device 700 generates an inhibit indication that is provided to a user supported by the computing device 700 via an interface 760 of the computing device 700, such as a graphical indication provided via a graphical user interface displayed by a touchscreen display interface 760 (e.g., as shown in FIG. 10F). Such an inhibit indication may indicate that a cartridge 300 presently coupled to a cleaner dispensing apparatus 200 with which the computing device 700 is communicatively linked via the network communication link 702 and/or a cleaner dispensing apparatus 200 associated with a particular user account 734 that is supported by the computing device 700 is totally depleted and/or depleted below a final depletion threshold, and that the associated cleaner dispensing apparatus 200 is inhibited (e.g., locked) as a result such that at least the dispenser device 208 thereof is inhibited from further dispensing operation. As shown in FIG. 10F, such an inhibit indication may include an invitation to the supported user to obtain a new cartridge 300 to replace the depleted cartridge 300 that is coupled to the cleaner dispensing apparatus 200 and to indicate that the new cartridge 300 is obtained and ready to be authenticated as described with regard to the method of FIG. 5.

Referring to FIG. 7, the method shown in FIG. 7 includes a method for operating a computing device 700 of control system 3000 according to any of the example embodiments. Some or all of the operations of the method shown in FIG. 7 may be implemented by the computing device 700, for example based on a processor 720 of the computing device 700 executing a program of instructions stored at a memory 730 of the computing device 700.

At S702, in response to user interaction with at least one interface 760 of the computing device 700 (e.g., the user providing information to the computing device 700 via a graphical user interface displayed by a touchscreen display interface 760 such as shown in FIG. 10A and/or FIG. 10B), the computing device 700 may create a user account 734 entry (also referred to herein as a user account 734) that is stored locally at the computing device 700 and/or remotely at remote system 800. The computing device 700 may create the user account 734 entry and populate the user account 734 entry with user account information provided by the user (e.g., user information 736) based on user interaction with one or more interfaces 760. In some example embodiments, the computing device 700 may communicate with a remote system 800 via network communication link 802 to obtain user account information 738 associated with a pre-existing user account 734 to populate the user information 736 of the user account 734 entry. In some example embodiments, the computing device 700 may communicate with the remote system 800 via network communication link 802 to communicate the user account 734 entry as a new user account 734. The computing device may at S702, associate the computing device 700 with the user account 734, such that the user account information included in the user account 734 entry may include user information 736 identifying the computing device 700 as a device supporting and/or associated with the user account 734.

At S704, a determination is made regarding whether to attempt to establish a network communication link 702 with a cleaner dispensing apparatus 200 (alone or in addition to associating the cleaner dispensing apparatus 200 with the user account 734). Such a determination may be based on whether a signal is received from a network communication interface 224 of a cleaner dispensing apparatus 200, based on whether the, based on whether a user command to attempt to establish a network communication link 702 is received via interface 760, or the like. Such a determination may be based on a determination of whether a user command to attempt to discover and establish a network communication link 702 with a cleaner dispensing apparatus 200 via any known network communication link discovery, handshake, and/or link establishment methods is received at the computing device 700 (e.g., the user command may be entered via user interaction with interface 760 of the computing device 700). Such a determination may be based on a determination of whether the cleaner dispensing apparatus 200 is detected at at least the network communication interface 750 of the computing device 700. Such a determination may be based on a determination of whether a network communication link request (e.g., handshake) signal is received at the computing device 700 from the cleaner dispensing apparatus 200 via network communication interface 750. Such a determination may be based on a determination of whether user approval is received at the computing device 700 (e.g., via interaction a graphical icon of a graphical user interface displayed by interface 760 as shown in FIG. 10A) to approve establishing a network communication link 702 with a detected cleaner dispensing apparatus 200.

If not (S704=NO), the method returns to S704. If so (S704=YES), at S706, the computing device 700 establishes a network communication link 702 with a cleaner dispensing apparatus 200. The network communication link 702 may be established at S706 in response to receiving a user command (entered via user interaction with interface 760) to attempt to discover and establish a network communication link 702 with a cleaner dispensing apparatus 200 via any known network communication link discovery, handshake, and/or link establishment methods. The network communication link 702 may be established at S706 in response to detection of the cleaner dispensing apparatus 200 by at least the network communication interface 750 of the computing device 700. The network communication link 702 may be established in response to receiving a network communication link request (e.g., handshake) signal from the cleaner dispensing apparatus 200 via network communication interface 750. The network communication link 702 may be established in response to requesting and receiving user approval (e.g., via interaction a graphical icon of a graphical user interface displayed by interface 760 as shown in FIG. 10A) to approve establishing a network communication link 702 with a detected cleaner dispensing apparatus 200.

At S706, the computing device 700 communicates with the linked cleaner dispensing apparatus 200, via the network communication link 702, to obtain apparatus identity information 280 which identifies (e.g., uniquely identifies) the cleaner dispensing apparatus 200. At S708, the computing device 700 may associate the obtained apparatus identity information 280, and thus the particular cleaner dispensing apparatus 200 associated therewith, with the user account 734 entry to thus associate the particular cleaner dispensing apparatus 200 with the user account 734. In some example embodiments, the computing device 700 may communicate with a remote system 800 via the network communication link 802 to associate a particular cleaner dispensing apparatus 200 with a particular user account 734, including forwarding ("transmitting") user account information (e.g., user information 736) associated with a locally-stored user account 734 entry to the remote system 800 to enable the remote system 800 to update a remotely-stored user account 734 entry associated to be associated with the particular cleaner dispensing apparatus 200.

Referring to FIGS. 8A and 8B, the method shown in FIGS. 8A and 8B includes a method for operating the cleaner dispensing apparatus 200, the computing device 700, and the remote system 800 of control system 3000 according to any of the example embodiments.

Operations of the method shown in FIGS. 8A and 8B shown to be implemented by the computing device 700 may be implemented based on a processor 720 of the computing device 700 executing a program of instructions stored at a memory 730 of the computing device 700. Operations of the method shown in FIGS. 8A and 8B shown to be implemented by the cleaner dispensing apparatus 200 may be implemented by controller 210, for example based on a processor of the controller 210 executing a program of instructions stored at a memory of the controller 210. Operations of the method shown in FIGS. 8A and 8B shown to be implemented by the remote system 800 may be implemented based on a processor of at least one remote computing device 810 that at least partially supports the remote system 800 executing a program of instructions stored at a memory of at least one remote computing device 810 (which may be a same or different at least one remote computing device 810) that at least partially supports the remote system 800.

At S802, the remote system 800 transmits information indicating one or more authentic cartridge identifier codes 774, which may be stored in a remote database 832, at the remote system 800 to a computing device 700. The computing device 700 receives the authentic cartridge identifier codes 774 at S502 which is shown in FIG. 5. The transmitting at S802 may include transmitting a portion or an entirety of a remote database 832 of authentic cartridge identifier codes 774 stored at the remote system 800, to enable the computing device 700 to generate and/or to update (e.g., modify) a local database 732 stored at the computing device 700. The remote database 832 and the local database 732 may include a list of entries each identifying one or more authentic cartridge identifier codes 774 which are associated with one or more authenticated cartridges 300 which may be detachably coupled to the cleaner dispensing apparatus 200 to enable the cleaner dispensing system 1100 to dispense an authenticated cleaning composition 230.

At S804, a user provides a "new" cartridge 300 at least in proximity to the computing device 700 (e.g., to enable interaction between the computing device 700 and the cartridge 300 to enable authentication at S516 shown in FIGS. 5 and 8A to 8B). Such provision at S804 may include detachably coupling the cartridge 300 to the cleaner dispensing apparatus 200 as described with regard to FIGS. 1A and 1B and FIGS. 2A to 2D. Such provision at S804 may include the user simply obtaining the cartridge 300 and positioning the cartridge 300 in proximity of the computing device 700 and/or the cleaner dispensing apparatus 200 such that the cartridge 300 is not yet detachably coupled to the cleaner dispensing apparatus 200 at S804.

In some example embodiments, the cleaner dispensing apparatus 200 (e.g., controller 210) is configured to determine at S402 that the cartridge 300 is coupled to the cleaner dispensing apparatus 200 (e.g., based on determining that a circuit including the electrical switch device 1280 is closed due to the electrical switch device 1280 being in a closed-switch position due to engagement therewith by the cartridge 300). In response to such a determination at S402, the cleaner dispensing apparatus 200 (e.g., controller 210) may cause a coupling signal to be transmitted to the computing device 700 via the network communication link 702 at S403.

At S504, the computing device 700 receives an indication that the new cartridge (provided at the cleaner dispensing apparatus 200 at S804) is obtained and requested to be authenticated to selectively enable (and/or reset) the cleaner dispensing apparatus 200, at S504 which is shown in FIG. 5. Such an indication may include the coupling signal transmitted from the cleaner dispensing apparatus 200 to the computing device 700 at S403.

At S506, the computing device 700 obtains 790 cartridge information 372 from a cartridge indicator 370 of the new cartridge 300, as described herein with regard to S506 as shown in FIG. 5, for example based on controlling one or more detection devices 770 (e.g., camera devices, NFC communication interfaces, etc.) of the computing device 700. At S508, the computing device 700 detects a particular cartridge identifier code 374 that is indicated by the detected cartridge indicator 370 based on processing the obtained cartridge information 372, and thus detects the particular cartridge identifier code 374 that is associated with the new cartridge 300 based on obtaining cartridge information 372 from the cartridge indicator 370 of the cartridge 300, as described herein with regard to S508 as shown in FIG. 5.

At S540, the computing device 700 determines that the detected particular cartridge identifier code 374 corresponds to (e.g., matches, is identical to, etc.) an authentic cartridge identifier code 774, as described herein with regard to S540, S512 and S514 as shown in FIG. 5. At S516, the computing device 700 authenticates the new cartridge 300 based on a determination that the particular cartridge identifier code 374 associated with the new cartridge 300 is authenticated (e.g., matches an authentic cartridge identifier code 774 stored in a database 732), as described herein with regard to S516 as shown in FIG. 5. At S518, the computing device 700 transmits an apparatus enable command signal to the cleaner dispensing apparatus 200 via the network communication link 702 in response to authenticating the new cartridge 300, as described herein with regard to S518 as shown in FIG. 5.

At S404 (e.g., S404=YES), the cleaner dispensing apparatus 200 (e.g., controller 210) receives the apparatus enable command signal from the computing device 700, as described herein with regard to S404 as shown in FIG. 4. At S408, the cleaner dispensing apparatus 200 (e.g., controller 210) selectively enables operation of at least the dispenser device 208 of the cleaner dispensing apparatus 200 in response to the apparatus enable command signal, as described herein with regard to S408 as shown in FIG. 4. At S410, the cleaner dispensing apparatus 200 transmits an enable confirmation signal to the computing device 700 via the network communication link 702 in response to selectively enabling the at least the dispenser device 208 operation at S404, as described herein with regard to S410 as shown in FIG. 4. At S519, the computing device 700 receives the enable confirmation signal from the cleaner dispensing apparatus 200 as described herein with regard to S519 as shown in FIG. 5.

At S520, the computing device 700, in response to receiving the enable confirmation signal from the cleaner dispensing apparatus 200 at S519 and/or in response to transmitting the apparatus enable command signal at S518, de-authenticates the authentic cartridge identifier code 774 to which the detected particular cartridge identifier code 374 is determined to match at S540, which may include deleting the authentic cartridge identifier code 774 from the local database 732, and/or marking a de-authentication field of a database entry for the authentic cartridge identifier code 774 as "used," "de-authenticated," or the like in the database 732, as described herein with regard to S520 as shown in FIG. 5.

At S530, the computing device 700 transmits an enable indication signal to the remote system 800 via network communication link 802 in response to receiving the enable confirmation signal from the cleaner dispensing apparatus 200 at S519, in response to transmitting the apparatus enable command signal at S518, and/or in response to locally de-authenticating the authentic cartridge identifier code 774 that matches the detected particular cartridge identifier code 374 at S520, as described herein with regard to S530 as shown in FIG. 5. The enable indication signal may indicate the particular cartridge identifier code 374 that is determined to correspond to an authentic cartridge identifier code 774 at S540 and/or may indicate the authentic cartridge identifier code 774 that matches the detected particular cartridge identifier code 374. The enable indication signal may indicate a particular user account 734, cleaner dispensing apparatus 200, or the like associated with the particular cartridge identifier code 374.

At S806, the remote system 800 receives the enable indication signal from the computing device 700. At S808, the remote system 800 de-authenticates the particular authentic cartridge identifier code 774 that matches the detected particular cartridge identifier code 374, which may include deleting the matching authentic cartridge identifier code in the local database 732 and/or marking a de-authentication field of a database entry for the authentic cartridge identifier code 774 as "used," "de-authenticated," or the like in the database 832, as described herein with regard to S530 as shown in FIG. 5.

As shown in FIGS. 8A and 8B, subsequent to selectively enabling the dispenser operation at S404, the cleaner dispensing apparatus 200 may perform operations S412 to S428 iteratively as operations S440 as shown in FIG. 4 until a determination of S428=YES, S430=NO is made as described herein with regard to FIG. 4. During the operations S440, the cleaner dispensing apparatus 200 may increment a counter value in response to each operation of the dispenser device 208 and may transmit an update signal indicating the present, incremented counter value to the computing device 700. The computing device 700 may receive the update signal and update a stored indication of a quantity ("number') of remaining dispensings associated with the cleaner dispensing apparatus 200 and/or cartridge 300 presently coupled thereto (e.g., where the remaining dispensing is a difference between the present counter value and a stored first threshold counter value that is associated with partial or full depletion of the cartridge reservoir 304 of the presently coupled cartridge 300).

At S432, in response to a determination that a threshold counter value that is not (e.g., smaller than) the first threshold counter value (e.g., a second threshold counter value that may be a near-depletion threshold counter value) is reached (e.g., S428=YES and S430=NO as described herein with regard to FIG. 4), the cleaner dispensing apparatus 200 transmits a warning signal to the computing device 700 via the network communication link 702 as described herein with regard to S432 as shown in FIG. 4.

At S602, the computing device 700 receives and processes the warning signal as described herein with regard to S602 as shown in FIG. 6. At S608, the computing device 700 transmits an order command signal to the remote system 800 via network communication link 802 in response to the received warning signal, as described herein with regard to S620 and S608 as shown in FIG. 6. As described with regard to FIG. 6, the order command signal transmitted by the computing device 700 may include user account information associated with (e.g., identifying) a particular user account 734, including user information identifying a specific physical mailing address for delivery of new cartridge(s) 300, purchase information to enable a financial transaction to purchase, order, and/or delivery of one or more new cartridges 300, a particular quantity of cartridges 300 to purchase, order, and/or deliver, and a command to implement (e.g., execute) the purchase, ordering, and/or delivery of one or more new cartridges in association with the user account 734, so as to cause one or more new cartridges 300 to be delivered to a physical mailing address that is associated with the user account 734 and/or with the cleaner dispensing apparatus 200 (which may itself be associated with the user account 734). The order command signal may simply specify a user account 734 and/or cleaner dispensing apparatus 200 and a command to implement a cartridge purchase and/or order in association with the user account 734 and/or cleaner dispensing apparatus 200.

At S810, the remote system 800 receives the order command signal, for example receiving the order command signal at a remote computing device 810 which at least partially supports the remote system 800. At S812, the remote system (e.g., the remote computing device 810) causes the purchase, order, and/or delivery (collectively, "order") of a particular number of new cartridges to be implemented pursuant to the order command signal. To implement the commanding at S812, the remote system 800 may interact with one or more separate services which may be supported by one or more other computing devices, including a cartridge purchasing and/or ordering service, a financial transaction service to implement the purchase and/or order, a mailing or delivery service to implement the delivery, or the like. In some example embodiments, the remote system 800 may store a copy of the user account 734 information, including user information 736, and the order command signal may simply identify a particular user account 734 and command a purchase or order of one or more cartridges as specified by the user information 736 of the user account 734. In response, the remote system 800 may access the user information 736 of the user account 734 stored at remote computing device 810 to determine the specific quantity of cartridges to be purchased or ordered, the physical mailing address to which to ship/deliver the purchased/ordered cartridges, and purchase information that the remote system 800 utilizes to execute the financial transaction to purchase and/or delivery of the one or more new cartridges. The remote system 800 may then at S812 implement the purchase and/or order of the quantity of cartridges specified by the user account 734 information, using the purchase information specified by the user account 734 information, to be delivered to the physical mailing address specified by the user account 734 information and thus associated with the user account 734 (and further associated with a cleaner dispensing apparatus 200 that is associated with the user account 734 and which may be the cleaner dispensing apparatus 200 which transmits the warning signal at S432).

At S814, in response to implementing the purchase, order, and/or delivery of one or more new cartridges in association with a user account 734 and in response to receiving an order command signal from the computing device 700 at S810, the remote system 800 transmits an order confirmation signal to the computing device 700, which receives the order confirmation signal at S610 as described herein with regard to FIG. 6. The order confirmation signal may be as described with regard to FIG. 6, indicating the purchase, order, and/or delivery of one or more particular cartridges. At S612, the computing device 700 may provide the warning and/or purchase indication to a supported user as described herein with regard to S622 as shown in FIG. 6, for example via a displayed warning interface 2000*e* as shown in FIG. 10E.

Accordingly, referring to at least S432 also described with reference to FIGS. 4 and S602 and S608 also described with reference to FIG. 6, the cleaner dispensing apparatus 200 that is linked to the computing device 700 may be configured to transmit a warning signal to the computing device 700 at S432 in response to a determination (e.g., based on determining S428=YES and S430=NO) that the present counter value (incremented at S422) at least meets a second threshold counter value that may be smaller than the first threshold counter value determined at S430, where the second threshold counter value may be between the initial counter value and the first threshold counter value, and the computing device 700 (e.g., the processor thereof) may be configured to execute the program of instructions to transmit an order command signal to a remote system via a network communication link at S608 to cause at least one new cartridge to be delivered to a physical mailing address that is associated with the cleaner dispensing apparatus (e.g., due to the remote system commanding the order of one or more new cartridges at S812) in response to the warning signal received at S602.

At S430 and S434, the cleaner dispensing apparatus 200 determines that the present, incremented counter value of the cleaner dispensing apparatus 200 at least meets (e.g., is equal to or greater than) a particular, first threshold counter value that is associated with full depletion of the presently-coupled cartridge 300 (e.g., S430=YES) and, in response, inhibits operation of at least the dispenser device 208 of the cleaner dispensing apparatus 200, as described herein with regard to S430 and S434 as shown in FIG. 4. At S436, the cleaner dispensing apparatus 200 transmits an inhibit signal to the computing device 700 to indicate that the dispenser device 208 is inhibited and/or that the cartridge reservoir 304 of the cartridge 300 coupled to the cleaner dispensing apparatus 200 is depleted, as described herein with regard to S436 as shown in FIG. 4. At S616=YES, the computing device 700 receives and processes the inhibit signal and in response provides an inhibit indication to a supported user via one or more interfaces 760 as described herein with regard to S618 as shown in FIG. 6, for example via a displayed interface 2000*f* as shown in FIG. 10F.

Referring to FIGS. 9A and 9B, the method shown in FIGS. 9A and 9B includes a method for operating the cleaner dispensing apparatus 200, the computing device 700, and the remote system 800 of control system 3000 according to any of the example embodiments.

Operations of the method shown in FIGS. 9A and 9B shown to be implemented by the computing device 700 may be implemented based on a processor 720 of the computing device 700 executing a program of instructions stored at a memory 730 of the computing device 700. Operations of the method shown in FIGS. 9A and 9B shown to be implemented by the cleaner dispensing apparatus 200 may be implemented by controller 210, for example based on a processor of the controller 210 executing a program of instructions stored at a memory of the controller 210. Operations of the method shown in FIGS. 9A and 9B shown to be implemented by the remote system 800 may be implemented based on a processor of at least one remote computing device 810 that at least partially supports the remote system 800 executing a program of instructions stored at a memory of at least one remote computing device 810 (which may be a same or different at least one remote computing device 810) that at least partially supports the remote system 800.

At S900, the remote system 800 creates and/or maintains a remote database at the remote system 800, where the remote database 832 includes a list of entries each identifying one or more authentic cartridge identifier codes 774 which are associated with one or more authenticated cartridges 300 which may be detachably coupled to the cleaner dispensing apparatus 200 to enable system 1100 to dispense an authenticated cleaning composition.

At S804, a user provides a "new" cartridge 300 at least in proximity to the computing device 700 (e.g., to enable interaction between the computing device 700 and the cartridge 300 to enable authentication at S516 shown in FIGS. 5 and 8). Such provision at S804 may include detachably coupling the cartridge 300 to the cleaner dispensing apparatus 200 as described with regard to FIGS. 1A and 1B and FIGS. 2A to 2D. Such provision at S804 may include the user simply obtaining the cartridge 300 and positioning the cartridge 300 in physical proximity to the computing device 700 such that the cartridge 300 is not yet detachably coupled to the cleaner dispensing apparatus 200 at S804.

In some example embodiments, the cleaner dispensing apparatus 200 (e.g., controller 210) is configured to determine at S402 that the cartridge 300 is coupled to the cleaner dispensing apparatus 200 (e.g., based on determining that a circuit including the electrical switch device 1280 is closed due to the electrical switch device 1280 being in a closed-switch position due to engagement therewith by the cartridge 300). In response to such a determination at S402, the cleaner dispensing apparatus 200 (e.g., controller 210) may cause a coupling signal to be transmitted to the computing device 700 via the network communication link 702 at S403.

At S504, the computing device 700 receives an indication that the new cartridge (provided at the cleaner dispensing apparatus 200 at S804) is obtained and requested to be authenticated to unlock (and/or reset) the cleaner dispensing apparatus 200, at S504 which is shown in FIG. 5. Such an indication may include the coupling signal transmitted from the cleaner dispensing apparatus 200 to the computing device 700 at S403.

At S506, the computing device 700 obtains 790 cartridge information 372 from a cartridge indicator 370 of the new cartridge 300, as described herein with regard to S506 as shown in FIG. 5, for example based on controlling one or more detection devices 770 (e.g., camera devices, NFC communication interfaces, etc.) of the computing device 700. At S508, the computing device 700 detects a particular cartridge identifier code 374 that is indicated by the detected cartridge indicator 370 based on processing the obtained cartridge information 372, and thus detects the particular cartridge identifier code 374 that is associated with the new cartridge 300 based on obtaining cartridge information 372 from the cartridge indicator 370 of the cartridge 300, as described herein with regard to S508 as shown in FIG. 5.

At S522 and S540, the computing device transmits an authentication request signal to the remote system 800, where the authentication request signal includes information indicating the detected particular cartridge identifier code 374 and including a request for the remote system 800 to determine whether the particular cartridge identifier code 374 matches one or more authentic cartridge identifier code 774, as described herein with regard to S522 as shown in FIG. 5.

At S902, the remote system 800 receives the authentication request signal which indicates the particular cartridge identifier code 374 from the computing device 700. At S904, the remote system 800 accesses the remote database 832 of authentic cartridge identifier codes 774 and compares the particular cartridge identifier code 374 indicated by the authentication request signal to the authentic cartridge identifier codes 774 in the database 832 to determine whether the particular cartridge identifier code 374 matches one or more authentic cartridge identifier codes 374 stored in the database 832. The determination at S904 may proceed similarly to the determination at S540 as described herein with regard to FIGS. 5 and 8A to 8B, with a difference that the determination is performed at the remote system 800 instead of the computing device 700. At S906, the remote system 800 responds to a determination that the particular cartridge identifier code 374 matches at least one authentic cartridge identifier code 774 that is stored in the database 832 by transmitting an authentication confirmation signal to the computing device 700, where the authentication confirmation signal indicates that the particular cartridge identifier code 374 is an authentic cartridge identifier code.

At S524 and S540, the computing device 700 receives the authentication confirmation signal from the remote system 800 as described with regard to S524 as shown in FIG. 5. At S526, the computing device 700 authenticates the new cartridge 300 based on a determination, in response to receiving and processing the authentication confirmation signal that is received at S524, that the particular cartridge identifier code 374 associated with the new cartridge 300 is authenticated, as described herein with regard to S526 as shown in FIG. 5. At S528, the computing device 700 transmits an apparatus enable command signal to the cleaner dispensing apparatus 200 via the network communication link 702 in response to authenticating the new cartridge 300, as described herein with regard to S528 as shown in FIG. 5.

Accordingly, referring to FIGS. 5 and 9A, where the remote system 800 stores the remote database 832 of one or more authentic cartridge identifier codes 774, the computing device 700 may be configured to transmit an authentication request signal that indicates the particular cartridge identifier code 374 to the remote system 800 via a network communication link 802 at S522, and the remote system 800 may compare the particular cartridge identifier code 374 with the one or more authentic cartridge identifier codes 774 that are stored in the database 832 at S904 to determine that the particular cartridge identifier code 374 matches at least one authentic cartridge identifier code 774 from among the one or more authentic cartridge identifier codes 774 stored in the database 832, in response to receiving and processing the authentication request signal, and transmit an authentication confirmation signal to the computing device at S906 in response to determining that the particular cartridge identifier code 374 matches at least one authentic cartridge identifier code 774. The computing device 700 may determine at S540 (e.g., at S524=YES) that the detected particular cartridge identifier code 374 matches at least one authentic cartridge identifier code 774 and thereby determine that the detected particular cartridge identifier code 374 is authenticated, in response to processing the authentication confirmation signal received from the remote system 800 at S524. The computing device 700 may determine at S540 (e.g., at S524=YES) that the detected particular cartridge identifier code 374 matches at least one authentic cartridge identifier code 774 in response to receiving the authentication confirmation signal at S524 within a particular period of time elapsed from a time at which the computing device transmits the authentication request signal to the remote system 800 at S522 (e.g., 30 seconds time elapsed).

At S404=YES, the cleaner dispensing apparatus 200 (e.g., controller 210) receives the apparatus enable command signal from the computing device 700, as described herein with regard to S402 as shown in FIG. 4. At S408, the cleaner dispensing apparatus 200 (e.g., controller 210) selectively enables operation of at least the dispenser device 208 of the cleaner dispensing apparatus 200 in response to the apparatus enable command signal, as described herein with regard to S404 as shown in FIG. 4. At S410, the cleaner dispensing apparatus 200 transmits an enable confirmation signal to the computing device 700 via the network communication link 702 in response to selectively enabling the at least the dispenser device 208 operation at S404, as described herein with regard to S404 as shown in FIG. 4. At S529, the computing device 700 receives the enable confirmation signal from the cleaner dispensing apparatus 200 as described herein with regard to S529 as shown in FIG. 5.

At S530, the computing device 700, in response to receiving the enable confirmation signal from the cleaner dispensing apparatus 200 at S529 and/or in response to transmitting the apparatus enable command signal at S528, transmits an enable indication signal to the remote system 800 via network communication link 802, as described herein with regard to S530 as shown in FIG. 5. The enable indication signal may indicate the particular cartridge identifier code 374 and/or may indicate the authentic cartridge identifier code 774 that matches the detected particular cartridge identifier code 374. The enable indication signal may indicate a particular user account 734, cleaner dispensing apparatus 200, or the like associated with the particular cartridge identifier code 374.

At S806, the remote system 800 receives the enable indication signal from the computing device 700. At S808, the remote system 800 de-authenticates the particular authentic cartridge identifier code 774 that matches the detected particular cartridge identifier code 374, which may include deleting the matching authentic cartridge identifier code in the local database 732 and/or marking a de-authentication field of a database entry for the authentic cartridge identifier code 774 as "used," "de-authenticated," or the like in the database 832, as described herein with regard to S530 as shown in FIG. 5.

As shown in FIGS. 9A and 9B, subsequent to selectively enabling the dispenser operation at S404, the cleaner dispensing apparatus 200 may perform operations S412 to S428 iteratively as operations S440 as shown in FIG. 4 until a determination of S428=YES, S430=NO is made as described herein with regard to FIG. 4. During the operations S440, the cleaner dispensing apparatus 200 may increment a counter value in response to each operation of the dispenser device 208 and may transmit an update signal indicating the present, incremented counter value to the computing device 700. The computing device 700 may receive the update signal and update a stored indication of a quantity ("number') of remaining dispensings associated with the cleaner dispensing apparatus 200 and/or cartridge 300 presently coupled thereto (e.g., where the remaining dispensing is a difference between the present counter value and a stored first threshold counter value that is associated with partial or full depletion of the cartridge reservoir 304 of the presently coupled cartridge 300).

At S432, in response to a determination that a threshold counter value that is not (e.g., smaller than) the first threshold counter value (e.g., a second threshold counter value that may be a near-depletion threshold counter value) is reached (e.g., S428=YES and S430=NO as described herein with regard to FIG. 4), the cleaner dispensing apparatus 200 transmits a warning signal to the computing device 700 via the network communication link 702 as described herein with regard to S432 as shown in FIG. 4.

At S602, the computing device 700 receives and processes the warning signal as described herein with regard to S602 as shown in FIG. 6. At S608, the computing device 700 transmits an order command signal to the remote system 800 via network communication link 802 in response to the received warning signal, as described herein with regard to S620 and S608 as shown in FIG. 6. As described with regard to FIG. 6, the order command signal transmitted by the computing device 700 may include user account information associated with (e.g., identifying) a particular user account 734, including user information identifying a specific physical mailing address for delivery of new cartridge(s) 300, purchase information to enable a financial transaction to purchase, order, and/or delivery of one or more new cartridges 300, a particular quantity of cartridges 300 to purchase, order, and/or deliver, and a command to implement (e.g., execute) the purchase, ordering, and/or delivery of one or more new cartridges in association with the user account 734, so as to cause one or more new cartridges 300 to be delivered to a physical mailing address that is associated with the user account 734 and/or with the cleaner dispensing apparatus 200 (which may itself be associated with the user account 734). The order command signal may simply specify a user account 734 and/or cleaner dispensing apparatus 200 and a command to implement a cartridge purchase and/or order in association with the user account 734 and/or cleaner dispensing apparatus 200.

At S810, the remote system 800 receives the order command signal, for example receiving the order command signal at a remote computing device 810 which at least partially supports the remote system 800. At S812, the remote system (e.g., the remote computing device 810) causes the purchase, order, and/or delivery (collectively, "order") of a particular number of new cartridges to be implemented pursuant to the order command signal. To implement the commanding at S812, the remote system 800 may interact with one or more separate services which may be supported by one or more other computing devices, including a cartridge purchasing and/or ordering service, a financial transaction service to implement the purchase and/or order, a mailing or delivery service to implement the delivery, or the like. In some example embodiments, the remote system 800 may store a copy of the user account 734 information, including user information 736, and the order command signal may simply identify a particular user account 734 and command a purchase or order of one or more cartridges as specified by the user information 736 of the user account 734. In response, the remote system 800 may access the user information 736 of the user account 734 stored at remote computing device 810 to determine the specific quantity of cartridges to be purchased or ordered, the physical mailing address to which to ship/deliver the purchased/ordered cartridges, and purchase information that the remote system 800 utilizes to execute the financial transaction to purchase and/or delivery of the one or more new cartridges. The remote system 800 may then at S812 implement the purchase and/or order of the quantity of cartridges specified by the user account 734 information, using the purchase information specified by the user account 734 information, to be delivered to the physical mailing address specified by the user account 734 information and thus associated with the user account 734 (and further associated with a cleaner dispensing apparatus 200 that is associated with the user account 734 and which may be the cleaner dispensing apparatus 200 which transmits the warning signal at S432).

At S814, in response to implementing the purchase, order, and/or delivery of one or more new cartridges in association with a user account 734 and in response to receiving an order command signal from the computing device 700 at S810, the remote system 800 transmits an order confirmation signal to the computing device 700, which receives the order confirmation signal at S610 as described herein with regard to FIG. 6. The order confirmation signal may be as described with regard to FIG. 6, indicating the purchase, order, and/or delivery of one or more particular cartridges. At S612, the computing device 700 may provide the warning and/or purchase indication to a supported user as described herein with regard to S622 as shown in FIG. 6. for example via a displayed warning interface 2000*e* as shown in FIG. 10E.

Accordingly, referring to at least S432 also described with reference to FIGS. 4 and S602 and S608 also described with reference to FIG. 6, the cleaner dispensing apparatus 200 that is linked to the computing device 700 may be configured to transmit a warning signal to the computing device 700 at S432 in response to a determination (e.g., based on determining S428=YES and S430=NO) that the present counter value (incremented at S422) at least meets a second threshold counter value that may be smaller than the first threshold counter value determined at S430, where the second threshold counter value may be between the initial counter value and the first threshold counter value, and the computing device 700 (e.g., the processor thereof) may be configured to execute the program of instructions to transmit an order command signal to a remote system via a network communication link at S608 to cause at least one new cartridge to be delivered to a physical mailing address that is associated with the cleaner dispensing apparatus (e.g., due to the remote system commanding the order of one or more new cartridges at S812) in response to the warning signal received at S602.

At S430 and S434, the cleaner dispensing apparatus 200 determines that the present, incremented counter value of the cleaner dispensing apparatus 200 at least meets (e.g., is equal to or greater than) a particular, first threshold counter value that is associated with full depletion of the presently-coupled cartridge 300 (e.g., S430=YES) and, in response, inhibits operation of at least the dispenser device 208 of the cleaner dispensing apparatus 200, as described herein with regard to S430 and S434 as shown in FIG. 4. At S436, the cleaner dispensing apparatus 200 transmits an inhibit signal to the computing device 700 to indicate that the dispenser device 208 is inhibited and/or that the cartridge reservoir 304 of the cartridge 300 coupled to the cleaner dispensing apparatus 200 is depleted, as described herein with regard to S436 as shown in FIG. 4. At S616=YES, the computing device 700 receives and processes the inhibit signal and in response provides an inhibit indication to a supported user via one or more interfaces 760 as described herein with regard to S618 as shown in FIG. 6, for example via a displayed interface **2000*f* as shown in FIG. 10**F.

Referring to S512-S514 and S522-S524 of S540 as shown in FIG. 5 and further shown in FIGS. 8A and 9A (and further referring to S902-S906 as shown in FIG. 9A), a determination at S540 that the detected particular cartridge identifier code 374 matches the authentic cartridge identifier code 774 at S540 may include comparing, at the computing device 700 and/or at the remote system 800 in response to the authentication request signal transmitted from the computing device 700 at S522, the detected particular cartridge identifier code 374 with one or more authentic cartridge identifier codes 774 that are stored in a database (e.g., local database 732 and/or remote database 832), and determining, at the computing device 700 and/or at the remote system 800, that the detected particular cartridge identifier code 374 matches at least the authentic cartridge identifier code 774 from among one or more authentic cartridge identifier codes 774 included in the database.

Referring to at least S502 and S512-S514 of S540, the computing device 700 may be configured to receive one or more authentic cartridge identifier codes 774 from a remote system 800 via a network communication link 702 and store the database 732 including the one or more authentic cartridge identifier codes 774 locally (e.g., in a memory of the computing device 700), and the computing device 700 may be configured to compare the detected particular cartridge identifier code 374 with the one or more authentic cartridge identifier codes 774 that are stored in the database at the computing device 700. Referring to S520 and S530 shown in FIG. 5 and further shown in FIGS. 8A and 9A and further referring to S806 and S808 shown in FIGS. 8A-8B and FIGS. 9A-9B, at least one of the computing device 700 or the remote system 800 may be configured to de-authenticate the authentic cartridge identifier code based on the apparatus enable command signal being transmitted to the cleaner dispensing apparatus 200 (e.g., at S518 and/or at S528).

It will be understood that the computing device 700 may be configured to perform any of the functionality described herein, including as described and/or illustrated with regard to FIGS. 4-9B and 10A-10F, based on implementing a program of instructions (e.g., a processor 720 of the computing device 700 executing a program of instructions stored on a memory 730 of the computing device 700) to implement an "application" associated with the drain cleaning system 1100, and that any of such functionality may be referred to as being part of the "application" associated with the drain cleaning system 1100 as described herein.

FIGS. 10A, 10B, 10C, 10D, 10E, and 10F are views of graphical user interfaces **2000*a* to 2000*f* of an authentication and control graphical user interface (GUI) 2000 displayed by the computing device 700 according to some example embodiments. As described herein, the computing device 700 may be configured to present (e.g., display) one or more graphical user interfaces (e.g., one or more graphical user interfaces 2000*a* to 2000*f* of the authentication and control graphical user interface (GUI) 2000) based on implementing an "application" associated with the drain cleaning system 1100 as described herein based on implementing a program of instructions (e.g., a processor 720 of the computing device 700 executing a program of instructions stored on a memory 730 of the computing device 700**).

The graphical user interfaces shown in FIGS. 10A to 10F may a graphical user interfaces, for example displayed by the computing device 700 via the display interface 760 of the computing device 700 which may be a touch screen display interface, to enable user interaction with the computing device 700 to control operation of the control system 3000 according to any of the example embodiments to control operation of a cleaner dispensing system 1100 (e.g., selective unlocking and/or locking of a cleaner dispensing apparatus 200 thereof) via the network communication link 702 and to further interact with a remote system 800 to enable such control and/or to enable purchasing and/or delivery of additional new cartridges 300 to replace near-depleted or totally depleted cartridges 300 of the cleaner dispensing system 1100. Some or all of the graphical user interfaces shown at FIGS. 10 to 10F may be implemented by the computing device 700, for example based on a processor 720 of the computing device 700 executing a program of instructions stored at a memory 730 of the computing device 700.

Referring to FIGS. 10A-10F, the computing device 700 may generate an authentication and control graphical user interface (GUI), also referred to herein as a GUI 2000 to be displayed by display interface 760. As shown, the GUI 2000 may display different interfaces, sub-interfaces, screens, pages, graphical representations, graphical icons, or the like, including various interfaces **2000*a*-2000*f* (also referred to herein as sub-interfaces, interface pages, interface screens, etc.) as shown in FIGS. 10A-10F, based on operations of the computing device 700 and/or user interaction with the computing device 700 (e.g., user interaction with the authentication and control GUI 2000**).

Referring to FIG. 10A, the authentication and control GUI 2000 displayed by the computing device 700 via a display interface 760 thereof may generate a home screen interface **2000*a* which may be the initial, or default, graphical interface of the authentication and control GUI 2000 (also referred to herein as a GUI 2000) that is displayed by a display interface 760 when an authentication control application is implemented by the computing device 700. As shown, the home screen interface 2000*a* of the GUI 2000 may include a graphic representation of a status 2010 of a linked cleaner dispensing apparatus 200 that is linked with the computing device 700 via the network communication link 702 and/or is associated with a user account 734 supported by the computing device 700. As shown, the status 2010 representation may include a status indication 2012 that indicates whether the cleaner dispensing apparatus 200 is presently linked with the computing device 700 via a network communication link 702 and may further indicate whether the cleaner dispensing apparatus 200 is presently in an enabled (e.g., unlocked) state in response to an apparatus enable command signal as described herein. As further shown, the status 2010 representation may include a counter indication field 2014 which indicates a quantity, or number, of dispensings remaining until the final depletion threshold counter value (e.g., first threshold counter value) is reached by the cleaner dispensing apparatus 200, thereby indicating an amount of cleaning composition (in quantity of dispensings) remaining in the cartridge 300 that is presently coupled to the cleaner dispensing apparatus 200**.

Still referring to FIG. 10A, the home screen interface 2000*a* of the GUI 2000 may present interactive graphical icons 2016, 2018, 2020, 2022, 2024 with which a user may interact (e.g., based on touching a corresponding part of the display interface 760 on which a graphical icon is displayed) to provide a command to the computing device 700 to display a new GUI screen associated with particular functionality and/or to command the computing device 700 to perform a particular operation.

As shown, the home screen interface 2000*a* of the GUI 2000 may display an authentication command icon 2016. In response to user interaction with the authentication command icon 2016, the computing device 700 may initiate an attempt to obtain cartridge information 372 from a cartridge indicator 370 of a cartridge 300 to attempt to authenticate the cartridge 300. In some example embodiments, user interaction with the authentication command icon 2016 may be interpreted by the computing device 700 as receipt of an indication of a new cartridge at S504 of the method shown in FIG. 5, such that the computing device 700 may responsively initiate an attempt to obtain cartridge information 372 at S506 in the method shown in FIG. 5.

Still referring to FIG. 10A, the home screen interface 2000*a* of the GUI 2000 may display an apparatus link icon 2018. In response to user interaction with the apparatus link icon 2018, the computing device 700 may initiate an attempt to establish a network communication link 702 with one or more cleaner dispensing apparatuses 200. In some example embodiments, user interaction with the authentication command icon 2016 may be interpreted by the computing device 700 as receipt of a command to establish a link at S704 of the method shown in FIG. 7, such that the computing device 700 may responsively initiate an attempt to establish a communication link with a cleaner dispensing apparatus 200 at S706 and, if successful, obtain apparatus identity information 280 of the linked cleaner dispensing apparatus 200 and associate the linked cleaner dispensing apparatus 200 with a user account 734 supported by the computing device 700 at S710 of the method shown in FIG. 7.

Still referring to FIG. 10A, the home screen interface 2000*a* of the GUI 2000 may display a user account creation/editing icon 2020. In response to user interaction with the user account creation/editing icon 2020, the computing device 700 may initiate an attempt to create and/or modify one or more user accounts 734 supported by the computing device 700. The GUI 2000 may responsively display a user account interface 2000*b* as shown in FIG. 10B, which displays fields associated with particular user information 736 (e.g., mailing address, purchase information, authorization to automatically purchase/order a particular quantity of cartridges if a warning signal is received from a linked cleaner dispensing apparatus 200 and/or cleaner dispensing apparatus 200 associated with the user account 734, etc.) apparatus identity information 280 identifying one or more cleaner dispensing apparatus(es) 200 associated with the user account 734, etc. A user may interact with any of the displayed fields to populate the user information 736 and/or apparatus identity information 280 associated with a created/edited user account 734 that is supported by the computing device 700. In some example embodiments, user interaction with the user account creation/editing icon 2020 may be interpreted by the computing device 700 as receipt of a command to create and/or modify a user account 734 at S702 of the method shown in FIG. 7, such that the computing device 700 may responsively perform S702 of the method shown in FIG. 7.

Still referring to FIG. 10A, the home screen interface 2000*a* of the GUI 2000 may display a database update command icon 2022. In response to user interaction with the database update command icon 2022, the computing device 700 may communicate with remote system 800 to obtain an updated list and/or database of authentic cartridge identifier codes 774 to update the locally stored database 732, for example as shown at S502 in FIG. 5 and FIGS. 8A and 8B.

Still referring to FIG. 10A, the home screen interface 2000*a* of the GUI 2000 may display a cartridge order command icon 2024. In response to user interaction with the cartridge order command icon 2024, the computing device 700 may communicate with remote system 800 to transmit an order command signal as shown at S608 in FIG. 6 and FIGS. 8A, 8B, 9A, and 9B, although the computing device 700 may transmit the order command signal based on user interaction with the cartridge order command icon 2024 and independently of any received warning signal as shown in FIGS. 6 and 8A-9B.

Referring now to FIG. 10B, in response to user interaction with the user account creation/editing icon 2020 of the home screen interface 2000*a*, in the home screen interface 2000*a* of the GUI 2000 as shown in FIG. 10A, the computing device 700 may display a user account interface 2000*b* of the GUI 2000 that at least partially facilitates editing/inputting user account information 738 in a user account 734 supported by the computing device 700.

As shown in FIG. 10B, the user account interface 2000*b* may display various user account information 738 associated with a displayed user account 734 supported by the computing device 700, including user information 736 associated with a user supported by the user account 734 and apparatus identity information 280 associated with a cleaner dispensing apparatus 200 that is associated with the user account 734 and/or linked with the computing device 700. As shown, the user information 736 may include information indicating a name of the supported user, a physical mailing address associated with the supported user (and to which ordered cartridges may be delivered), purchase information such as credit card information associated with the supported user (and which may be used to implement financial transactions to complete purchase, order, and/or delivery of cartridges), indications of whether automatic ordering of new cartridges using the user information 736 of the user account 734 in response to receipt of a warning signal as described herein at the computing device 700 is authorized, an indication of a quantity of cartridges to order with each automatic ordering, or the like. It will be understood that purchasing, ordering, and/or delivery of one or more cartridges may be referred to herein as simply "ordering" said cartridges. As shown, the user account interface

2000*b* may display an "EDIT" icon 2032 with which a user may interact to enable editing of some or any user information 736 associated with the user account 734.

Still referring to FIG. 10B, the apparatus identity information 280 may include information, such as an apparatus identity code, which may identify (e.g., uniquely identify) a cleaner dispensing apparatus 200 that is associated with the user account 734, an indication of whether a network communication link 702 with the apparatus is established and/or active, and a quantity of dispensings remaining in association with the cleaner dispensing apparatus 200 (which may be a difference between a present counter value of a counter implemented by the cleaner dispensing apparatus 200 and a final depletion threshold counter value, thereby indicating a quantity of dispensings by the cleaner dispensing apparatus 200 remaining until the counter value thereof is incremented to meet the final depletion threshold counter value. As further shown, the user account interface 2000*b* may display an "UPDATE" icon 2038 with which a user may interact to enable changing the cleaner dispensing apparatus 200 that is associated with the user account 734, including for example establishing a new network communication link 702 with a new cleaner dispensing apparatus 200 from which apparatus identity information 280 may be obtained to associate the new cleaner dispensing apparatus 200 with the user account 734. User interaction with the update icon 2038 may cause the computing device 700 to perform the same operation(s) as the operations that the computing device 700 is configured to perform in response to user interaction with the apparatus link icon 2018 in the home screen interface 2000*a* as shown in FIG. 10A.

As further shown in FIG. 10B, the user account interface 2000*b* may include icons 2034 and 2036 with which a user may interact to cause creation of a new user account 734 (which may be in addition to the user account represented in display 2030) and/or to delete the user account 734 represented in display 2030, respectively. As further shown, the user account interface 2000*b* may display a home screen return icon 2040 with which a user may interact to cause the GUI 2000 to revert to displaying the home screen interface 2000*a* shown in FIG. 10A.

Referring now to FIG. 10C, in response to user interaction with the authentication command icon 2016 in the home screen interface 2000*a* of the GUI 2000 as shown in FIG. 10A, the computing device 700 may display an authentication interface 2000*c* of the GUI 2000 that at least partially facilitates obtaining cartridge information 372 from a cartridge indicator 370 of a cartridge 300 to further facilitate processing of the cartridge information 372 to detect a particular cartridge identifier code 374 associated with the cartridge 300. The authentication interface 2000*c* shown in FIG. 10C is associated with controlling a detection device 770 that includes a camera device to generate an image 2058 of the cartridge information 372 that is in the form of (e.g., defined by) a visible pattern 392 that is visible from an exterior of a cartridge 300 (e.g., on the outer surface 302S of the cartridge 300).

As shown, the authentication interface 2000*c* may present a display field 2050 of one or more images 2058 (e.g., a real-time video stream) generated by a camera detection device 770 of the computing device 700, such that the display field 2050 may show a real-time or near real-time view (e.g., one or more images 2058) of a portion of an environment within the field of view 780 of the camera detection device 770. The computing device 700 may be configured to automatically (e.g., without user intervention, without manual intervention, etc.) recognize and process a visible pattern 392 (e.g., a QR code) that is present within at least a certain region 2052 in the display field 2050 (or anywhere in the display field 2050) to obtain the cartridge information 372 that is represented by (e.g., defined by) the visible pattern 392.

In some example embodiments, and as shown in FIG. 10C, the authentication interface 2000*c* may include a scan command icon 2054 with which a user may interact to manually command the computing device 700 to process an image 2058 generated by the camera detection device 770 and displayed in the display field 2050 to identify and obtain cartridge information 372, if present, from a visible pattern 392, if located within the image 2058 displayed in the display field 2050. A user may manually manipulate (e.g., rotate, translate, etc.) the computing device 700 and/or camera detection device 770 in an environment and in relation to a cartridge 300 in the environment to move the field of view 780 to encompass at least the visible pattern 392 of the cartridge indicator 370 so that an image 2058, generated by the detection device 770, of the field of view that includes the visible pattern 392 is displayed in the display field 2050 (e.g., within region 2052, which may be identified within the generated image 2058 by identifying marks, a box symbol illustrating the boundary of region 2052 in the displayed image 2058, etc.) and so that the computing device 700 may process the image 2058 (e.g., automatically and without user intervention, and/or in response to user interaction with the scan command icon 2054) to recognize the visible pattern 392, process the visible pattern 392 to obtain the cartridge information 372 represented thereby, and to further process the cartridge information 372 to detect a particular cartridge identifier code 374.

In some example embodiments, the computing device 700 may automatically (e.g., without manual intervention) process an image 2058 of a visible pattern 392 to obtain the cartridge information 372 represented thereby in response to determining that the outer boundaries of the visible pattern 392 correspond (e.g., within a 10% margin) to the boundaries of the region 2052. But example embodiments are not limited thereto, and in some example embodiments, the computing device 700 may automatically (e.g., without manual intervention) process an image 2058 of a visible pattern 392 to obtain the cartridge information 372 represented thereby in response to determining that the visible pattern 392 is present, in its entirety (e.g., the entire visible pattern 392 is present) within the image 2058 shown ("displayed") in the display field 2050. As further shown, the authentication interface 2000*c* may display a home screen return icon 2056 with which a user may interact to cause the GUI 2000 to revert to displaying the home screen interface 2000*a* shown in FIG. 10A, thereby terminating an attempt to authenticate a cartridge 300.

Referring now to FIG. 10D, in response to the computing device 700 obtaining cartridge information 372 from a cartridge indicator 370 of a cartridge 300, for example based on processing an image 2058 displayed in the display field 2050 shown in the authentication interface 2000*c*, and in response to the computing device 700 further processing the cartridge information 372 to detect a particular cartridge identifier code 374, for example based on user interaction with authentication interface 2000*c* and/or manipulating the computing device 700 and/or detection device 770 concurrently with the authentication interface 2000*c* being displayed, the computing device 700 may perform operations as described herein to authenticate the detected particular cartridge identifier code 374 (e.g., operation S540 as shown in FIG. 5). In response to the computing device 700 authenticating a cartridge at S516 or S526 in response to authenticating the detected particular cartridge identifier code 374 at S540, responsively transmitting an apparatus enable command signal at S518 or S528, and/or receiving an enable confirmation signal transmitted by the cleaner dispensing apparatus 200 at S519 or S529 in response to enabling at least the dispenser device 208 of the apparatus in response to the apparatus enable command signal transmitted at S518 or S528, the computing device 700 may cause the GUI 2000 to display an authentication success interface 2000*d* which includes an indication 2060 that the authentication attempt has succeeded, such that a new cartridge 300 is authenticated (and may be further associated with the user account supported by the computing device 700) and a cleaner dispensing apparatus 200 associated with a user account 734 supported by the computing device 700 is selectively enabled (e.g., activated, unlocked, etc.) in response to the authentication so as to enable dispensing operations by a dispenser device 208 thereof. The authentication success interface 2000*d* may include a dispensing counter field 2062 which displays a quantity of remaining dispensings associated with the cleaner dispensing apparatus 200 until the cleaner dispensing apparatus 200 is inhibited in response to a counter thereof being incremented to have a counter value that meets a final depletion threshold counter value (e.g., the field 2062 displays a difference between the present counter value of the cleaner dispensing apparatus 200 and the first (e.g., final depletion) threshold counter value).

As described above, the computing device 700 may display the authentication success interface 2000*d* in response to authentication being attempted via processing an image 2058 displayed in the display field 2050 in authentication interface 2000*c*, in example embodiments where the computing device 700 includes a camera detection device 770 and the cartridge indicator 370 is configured to present cartridge information 372 in the form of a visible pattern 392. However, example embodiments are not limited thereto. For example, in some example embodiments where the cartridge indicator 370 includes an NFC device configured to transmit an NFC signal that indicates the cartridge information 372 in response to receiving an NFC field, and where the computing device 700 includes a detection device 770 that includes an NFC communication interface configured to transmit/emit the NFC field and/or to receive the NFC signal, the computing device 700 may display an authentication success interface 2000*d* in response to user interaction with icon 2016 in the home screen interface 2000*a* and the computing device 700 responsively performing any of operation S540 to at least authenticate a cartridge at S516 and/or S526, transmit an apparatus enable command signal at S518 and/or S528, and/or receive an enable confirmation signal in response to said apparatus enable command signal at S519 and/or S529, such that the computing device 700 may display authentication success interface 2000*d* without first displaying authentication interface 2000*c* as such a screen may not be used in example embodiments where a camera detection device 770 is not used to obtain cartridge information 372 to detect a particular cartridge identifier code 374 of a cartridge 300 to be authenticated.

As further shown, the authentication success interface 2000*d* may display a home screen return icon 2064 with which a user may interact to cause the GUI 2000 to revert to displaying the home screen interface 2000*a* shown in FIG. 10A. In some example embodiments, the GUI may automatically revert from the authentication success interface 2000*d* to the home screen interface 2000*a* in response to displaying the authentication success interface 2000*d* for a particular, fixed amount of time (e.g., 5 seconds).

Referring now to FIG. 10E, in response to the computing device 700 receiving a warning signal from the cleaner dispensing apparatus 200 at S602, in response to the cleaner dispensing apparatus 200 determining that the warning threshold counter value (e.g., a second threshold counter value that is smaller than the first threshold counter value associated with final depletion of a cartridge 300 coupled to the cleaner dispensing apparatus 200) is reached (S428=YES, S430=NO) and/or in response to the computing device 700 processing the counter value information transmitted by the cleaner dispensing apparatus 200 to determine that the warning threshold counter value is reached and/or that a quantity of remaining dispensings (received at S816) is at or below a warning threshold value, the computing device 700 may cause the GUI 2000 to display a warning interface 2000*e* indicating that the warning threshold counter value is reached at the cleaner dispensing apparatus 200 associated with the user account 734 supported by the computing device 700. The computing device 700 may display the warning interface 2000*e* as part of providing a warning indication to a supported user at S612 shown in FIG. 6.

As shown, the warning interface 2000*e* may include a warning field 2070 which indicates that the warning threshold counter value is reached at the cleaner dispensing apparatus 200, such that the cleaner dispensing apparatus 200 will soon reach the final depletion threshold counter value upon a next or imminent counter value incrementation by the cleaner dispensing apparatus 200. The field 2070 may include additional information, including information indicating that the cleaner dispensing apparatus 200 is presently in an enabled (e.g., unlocked) state despite the warning threshold counter value being reached. In example embodiments where the user account 734 with which the computing device 700 and/or the cleaner dispensing apparatus 200 is associated includes user account information 738 authorizing automatic ordering of one or more new cartridges in response to the warning signal being received at the computing device from the associated cleaner dispensing apparatus 200 at S602, such that the computing device 700 automatically responds to receipt and processing of the warning signal S602 by at least transmitting an order command signal as shown at S620 and S608 in FIGS. 6, 8A and 8B, and 9A and 9B, the warning interface 2000*e* may include an order information field 2072 indicating that one or more new cartridges have been automatically ordered in response to the warning signal being received from the cleaner dispensing apparatus 200 and may include additional information associated with the order, including an estimated date of delivery of the ordered cartridge(s) to the physical mailing address associated with the user account 734 (and thus associated with a cleaner dispensing apparatus 200 that is associated with the user account 734).

The warning interface 2000*e* may include a dispensing counter field 2074 (which displays a quantity of dispensings remaining at the cleaner dispensing apparatus 200 until the cleaner dispensing apparatus 200 is inhibited in response to a counter thereof being incremented to have a counter value that meets a final depletion threshold counter value (e.g., the field 2074 displays a difference between the present counter value of the cleaner dispensing apparatus 200 and the first threshold counter value).

As shown, the warning interface 2000*e* of the GUI 2000 may display an authentication command icon 2076, which may be similar to icon 2016 shown in FIG. 10A. In response to user interaction with the authentication command icon 2076, the computing device 700 may initiate an attempt to obtain cartridge information 372 from a cartridge indicator 370 of a new cartridge 300 to attempt to authenticate the cartridge 300, via which the computing device 700 may transmit a new apparatus enable command signal to the cleaner dispensing apparatus 200 associated with the user account 734 and/or linked with the computing device 700 via the network communication link 702, thereby enabling re-set of the counter value of the cleaner dispensing apparatus 200 (and thus resetting the "dispensings remaining" field displayed by the GUI 2000). In some example embodiments, user interaction with the authentication command icon 2076 may be interpreted by the computing device 700 as receipt of an indication of a new cartridge at S614 of the method shown in FIG. 6 and/or at S504 of the method shown in FIG. 5. such that the computing device 700 may responsively initiate an attempt to obtain cartridge information 372 at S506 in the method shown in FIG. 5.

As shown, the warning interface 2000*c* of the GUI 2000 may display a manual cartridge ordering command icon 2078 to enable manually commanded ordering of one or more new cartridges (for example, when the user account 734 associated with the cleaner dispensing apparatus 200 from which the warning signal is received does not authorize automatic cartridge ordering in response to the warning signal). In response to user interaction with the manual cartridge order command icon 2078, the computing device 700 may communicate with remote system 800 to transmit an order command signal as shown at S608 in FIG. 6 and FIGS. 8A, 8B, 9A, and 9B.

As further shown, the warning interface 2000*e* may display a home screen return icon 2079 with which a user may interact to cause the GUI 2000 to revert to displaying the home screen interface 2000*a* shown in FIG. 10A. In some example embodiments, the GUI may automatically revert from the warning interface 2000*e* to the home screen interface 2000*a* in response to displaying warning interface 2000*e* for a particular, fixed amount of time (e.g., 5 seconds).

Referring now to FIG. 10F, in response to the computing device 700 receiving an inhibit signal from the cleaner dispensing apparatus 200 at S61, in response to the cleaner dispensing apparatus 200 determining that the final depletion threshold counter value is reached (S430=YES) and/or in response to the computing device 700 processing the counter value information transmitted by the cleaner dispensing apparatus 200 to determine that the final depletion threshold counter value is reached and/or that a quantity of remaining dispensings (received and updated at S532) is at or below a final depletion threshold value, the computing device 700 may cause the GUI 2000 to display an inhibit interface 2000*f* indicating that the final depletion threshold counter value is reached at the cleaner dispensing apparatus 200 associated with the user account 734 supported by the computing device 700, such that the cleaner dispensing apparatus 200 (e.g., at least the dispenser device 208 thereof) is inhibited from further operation (e.g., until a new cartridge is authenticated to cause a new apparatus enable command signal to be transmitted to the cleaner dispensing apparatus 200). The computing device 700 may display the inhibit interface 2000*f* as part of providing an inhibit indication to a supported user at S618 shown in FIG. 6.

As shown, the inhibit interface 2000*f* may include an inhibit indication field 2080 which indicates that the final depletion threshold counter value is reached at the cleaner dispensing apparatus 200. The inhibit indication field 2080 may include additional information, including information indicating that the cleaner dispensing apparatus 200 is presently in an inhibited (e.g., locked) state, thereby indicating that further operation of at least a dispenser device of the cleaner dispensing apparatus 200 is presently inhibited. In example embodiments where the user account 734 with which the computing device 700 and/or the cleaner dispensing apparatus 200 is associated includes user account information 738 authorizing automatic ordering of one or more new cartridges in response to the warning signal being received at the computing device from the associated cleaner dispensing apparatus 200 at S602, such that the computing device 700 automatically responds to receipt and processing of the warning signal S602 by at least transmitting an order command signal as shown at S620 in FIGS. 6, 8A and 8B, and 9A and 9B, the inhibit interface 2000*f* may include an order information field 2082 indicating that one or more new cartridges have previously been automatically ordered in response to the previous warning signal being received from the cleaner dispensing apparatus 200. Field 2082 may include additional information, and may include additional information associated with the order, including an estimated or previous date of delivery of the ordered cartridge(s) to the physical mailing address associated with the user account 734 (and thus associated with a cleaner dispensing apparatus 200 associated with the user account 734).

The inhibit interface 2000*f* may include a dispensing counter field 2084 (which displays a quantity of dispensings remaining at the cleaner dispensing apparatus 200, showing a remaining value of "0" to indicate that the cleaner dispensing apparatus 200 is inhibited in response to a counter thereof being incremented to have a counter value that meets a first (final depletion) threshold counter value (e.g., the field 2074 displays a difference between the present counter value of the cleaner dispensing apparatus 200 and the first threshold counter value, the difference being "0" due to the final depletion threshold counter value being reached). In some example embodiments, field 2084 may be omitted from interface 2000*f*.

As shown, the inhibit interface 2000*f* of the GUI 2000 may display an authentication command icon 2086, which may be similar to icon 2016 shown in FIG. 10A and/or icon 2076 shown in FIG. 10E. In response to user interaction with the authentication command icon 2086, the computing device 700 may initiate an attempt to obtain cartridge information 372 from a cartridge indicator 370 of a new cartridge 300 (e.g., a new cartridge previously automatically ordered and delivered as indicated by filed 2082) to attempt to authenticate the cartridge 300, via which the computing device 700 may transmit a new apparatus enable command signal to the cleaner dispensing apparatus 200 associated with the user account 734 and/or linked with the computing device 700 via the network communication link 702, thereby enabling re-enabling (e.g., reactivation, unlocking, etc.) of the cleaner dispensing apparatus 200 to enable resumed operation of at least the dispenser device 208 thereof (and which may further include re-setting the counter value of the cleaner dispensing apparatus 200 and thus resetting the "dispensings remaining" field displayed in by the GUI 2000 in various screens thereof). In some example embodiments, user interaction with the authentication command icon 2086 may be interpreted by the computing device 700 as receipt of an indication of a new cartridge at S614 of the method shown in FIG. 6 and/or at S504 of the method shown in FIG. 5, such that the computing device 700 may responsively initiate an attempt to obtain cartridge information 372 at S506 in the method shown in FIG. 5.

As shown, the inhibit interface **2000*f* of the GUI 2000 may display a manual cartridge ordering command icon 2088 to enable manually commanded ordering of one or more new cartridges (for example, when the user account 734 associated with the cleaner dispensing apparatus 200 from which the warning signal is received does not authorize automatic cartridge ordering in response to the warning signal). In response to user interaction with the manual cartridge order command icon 2088, the computing device 700 may communicate with remote system 800 to transmit an order command signal as shown at S608 in FIG. 6 and FIGS. 8A, 8B, 9A, and 9**B.

As further shown, the inhibit interface **2000*f* may display a home screen return icon 2089 with which a user may interact to cause the GUI 2000 to revert to displaying the home screen interface 2000*a* shown in FIG. 10A. In some example embodiments, the GUI may automatically revert from the inhibit interface 2000*f* to the home screen interface 2000*a* in response to displaying the inhibit interface 2000*f*** for a particular, fixed amount of time (e.g., 5 seconds).

Some Example Embodiments of the inventive concepts are as follows below:

Example Embodiment 1: A control system (3000), comprising:

a cleaner dispensing system (1100) configured to dispense a cleaning composition (230), the cleaner dispensing system including a cleaner dispensing apparatus (200) including a dispenser device (208) configured to operate to dispense the cleaning composition through an apparatus outlet (240), the cleaner dispensing apparatus configured to selectively enable and inhibit operation of at least the dispenser device, and a cartridge (300) configured to hold the cleaning composition within a cartridge reservoir (304) of the cartridge, the cartridge configured to detachably couple with the cleaner dispensing apparatus to provide the cleaning composition held in the cartridge reservoir to the dispenser device, the cartridge including a cartridge indicator (370) that is configured to indicate a particular cartridge identifier code (374) that is associated with the cartridge; and a computing device (700), the computing device including a memory (730) storing a program of instructions, and a processor (720) configured to execute the program of instructions to detect the particular cartridge identifier code that is indicated by the cartridge indicator of the cartridge based on obtaining cartridge information (372) from the cartridge indicator, and transmit an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code (774).

Example Embodiment 2: The control system of Example Embodiment 1, wherein the cleaner dispensing apparatus is further configured to set a counter value of a counter to an initial counter value in response to the selectively enabling the operation of the dispenser device, operate the dispenser device, subsequently to the selectively enabling the operation of at least the dispenser device, to dispense the cleaning composition received at the dispenser device from the cartridge reservoir, increment the counter value in response to each operation of the dispenser device to dispense the cleaning composition to the apparatus outlet, and selectively inhibit operation of at least the dispenser device, in response to a determination that the counter value at least meets a first threshold counter value associated with depletion of the cleaning composition in the cartridge reservoir of the cartridge.

Example Embodiment 3: The control system of any of Example Embodiments 1 or 2, wherein the cleaner dispensing apparatus is further configured to transmit a warning signal to the computing device in response to a determination that the counter value at least meets a second threshold counter value, the second threshold counter value being between the initial counter value and the first threshold counter value, and the processor of the computing device is configured to execute the program of instructions to transmit an order command signal to a remote system via a network communication link to cause at least one new cartridge to be delivered to a physical mailing address that is associated with the cleaner dispensing apparatus in response to the warning signal.

Example Embodiment 4: The control system of any of any of Example Embodiments 1 to 3, wherein the cartridge indicator includes a visible pattern (392) that is externally visible on an outer surface of the cartridge, the computing device includes a detection device (770) that includes a camera device, and the processor is configured to execute the program of instructions to obtain the cartridge information from the cartridge indicator based on controlling the camera device to generate an image of the visible pattern, and detect the particular cartridge identifier code based on processing the image of the visible pattern.

Example Embodiment 5: The control system of any of any of Example Embodiments 1 to 4, wherein the visible pattern is a quick response (QR) code.

Example Embodiment 6: The control system of any of any of Example Embodiments 1 to 5, wherein the cartridge indicator includes a near-field communication (NFC) device that is configured to transmit an NFC signal that indicates the particular cartridge identifier code in response to an NFC field, the computing device includes one or more detection devices (770) that include one or more NFC communication interfaces, the one or more NFC communication interfaces collectively configured to generate the NFC field and to receive the NFC signal transmitted by the NFC device in response to the NFC field, and the processor is configured to execute the program of instructions to obtain the cartridge information from the cartridge indicator based on causing the one or more NFC communication interfaces of the computing device to collectively generate the NFC field and receive the NFC signal transmitted by the NFC device in response to the NFC field, and detect the particular cartridge identifier code based on processing the NFC signal.

Example Embodiment 7: The control system of any of any of Example Embodiments 1 to 6, wherein the determination that the particular cartridge identifier code matches the authentic cartridge identifier code includes a comparison of the particular cartridge identifier code with one or more authentic cartridge identifier codes that are stored in a database (732, 832), the one or more authentic cartridge identifier codes including the authentic cartridge identifier code, and a determination that the particular cartridge identifier code matches at least the authentic cartridge identifier code from among the one or more authentic cartridge identifier codes.

Example Embodiment 8: The control system of any of any of Example Embodiments 1 to 7, wherein the processor is configured to execute the program of instructions to receive the one or more authentic cartridge identifier codes from a remote system (800) via a network communication link (802) and store the database (732) including the one or more authentic cartridge identifier codes in the memory of the computing device, and compare the particular cartridge identifier code with the one or more authentic cartridge identifier codes that are stored in the database at the computing device.

Example Embodiment 9: The control system of any of any of Example Embodiments 1 to 8, wherein at least one of the computing device or a remote system (800) is configured to de-authenticate the authentic cartridge identifier code based on the apparatus enable command signal being transmitted to the cleaner dispensing apparatus.

Example Embodiment 10: The control system of any of any of Example Embodiments 1 to 9, further comprising:

a remote system (800) storing the database (832), wherein the processor is configured to execute the program of instructions to cause the computing device to transmit an authentication request signal that indicates the particular cartridge identifier code to the remote system via a network communication link, wherein the remote system is configured to compare the particular cartridge identifier code with the one or more authentic cartridge identifier codes that are stored in the database to determine that the particular cartridge identifier code matches at least the authentic cartridge identifier code from among the one or more authentic cartridge identifier codes, in response to receiving and processing the authentication request signal, and transmit an authentication confirmation signal to the computing device in response to determining that the particular cartridge identifier code matches at least the authentic cartridge identifier code, wherein the processor is further configured to execute the program of instructions to determine that the particular cartridge identifier code matches the authentic cartridge identifier code in response to processing the authentication confirmation signal received from the remote system.

Example Embodiment 11: The control system of any of any of Example Embodiments 1 to 10, wherein the processor is configured to execute the program of instructions to determine that the particular cartridge identifier code matches the authentic cartridge identifier code in response to receiving the authentication confirmation signal within a particular period of time elapsed from a time at which the computing device transmits the authentication request signal to the remote system.

Example Embodiment 12: A computing device (700) configured to implement authenticated control of a cleaner dispensing system (1100) that is configured to dispense a cleaning composition (230), the cleaner dispensing system including a cartridge (300) and a cleaner dispensing apparatus (200), the cartridge configured to hold the cleaning composition within a cartridge reservoir (304) of the cartridge, the cleaner dispensing apparatus including a dispenser device (208), the cartridge configured to detachably couple with the cleaner dispensing apparatus to provide the cleaning composition held in the cartridge reservoir to the dispenser device, the cleaner dispensing apparatus configured to operate the dispenser device to dispense the cleaning composition through an apparatus outlet (240), the cleaner dispensing apparatus configured to selectively enable and inhibit operation of at least the dispenser device, the cartridge including a cartridge indicator (370) that is configured to indicate a particular cartridge identifier code (374) that is associated with the cartridge, the computing device comprising:

a memory (730) storing a program of instructions, and a processor (720) configured to execute the program of instructions to detect the particular cartridge identifier code that is indicated by the cartridge indicator of the cartridge based on obtaining cartridge information (372) from the cartridge indicator, and transmit an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code (774).

Example Embodiment 13: The computing device of Example Embodiment 12, wherein the processor is configured to execute the program of instructions to transmit an order command signal to a remote system (800) via a network communication link (802) to be delivered to a physical mailing address that is associated with the cleaner dispensing apparatus in response to receiving and processing a warning signal from the cleaner dispensing apparatus, the warning signal indicating that the cartridge reservoir of the cartridge contains an amount of the cleaning composition that is equal to or less than a threshold amount.

Example Embodiment 14: The computing device of Example Embodiments 12 or 13, further comprising:

a detection device (770) that includes a camera device, wherein the processor is configured to execute the program of instructions to obtain the cartridge information from the cartridge indicator based on controlling the camera device to generate an image of a visible pattern (392) that is externally visible on an outer surface (302S) of the cartridge, the visible pattern associated with the cartridge indicator, and detect the particular cartridge identifier code based on processing the image of the visible pattern.

Example Embodiment 15: The computing device of any of any of Example Embodiments 12 to 14, wherein the visible pattern is a quick response (QR) code.

Example Embodiment 16: The computing device of any of Example Embodiments 12 to 15, further comprising:

one or more detection devices (770) that include one or more NFC communication interfaces, the one or more near-field communication (NFC) communication interfaces collectively configured to generate an NFC field, wherein the cartridge indicator includes an NFC device that is configured to transmit an NFC signal that indicates the particular cartridge identifier code in response to the NFC field, wherein the one or more NFC communication interfaces are further collectively configured to receive the NFC signal transmitted by the NFC device in response to the NFC field, and wherein the processor is configured to execute the program of instructions to obtain the cartridge information from the cartridge indicator based on causing the one or more NFC communication interfaces of the computing device to collectively generate the NFC field and receive the NFC signal transmitted by the NFC device in response to the NFC field, and detect the particular cartridge identifier code based on processing the NFC signal.

Example Embodiment 17: The computing device of any of Example Embodiments 12 to 16, wherein the determination that the particular cartridge identifier code matches the authentic cartridge identifier code includes a comparison of the particular cartridge identifier code with one or more authentic cartridge identifier codes that are stored in a database (732, 832), the one or more authentic cartridge identifier codes including the authentic cartridge identifier code, and a determination that the particular cartridge identifier code matches at least the authentic cartridge identifier code from among the one or more authentic cartridge identifier codes.

Example Embodiment 18: The computing device of any of Example Embodiments 12 to 17, wherein the processor is configured to execute the program of instructions to cause the authentic cartridge identifier code to be de-authenticated based on the apparatus enable command signal being transmitted to the cleaner dispensing apparatus.

Example Embodiment 19: The computing device of any of Example Embodiments 12 to 18, wherein the processor is configured to execute the program of instructions to receive the one or more authentic cartridge identifier codes from a remote system (800) via a network communication link (802) and store the database (732) including the one or more authentic cartridge identifier codes in the memory of the computing device, and compare the particular cartridge identifier code with the one or more authentic cartridge identifier codes that are stored in the database at the computing device.

Example Embodiment 20: The computing device of any of Example Embodiments 12 to 19, wherein the processor is configured to execute the program of instructions to cause the computing device to transmit an authentication request signal that indicates the particular cartridge identifier code to a remote system (800) via a network communication link (802), the remote system storing the database (832), and determine that the particular cartridge identifier code matches the authentic cartridge identifier code in response to processing an authentication confirmation signal received from the remote system to determine that the particular cartridge identifier code is determined at the remote system to match at least the authentic cartridge identifier code from among the one or more authentic cartridge identifier codes in the database at the remote system.

Example Embodiment 21: The computing device of any of Example Embodiments 12 to 20, wherein the processor is configured to execute the program of instructions to determine that the particular cartridge identifier code matches the authentic cartridge identifier code in response to receiving the authentication confirmation signal within a particular period of time elapsed from a time at which the computing device transmits the authentication request signal to the remote system.

Example Embodiment 22: A method performed by a computing device (700), the method comprising:

detecting a particular cartridge identifier code (374) that is indicated by a cartridge indicator (370) of a cartridge (300) of a cleaner dispensing system (1100) based on controlling a detection device (770) of the computing device to obtain cartridge information (372) from the cartridge indicator, the cleaner dispensing system including the cartridge and a cleaner dispensing apparatus (200), the cartridge configured to hold a cleaning composition (230) within a cartridge reservoir (304) of the cartridge, the cleaner dispensing apparatus including a dispenser device (208), the cartridge configured to detachably couple with the cleaner dispensing apparatus to provide the cleaning composition held in the cartridge reservoir to the dispenser device, the cleaner dispensing apparatus configured to operate the dispenser device to dispense the cleaning composition through an apparatus outlet (240), the cleaner dispensing apparatus configured to selectively enable and inhibit operation of at least the dispenser device, the particular cartridge identifier code associated with the cartridge; and transmitting an apparatus enable command signal to the cleaner dispensing apparatus to cause the cleaner dispensing apparatus to selectively enable operation of at least the dispenser device, in response to a determination that the particular cartridge identifier code matches an authentic cartridge identifier code (774).

Example Embodiment 23: The method of Example Embodiment 22, further comprising:

transmitting an order command signal to a remote system via a network communication link to be delivered to a physical mailing address that is associated with the cleaner dispensing apparatus in response to receiving and processing a warning signal from the cleaner dispensing apparatus, the warning signal indicating that the cartridge reservoir of the cartridge contains an amount of the cleaning composition that is equal to or less than a threshold amount.

Example Embodiment 24: The method of Example Embodiments 22 or 23, wherein the detecting the particular cartridge identifier code is based on obtaining the cartridge information from the cartridge indicator based on controlling a detection device (770) of the computing device that includes a camera device to generate an image of a visible pattern (392) that is externally visible on an outer surface (302S) of the cartridge, the visible pattern associated with the cartridge indicator, and processing the image of the visible pattern to detect the particular cartridge identifier code.

Example Embodiment 25: The method of any of Example Embodiments 22 to 24, wherein the visible pattern is a quick response (QR) code.

Example Embodiment 26: The method of any of Example Embodiments 22 to 25, wherein the detecting the particular cartridge identifier code is based on controlling one or more detection devices (770) of the computing device that include one or more near-field communication (NFC) communication interfaces of the computing device to generate an NFC field, obtaining the cartridge information from the cartridge indicator based on receiving, at the one or more NFC communication interfaces of the computing device, an NFC signal generated by the cartridge indicator in response to the NFC field, wherein the cartridge indicator includes an NFC device that is configured to transmit the NFC signal in response to the NFC field, and processing the NFC signal at the computing device to detect the particular cartridge identifier code.

Example Embodiment 27: The method of any of Example Embodiments 22 to 26, wherein the determination that the particular cartridge identifier code matches the authentic cartridge identifier code includes a comparison of the particular cartridge identifier code with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

Example Embodiment 28: The method of any of Example Embodiments 22 to 27, further comprising:

de-authenticating the authentic cartridge identifier code based on the apparatus enable command signal being transmitted to the cleaner dispensing apparatus.

Example Embodiment 29: The method of any of Example Embodiments 22 to 28, wherein the determination that the particular cartridge identifier code matches the authentic cartridge identifier code includes transmitting an authentication request signal that indicates the particular cartridge identifier code to a remote system (800) via a network communication link (802), the remote system storing a database (832) including one or more authentic cartridge identifier codes, the one or more authentic cartridge identifier codes including the authentic cartridge identifier code, and determining that the particular cartridge identifier code matches the authentic cartridge identifier code in response to processing an authentication confirmation signal received from the remote system to determine that the particular cartridge identifier code is determined at the remote system to match at least the authentic cartridge identifier code from among the one or more authentic cartridge identifier codes in the database at the remote system.

Example Embodiment 30: The method of any of Example Embodiments 22 to 29, further comprising:

determining that the particular cartridge identifier code matches the authentic cartridge identifier code in response to receiving the authentication confirmation signal within a particular period of time elapsed from a time at which the authentication request signal is transmitted to the remote system.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

I claim:

1. A cleaner dispensing system configured to dispense a cleaning composition, the cleaner dispensing system comprising:

a cleaner dispensing apparatus including a dispenser device configured to operate to dispense the cleaning composition through an apparatus outlet, the cleaner dispensing apparatus configured to selectively enable operation of at least the dispenser device and selectively inhibit the operation of at least the dispenser device; and a cartridge configured to hold the cleaning composition within a cartridge reservoir of the cartridge, the cartridge configured to detachably couple with the cleaner dispensing apparatus to provide the cleaning composition held in the cartridge reservoir to the dispenser device, the cartridge including a cartridge indicator that is configured to indicate a particular cartridge identifier code that is associated with the cartridge.

2. A cleaner dispensing system configured to dispense a cleaning composition, the cleaner dispensing system comprising:

a cleaner dispensing apparatus including a dispenser device configured to operate to dispense the cleaning composition through an apparatus outlet, the cleaner dispensing apparatus configured to selectively enable operation of at least the dispenser device and selectively inhibit the operation of at least the dispenser device; and a cartridge configured to hold the cleaning composition within a cartridge reservoir of the cartridge, the cartridge configured to detachably couple with the cleaner dispensing apparatus to provide the cleaning composition held in the cartridge reservoir to the dispenser device, the cartridge including a cartridge indicator that is configured to indicate a particular cartridge identifier code that is associated with the cartridge, wherein the cleaner dispensing apparatus is further configured to set a counter value of a counter to an initial counter value in response to the selectively enabling the operation of at least the dispenser device, operate the dispenser device, subsequently to the selectively enabling the operation of at least the dispenser device, to dispense the cleaning composition received at the dispenser device from the cartridge reservoir, increment the counter value in response to each operation of the dispenser device to dispense the cleaning composition to the apparatus outlet, and selectively inhibit operation of at least the dispenser device, in response to a determination that the counter value at least meets a first threshold counter value associated with depletion of the cleaning composition in the cartridge reservoir of the cartridge.

3. The cleaner dispensing system of claim 2, wherein the cleaner dispensing apparatus is further configured to transmit a warning signal in response to a determination that the counter value at least meets a second threshold counter value, the second threshold counter value being between the initial counter value and the first threshold counter value.

4. The cleaner dispensing system of claim 2, wherein the cartridge indicator includes a visible pattern that is externally visible on an outer surface of the cartridge.

5. The cleaner dispensing system of claim 4, wherein the visible pattern is a quick response (QR) code.

6. An authentication and control system configured to implement authenticated control of a cleaner dispensing system that is configured to dispense a cleaning composition, the cleaner dispensing system including a cartridge and a cleaner dispensing apparatus, the cartridge configured to hold the cleaning composition within a cartridge reservoir of the cartridge, the cleaner dispensing apparatus including a dispenser device, the cartridge configured to detachably couple with the cleaner dispensing apparatus to provide the cleaning composition held in the cartridge reservoir to the dispenser device, the cleaner dispensing apparatus configured to operate the dispenser device to dispense the cleaning composition through an apparatus outlet, the cleaner dispensing apparatus configured to selectively enable operation of at least the dispenser device and selectively inhibit the operation of at least the dispenser device, the cartridge including a cartridge indicator that is configured to indicate a particular cartridge identifier code that is associated with the cartridge, the authentication and control system comprising:

a computing device communicatively coupled to the cleaner dispensing system via a network communication link, wherein the authentication and control system is configured to detect the particular cartridge identifier code that is indicated by the cartridge indicator of the cartridge based on processing cartridge information obtained from the cartridge indicator, and transmit an apparatus enable command signal to the cleaner dispensing apparatus via the network communication link to command the cleaner dispensing apparatus to selectively enable operation of at least the dispenser device, in response to a determination that the particular cartridge identifier code matches an authentic cartridge identifier code, and wherein the determination that the particular cartridge identifier code matches the authentic cartridge identifier code includes a comparison of the particular cartridge identifier code that is determined to be associated with the cartridge of the cleaner dispensing system with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

7. The authentication and control system of claim 6, wherein the determination that the particular cartridge identifier code matches the authentic cartridge identifier code is based on processing an image of a visible pattern that is externally visible on an outer surface of the cartridge.

8. The authentication and control system of claim 7, wherein the visible pattern is a quick response (QR) code.

9. The authentication and control system of claim 6, wherein the authentication and control system is configured to cause the authentic cartridge identifier code to be de-authenticated based on the apparatus enable command signal being transmitted to the cleaner dispensing apparatus.

10. A method performed by an authentication and control system, the authentication and control system including a computer device communicatively coupled with a cleaner dispensing system via a network communication link, the cleaner dispensing system including a cartridge and a cleaner dispensing apparatus, the cartridge configured to hold a cleaning composition within a cartridge reservoir of the cartridge, the cleaner dispensing apparatus including a dispenser device, the cartridge configured to detachably couple with the cleaner dispensing apparatus to provide the cleaning composition held in the cartridge reservoir to the dispenser device, the cleaner dispensing apparatus configured to operate the dispenser device to dispense the cleaning composition through an apparatus outlet, the cleaner dispensing apparatus configured to selectively enable operation of at least the dispenser device and selectively inhibit the operation of at least the dispenser device, the cartridge including a cartridge indicator that is configured to indicate a particular cartridge identifier code that is associated with the cartridge, the method comprising:

detecting the particular cartridge identifier code that is indicated by the cartridge indicator of the cartridge based on processing cartridge information obtained from the cartridge indicator; and transmitting an apparatus enable command signal to the cleaner dispensing apparatus via the network communication link to command the cleaner dispensing apparatus to selectively enable operation of at least the dispenser device, in response to a determination that the particular cartridge identifier code matches an authentic cartridge identifier code, wherein the determination that the particular cartridge identifier code matches the authentic cartridge identifier code includes a comparison of the particular cartridge identifier code with one or more authentic cartridge identifier codes that are stored in a database, the one or more authentic cartridge identifier codes including the authentic cartridge identifier code, a determination that the particular cartridge identifier code matches at least the authentic cartridge identifier code from among the one or more authentic cartridge identifier codes including the authentic cartridge identifier code, and a determination that the particular cartridge identifier code matches at least the authentic cartridge identifier code from among the one or more authentic cartridge identifier codes.

11. The method of claim 10, wherein the determination that the particular cartridge identifier code matches the authentic cartridge identifier code is based on processing an image of a visible pattern that is externally visible on an outer surface of the cartridge.

12. The method of claim 11, wherein the visible pattern is a quick response (QR) code.

13. The method of claim 10, further comprising:

de-authenticating the authentic cartridge identifier code based on the apparatus enable command signal being transmitted to the cleaner dispensing apparatus.

14. A control system, comprising:

the cleaner dispensing system of claim 1; and an authentication and control system including a computing device communicatively coupled to the cleaner dispensing system via a network communication link, the authentication and control system configured to detect the particular cartridge identifier code that is indicated by the cartridge indicator of the cartridge based on processing cartridge information obtained from the cartridge indicator; and transmit an apparatus enable command signal to the cleaner dispensing apparatus via the network communication link to cause the cleaner dispensing apparatus to selectively enable operation of at least the dispenser device, in response to a determination that the particular cartridge identifier code matches an authentic cartridge identifier code, wherein the determination that the particular cartridge identifier code matches the authentic cartridge identifier code includes a comparison of the particular cartridge identifier code associated with the cartridge of the cleaner dispensing system with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

15. The control system of claim 14, wherein the cleaner dispensing apparatus is further configured to set a counter value of a counter to an initial counter value in response to the selectively enabling the operation of at least the dispenser device, operate the dispenser device, subsequently to the selectively enabling the operation of at least the dispenser device, to dispense the cleaning composition received at the dispenser device from the cartridge reservoir, increment the counter value in response to each operation of the dispenser device to dispense the cleaning composition to the apparatus outlet, and selectively inhibit operation of at least the dispenser device, in response to a determination that the counter value at least meets a first threshold counter value associated with depletion of the cleaning composition in the cartridge reservoir of the cartridge.

16. The control system of claim 15, wherein the cleaner dispensing apparatus is further configured to transmit a warning signal to the computing device of the authentication and control system in response to a determination that the counter value at least meets a second threshold counter value, the second threshold counter value being between the initial counter value and the first threshold counter value, and the authentication and control system is configured to cause an order of at least one new cartridge to be delivered to a physical mailing address that is associated with the cleaner dispensing apparatus to be implemented in response to the warning signal.

17. The control system of claim 14, wherein the cartridge indicator includes a visible pattern that is externally visible on an outer surface of the cartridge, and the authentication and control system is configured to determine that the particular cartridge identifier code matches the authentic cartridge identifier code based on processing an image of the visible pattern.

18. The control system of claim 14, wherein the authentication and control system is configured to de-authenticate the authentic cartridge identifier code based on the apparatus enable command signal being transmitted to the cleaner dispensing apparatus.

19. The cleaner dispensing system of claim 1, wherein the cartridge indicator includes a visible pattern that is externally visible on an outer surface of the cartridge.

20. The cleaner dispensing system of claim 19, wherein the cartridge is configured to detachably couple with the cleaner dispensing apparatus such that the visible pattern is exposed from the cleaner dispensing apparatus.

21. The cleaner dispensing system of claim 19, wherein the visible pattern is a quick response (QR) code.

22. A control system, comprising:

the cleaner dispensing system of claim 2; and an authentication and control system including a computing device communicatively coupled to the cleaner dispensing system via a network communication link, the authentication and control system configured to detect the particular cartridge identifier code that is indicated by the cartridge indicator of the cartridge based on processing cartridge information obtained from the cartridge indicator, and transmit an apparatus enable command signal to the cleaner dispensing apparatus via the network communication link to cause the cleaner dispensing apparatus to selectively enable operation of at least the dispenser device, in response to a determination that the particular cartridge identifier code matches an authentic cartridge identifier code, wherein the determination that the particular cartridge identifier code matches the authentic cartridge identifier code includes a comparison of the particular cartridge identifier code associated with the cartridge of the cleaner dispensing system with one or more authentic cartridge identifier codes that are stored in a database, the one or more authentic cartridge identifier codes including the authentic cartridge identifier code, and a determination that the particular cartridge identifier code matches at least the authentic cartridge identifier code from among the one or more authentic cartridge identifier codes.

23. The control system of claim 22, wherein the cleaner dispensing apparatus is further configured to set a counter value of a counter to an initial counter value in response to the selectively enabling the operation of at least the dispenser device, operate the dispenser device, subsequently to the selectively enabling the operation of at least the dispenser device, to dispense the cleaning composition received at the dispenser device from the cartridge reservoir, increment the counter value in response to each operation of the dispenser device to dispense the cleaning composition to the apparatus outlet, and selectively inhibit operation of at least the dispenser device, in response to a determination that the counter value at least meets a first threshold counter value associated with depletion of the cleaning composition in the cartridge reservoir of the cartridge.

24. The control system of claim 23, wherein the cleaner dispensing apparatus is further configured to transmit a warning signal to the computing device of the authentication and control system in response to a determination that the counter value at least meets a second threshold counter value, the second threshold counter value being between the initial counter value and the first threshold counter value, and the authentication and control system is configured to cause an order of at least one new cartridge to be delivered to a physical mailing address that is associated with the cleaner dispensing apparatus to be implemented in response to the warning signal.

25. The control system of claim 22, wherein the cartridge indicator includes a visible pattern that is externally visible on an outer surface of the cartridge, and the authentication and control system is configured to determine that the particular cartridge identifier code matches the authentic cartridge identifier code based on processing an image of the visible pattern.

26. The control system of claim 22, wherein the authentication and control system is configured to de-authenticate the authentic cartridge identifier code based on the apparatus enable command signal being transmitted to the cleaner dispensing apparatus.

* * * * *